United States Patent
Guynn

(10) Patent No.: US 11,746,048 B2
(45) Date of Patent: Sep. 5, 2023

(54) CEMENT-SCM COMPOSITIONS AND METHODS AND SYSTEMS FOR THEIR MANUFACTURE

(71) Applicant: ROMAN CEMENT, LLC, Salt Lake City, UT (US)

(72) Inventor: John M. Guynn, Salt Lake City, UT (US)

(73) Assignee: ROMAN CEMENT, LLC, Salt Lake City, UT (US)

(*) Notice: Subject to any disclaimer, the term of this patent is extended or adjusted under 35 U.S.C. 154(b) by 447 days.

(21) Appl. No.: 16/944,587

(22) Filed: Jul. 31, 2020

(65) Prior Publication Data

US 2021/0309570 A1   Oct. 7, 2021

Related U.S. Application Data

(63) Continuation-in-part of application No. 16/241,994, filed on Jan. 8, 2019, which is a continuation-in-part
(Continued)

(51) Int. Cl.
*C04B 7/13* (2006.01)
*C04B 7/00* (2006.01)
(Continued)

(52) U.S. Cl.
CPC ............... *C04B 7/13* (2013.01); *C04B 7/02* (2013.01); *C04B 7/147* (2013.01); *C04B 7/26* (2013.01);
(Continued)

(58) Field of Classification Search
CPC .. C04B 7/34; C04B 7/00; C04B 28/00; C04B 32/00; C04B 14/00; C04B 18/06;
(Continued)

(56) References Cited

U.S. PATENT DOCUMENTS

| | | | |
|---|---|---|---|
| 3,951,347 A | 4/1976 | Tiggesbaumker et al. | |
| 5,626,665 A | 5/1997 | Barger et al. | |

(Continued)

FOREIGN PATENT DOCUMENTS

| | | |
|---|---|---|
| CN | 105948542 A | 9/2016 |
| CN | 108002721 A | 5/2018 |

(Continued)

OTHER PUBLICATIONS

Activating a natural pozzolan moisture—Google Search; Aug. 1, 2018.
(Continued)

*Primary Examiner* — James E McDonough
(74) *Attorney, Agent, or Firm* — Workman Nydegger

(57) ABSTRACT

Method of efficiently manufacturing cement-SCM compositions having improved strength compared to cement-SCM compositions made using conventional methods. The cement-SCM compositions may contain: (A) a fine interground particulate component with (1) a hydraulic cement fraction and (2) a supplementary cementitious material (SCM) fraction; (B) a coarse particulate component comprised of coarse SCM particles not interground with the fine interground particulate component; and optionally (C) an auxiliary particulate component not interground with the fine interground particulate component or the coarse particulate component. A method of manufacturing a cement-SCM composition may be performed by: (A) intergrinding hydraulic cement (e.g., cement clinker) with one or more SCMs to form a fine interground particulate component; (B) blending, without intergrinding, the fine interground particulate component with a coarse particulate component comprised of coarse SCM particles; and optionally (C) further combining, without intergrinding, an auxiliary particulate
(Continued)

component with the fine interground particulate component and the coarse particulate component.

20 Claims, 15 Drawing Sheets

Related U.S. Application Data of application No. 15/862,854, filed on Jan. 5, 2018, now Pat. No. 10,233,116, which is a continuation of application No. 15/332,468, filed on Oct. 24, 2016, now Pat. No. 10,494,298.

(60) Provisional application No. 62/245,399, filed on Oct. 23, 2015.

(51) Int. Cl.
| | |
|---|---|
| *C04B 7/02* | (2006.01) |
| *C04B 7/147* | (2006.01) |
| *C04B 7/26* | (2006.01) |
| *C04B 7/28* | (2006.01) |
| *C04B 40/00* | (2006.01) |
| *C04B 20/02* | (2006.01) |

(52) U.S. Cl.
CPC ............. *C04B 7/28* (2013.01); *C04B 20/026* (2013.01); *C04B 40/0042* (2013.01); *C04B 2201/50* (2013.01)

(58) Field of Classification Search
CPC .. C04B 7/13; C04B 7/02; C04B 7/147; C04B 7/26; C04B 7/28; C04B 20/026; C04B 40/0042; C04B 2201/50
USPC ......................................... 106/638, 705, 707
See application file for complete search history.

(56) References Cited

U.S. PATENT DOCUMENTS

| | | | |
|---|---|---|---|
| 6,033,468 A | 3/2000 | Folks et al. | |
| 6,213,415 B1 | 4/2001 | Cheung | |
| 7,799,128 B2 | 9/2010 | Guynn et al. | |
| 7,972,432 B2 | 7/2011 | Guynn et al. | |
| 8,323,399 B2 | 12/2012 | Guynn et al. | |
| 8,377,201 B2 | 2/2013 | Guynn et al. | |
| 8,414,700 B2 | 4/2013 | Guynn et al. | |
| 8,496,750 B2 | 7/2013 | Mckee | |
| 8,551,245 B2 | 10/2013 | Guynn et al. | |
| 8,974,593 B2 | 3/2015 | Guynn et al. | |
| 9,067,824 B1 | 6/2015 | Hansen et al. | |
| 9,102,567 B1 | 8/2015 | Hansen et al. | |
| 9,238,591 B2 | 1/2016 | Guynn et al. | |
| 9,272,953 B2 | 3/2016 | Guynn et al. | |
| 10,233,116 B1 | 3/2019 | Guynn | |
| 10,494,298 B1 | 12/2019 | Guynn | |
| 2003/0159624 A1 | 8/2003 | Kinuthia et al. | |
| 2007/0051515 A1 | 3/2007 | Fyten et al. | |
| 2012/0325477 A1 | 12/2012 | Brenneis et al. | |
| 2013/0233208 A1 | 9/2013 | Ronin | |
| 2014/0123879 A1 | 5/2014 | Karcher et al. | |
| 2014/0224154 A1 | 8/2014 | Guynn et al. | |
| 2014/0299023 A1* | 10/2014 | Guynn | C04B 28/04 106/709 |
| 2017/0166791 A1 | 6/2017 | Greenwald | |
| 2018/0065888 A1 | 3/2018 | Donovan et al. | |

FOREIGN PATENT DOCUMENTS

| | | |
|---|---|---|
| WO | 2002/070424 A1 | 9/2002 |
| WO | 2011/130482 A2 | 10/2011 |

OTHER PUBLICATIONS

Cement & Concrete Composites: High-volume natural volcanic pozzolan and limestone powder as partial replacements for portland cement in self-compacting and sustainable concrete, K. Celik et al., Cement & Concrete Composites 45 (2014) 136-147).
Final Office Action received for U.S. Appl. No. 15/332,468 dated Feb. 28, 2019.
ILia Fresco (Anossov), Lime Cycle—fresco plaster, Sep. 22, 2013.
Notice of Allowance received for U.S. Appl. No. 15/332,468 dated Jul. 18, 2019.
Notice of Allowance received for U.S. Appl. No. 15/862,854 dated Dec. 26, 2018.
Notice of Allowance received for U.S. Appl. No. 15/862,854 dated Feb. 6, 2019.
Office Action received for U.S. Appl. No. 15/332,468 dated Oct. 19, 2018.
Office Action received for U.S. Appl. No. 15/862,854 dated Aug. 9, 2018.
The Influence of Moulding Moisture Content on the Engineering Properties of Aggregate-Lime-Natural Pozzolan Mixes, Arip-Kituyan Emmanuel Olekambainei, Oct. 2004.
U.S. Application mailed on Jan. 5, 2018 by Guynn., U.S. Appl. No. 15/862,854.
U.S. Patent Application filed Oct. 24, 2016, by John M. Guynn, U.S. Appl. No. 15/332,468.
Wikipedia, Lime, downloaded Aug. 14, 2018.
International Preliminary Reporton Patentability received for PCT Patent Application No. PCT/US2020/012812, dated Jul. 22, 2021, 9 pages.
International Search Report and Written Opinion received for PCT Patent Application No. PCT/US2020/012812, dated Apr. 2, 2020, 10 pages.

\* cited by examiner

US 11,746,048 B2

CEMENT-SCM COMPOSITIONS AND METHODS AND SYSTEMS FOR THEIR MANUFACTURE

CROSS-REFERENCE TO RELATED APPLICATIONS

This Application is a continuation-in-part of U.S. patent application Ser. No. 16/241,994, filed Jan. 8, 2019, which is a continuation-in-part of U.S. patent application Ser. No. 15/862,854, filed Jan. 5, 2018, now U.S. Pat. No. 10,233,116, which is a continuation of U.S. patent application Ser. No. 15/332,468, filed Oct. 24, 2016, now U.S. Pat. No. 10,494,298, which claims the benefit of U.S. Prov App No. 62/245,399, filed Oct. 23, 2015. The disclosures of the foregoing patent applications are incorporated herein by references in their entirety.

BACKGROUND OF THE INVENTION

1. Field of the Invention

The invention is generally in the field of hydraulic cements, supplementary cementitious materials (SCMs), blends of hydraulic cements and SCMs, and methods and apparatus for manufacturing hydraulic cements, SCMs, and cement-SCM compositions.

2. Relevant Technology

Supplementary Cementitious Materials, such as coal ash, metallurgical slags, natural pozzolans, biomass ash, post-consumer glass, and limestone, can be used to replace a portion of Portland cement in concrete. SCMs can yield improved concrete with increased paste density, higher durability, lower heat of hydration, lower chloride permeability, reduced creep, increased resistance to chemical attack, lower cost, and reduced environmental impact. Pozzolans react with calcium hydroxide released during cement hydration. Limestone can provide a filler effect and accelerate cement hydration. Some SCMs have self-cementing properties, an example of which ground granulated blast furnace slag (GGBFS).

Portland cement, sometimes referred to as "cement clinker", "ordinary Portland cement", "OPC", or "cement" is typically the costliest component of concrete. OPC manufacture is very energy intensive, requiring the burning of large amounts of fuel, which produces $CO_2$ and other pollutants as combustion byproducts. Calcining limestone (mainly calcium carbonate, or $CaCO_3$) also releases process $CO_2$ when converted into lime (calcium oxide, or CaO). In fact, the manufacture of cement clinker contributes an estimated 5-7% of all manmade $CO_2$. Despite an abundant supply of lower cost SCMs, the industry has failed to overcome technical hurdles that prevent full utilization of SCMs. A major problem is that SCMs are primarily industrial waste products that are not purposely produced for blending with OPC. Although most SCMs are reactive to various extents, they are slower reacting then OPC. Partially replacing OPC with SCMs typically reduces strength by dilution, especially early strength. Increased SCM substitution further increases strength loss by dilution.

There are essentially two commercial pathways for making blended cement—intergrinding or simple blending. In simple blending, the OPC and SCM components are produced separately and blended together without intergrinding, either by dry blending or in the presence of water when making fresh concrete. In intergrinding, cement clinker and one or more SCMs are interground in a cement mill to a specified fineness to yield the finished blended cement. Self-blending of OPC and fly ash by concrete manufactures is common in the United States while intergrinding to make finished blended cement is common in Europe, Latin America, and Asia.

SUMMARY

Disclosed herein are cement-SCM compositions having improved strength, particularly higher early strength, compared to cement-SCM compositions comprised of, or made using, conventional blended cements. Also disclosed are components used to make cement-SCM compositions. Also disclosed herein are methods and systems for manufacturing cement-SCM compositions and components thereof.

According to some embodiments, cement-SCM compositions are prepared by blending, without intergrinding, at least one finer particulate component and at least one coarser particulate component (e.g., the coarser particulate component having a D10, D50 and/or D90 that is a least 1.5, 1.75, 2, 2.5, 3, 3.5, 4, or 5 times that of the finer particulate component). Blending two or more particulate components, without intergrinding, provides greater control over the particle size distribution (PSD) of each particulate component or fraction and also of the resulting blended cement-SCM composition.

At least one of the finer or coarse particulate components is manufactured by intergrinding two or more different types of materials. In some embodiments, the interground particulate component is a fine interground particulate component that is thereafter blended, without intergrinding, with a coarse particulate component. In other embodiments, the interground particulate component is a coarse interground particulate component that is thereafter blended, without intergrinding, with a fine particulate component. In some cases, a fine interground particulate component is blended, without intergrinding, with a course interground particulate component. Interground and non-interground particulate components can be further modified by classification in order to adjust the d90 and/or d10.

In some embodiments, a fine interground particulate component can include two or more different types of materials interground together that can be blended with one or more coarser components. In some embodiments, a fine interground material can include one or more hydraulic cements interground with one or more SCMs. In some embodiments, a fine interground material can include one or more clinkers or granules initially larger than about 1-3 mm interground with one or more finer materials smaller than about 1 mm. Intergrinding clinkers or granules with finer materials can be advantage when using a modern mill that requires some percentage of clinkers or granules to be present to form a stable grinding bed (e.g., vertical roller mills, horizontal roll presses, and the like). The clinkers or granules may be hydraulic cement, granulated blast furnace slag, steel slag, other metallurgical slags, pumice, limestone, aggregates, shale, tuff, trass, geologic materials, waste glass, glass shards, basalt, sinters, ceramics, recycled bricks, recycled concrete, ores, refractory materials, other waste industrial products, sand, and natural minerals. The finer SCM can be volcanic ash, shale dust, other natural pozzolan, or waste fines from aggregate processing.

In some embodiments, a cement-SCM composition comprises: (A) a fine interground particulate component comprised of (1) a hydraulic cement fraction (e.g., Portland cement) and (2) a supplementary cementitious material (SCM) fraction; (B) a coarse particulate component comprised of coarse SCM particles not interground with the fine interground particulate component; and optionally (C) an auxiliary particulate component (e.g., OPC, SCM, or other material) not interground with either of the fine interground particulate component or the coarse particulate component.

In some embodiments, components for use in making cement-SCM composition can include: (A) a fine interground particulate component comprised of (1) a ground clinker or granule fraction formed from clinkers or granules initially larger than 1-3 mm and (2) a ground finer fraction formed from particles or powders initially smaller than 1 mm; (B) a coarse particulate component comprised of coarse SCM particles not interground with the fine interground particulate component; and (C) an SCM and/or hydraulically reactive particulate component not interground with the fine interground particulate component or the coarse particulate component.

In some embodiments, a cement-SCM composition comprises: (A) a fine interground particulate component comprised of (1) a first SCM fraction and (2) a second SCM fraction; (B) a hydraulic cement component not interground with the fine interground particulate component; and (C) a coarse particulate component comprised of coarse SCM particles not interground with the fine interground particulate component or the hydraulic cement component; and optionally (D) an auxiliary particulate component (e.g., OPC, SCM, or other material) not interground with any of components (A), (B) or (C).

In some embodiments, a method of manufacturing a cement-SCM composition comprises: (A) intergrinding hydraulic cement (e.g., cement clinker) with one or more SCMs to form a fine interground particulate component; (B) blending, without intergrinding, the fine interground particulate component with a coarse particulate component comprised of coarse SCM particles; and optionally (C) further combining, without intergrinding, an auxiliary particulate component with the fine interground particulate component and the coarse particulate component.

In some embodiments, a method of manufacturing a more reactive natural pozzolan comprises intergrinding a granular material and/or limestone with one or more natural pozzolans to form a fine interground particulate component.

In some embodiments, a method of manufacturing a cement-SCM composition comprises: (A) intergrinding one or more clinkers or granules initially larger than about 1-3 mm with one or more finer particles or powders having an initial particle size less than about 1 mm to form a fine interground particulate component; (B) blending, without intergrinding, the fine interground particulate component with a coarse particulate component comprised of coarse SCM particles; and optionally (C) further combining, without intergrinding, an auxiliary particulate component with the fine interground particulate component and the coarse particulate component. Where fine interground component (A) is insufficiently hydraulically reactive, the auxiliary particulate component may advantageously include hydraulically reactive particles (e.g., Portland cement).

In some embodiments, a method of manufacturing a cement-SCM composition comprises: (A) intergrinding (1) a first SCM component and (2) a second SCM component to form a fine interground particulate component; (B) blending, without intergrinding, the fine interground particulate component with a hydraulic cement component; and (C) blending, without intergrinding, the fine interground particulate component and the hydraulic cement component with a coarse particulate component; and optionally (D) further combining, without intergrinding, an auxiliary particulate component (e.g., OPC, SCM, or other material) with components (A), (B) and (C).

In some embodiments, a system of manufacturing a cement-SCM composition comprises: (A) one more milling apparatus configured to intergrind hydraulic cement (e.g., cement clinker) and one or more SCMs to form a fine interground particulate component; (B) one or more blending apparatus configured to blend, without intergrinding, the fine interground particulate component with a coarse particulate component comprised of coarse SCM particles; and optionally (C) one or more apparatus for combining, without intergrinding, an auxiliary particulate component with the fine interground particulate component and the coarse particulate component.

In some embodiments, a system of manufacturing a cement-SCM composition comprises: (A) one more milling apparatus configured to intergrind one or more clinkers or granules initially larger than about 1-3 mm with one or more finer particles or powders having an initial particle size less than about 1 mm to form a fine interground particulate component; (B) one or more blending apparatus configured to blend, without intergrinding, the fine interground particulate component with a coarse particulate component comprised of coarse SCM particles; and optionally (C) one or more apparatus for combining, without intergrinding, an auxiliary particulate component with the fine interground particulate component and the coarse particulate component. Where fine interground component (A) is insufficiently hydraulically reactive, the auxiliary particulate component may advantageously include hydraulically reactive particles.

In some embodiments, a system of manufacturing a cement-SCM composition comprises: (A) one more milling apparatus configured to intergrind (1) a first SCM component and (2) a second SCM component to form a fine interground particulate component; (B) one or more blending apparatus configured to blend, without intergrinding, the fine interground particulate component with a hydraulic cement component; and (C) one or more blending apparatus configured to blend, without intergrinding, the fine interground particulate component and the hydraulic cement component with a coarse particulate component; and optionally (D) one or more apparatus for combining, without intergrinding, an auxiliary particulate component (e.g., OPC, SCM, or other material) with components (A), (B) and (C).

In some embodiments, the coarse particulate component can be made by grinding one or more SCMs to a relatively high D90, and/or classifying (e.g., dedusting to remove overly fine particles to achieve a desired D10), and/or classifying or sieving to remove overly coarse particles.

In some embodiments, the auxiliary particulate component can include one or more cements and SCMs, as described herein, OPC, magnesium cement, aluminate cement, bottom ash, fly ash, GGBFS, steel slag, limestone, etc.

Activated natural pozzolan compositions may comprise an interground blend of natural pozzolan (e.g., volcanic ash or other natural pozzolanic deposit that is initially unactivated and contains moisture, e.g., at least 3% moisture) and at least one initially granular or coarse material that is not cement clinker, wherein intergrinding the initially unactivated natural pozzolan with the initially granular or coarse material activates the natural pozzolan by reducing its particle size and reducing its moisture content (e.g., to less than 0.5%). The result is a fine interground blended SCM material in which the natural pozzolan has been activated.

In some embodiments, a method of activating a natural pozzolan comprises intergrinding a granular SCM material (e.g., having an initial particle size greater than 2 mm) with a natural pozzolan material having a moisture content of at least 3% to form an interground particulate SCM material having a moisture content of less than 0.5%. The method may include intergrinding a granulated or coarse material and a fine, initially unactivated, pozzolan in a vertical roller mill (VRM), horizontal roll press, or any mill that requires coarse particles (granules) at least 2 mm in size to form a stable bed. The natural pozzolan to be activated can be volcanic ash or other natural pozzolanic deposit. The coarse or granular SCM that is interground with the natural pozzolan to activate it can be one or more of blast furnace slag, steel slag, other metallurgical slags, glass shards, limestone, basalt, pumice, geological materials, fine aggregates, ground shale, tuff, trass, and waste concrete. The activated pozzolan composition preferably contains little or no Portland cement (i.e., <30%, <25%, <20%, <15%, <10%, <5%, <1%, or essentially none).

These and other advantages and features of the invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Introduction

Figure 1A:
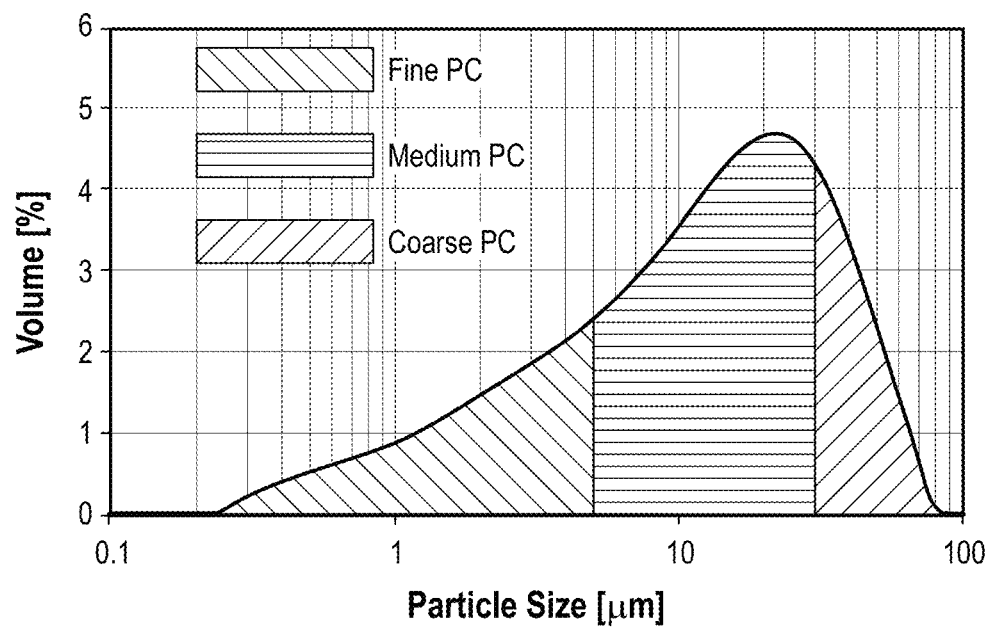
FIGS. 1A and 1B are illustrative particle size distribution (PSD) charts of exemplary ordinary Portland cement (OPC) subdivided to show fine, medium, and coarse fractions.

Disclosed herein are cement-SCM compositions having improved strength, particularly higher early strength, compared to cement-SCM compositions comprised of, or made using, conventional blended cements. Also disclosed herein are methods and systems for manufacturing cement-SCM compositions.

According to some embodiments, cement-SCM compositions include a fine interground particulate component made by intergrinding one or more clinkers (e.g., Portland cement clinker) and one or more supplementary cementitious materials (SCMs) and a coarse particulate component comprised of coarse SCM particles that are not interground with the fine interground particulate component. The cement-SCM composition may optionally include an auxiliary particulate component that is not interground with the fine interground particulate component or the coarse particulate component.

Intergrinding hydraulic cement and SCM yields a fine interground particulate component having a high level of reactivity, both with respect to the hydraulic cement fraction and also the SCM fraction. The fine interground particulate component can typically have a narrow particle size distribution (PSD) and/or a d90 that is significantly lower than the d90 of ordinary Portland cement (OPC). The fine interground particulate component contributes substantially to strength development, including high early strength and also late strength. The coarse particulate component typically includes SCM particles that are less expensive, less reactive, and have lower energy and carbon footprints compared to hydraulic cement particles, which mainly provide a filling effect, particularly in the early stages of strength development.

Blending, without intergrinding, the fine interground particulate component with the coarse particulate component composed of SCM particles yields a cement-SCM composition that combines the beneficial high early strength effect of the fine interground particulate component with the beneficial PSD-broadening effect of the coarse particulate component. The cement-SCM composition has a broadened overall PSD compared to the PSD of the fine interground particulate component by itself, which offsets the otherwise suboptimal PSD of the fine interground particulate component. The overall PSD of the cement-SCM composition can advantageously be optimized to be as broad or broader than the PSD of OPC. Broadening the PSD can reduce viscosity, yield stress, water demand, and shrinkage of the cement paste, increase cement paste density, and improve long-term durability of concrete made therewith.

In addition, blending, without intergrinding, a fine interground particulate component with a coarse particulate component yields a cement-SCM composition in which the particle packing density (PPD) of the overall cement-SCM composition is higher than the PPD of either the fine interground particulate component or the coarse particulate component by themselves prior to blending. The overall PPD of the cement-SCM composition can advantageously be optimized to be as high or higher than the PPD of OPC. Increasing the PPD can reduce water demand and shrinkage of the cement paste, increase paste density, and improve long-term durability of concrete. Moreover, because standard interground blended cements are often ground more finely than OPC (e.g., by about 10-20%) to increase reactivity and offset strength loss resulting from reduced cement clinker content, they typically have a d90 and/or a PPD that is lower than the d90 or PPD of OPC. A lower d90 and/or PPD is characterized by higher water demand and shrinkage. In contrast, because the cement-SCM compositions disclosed herein can have a d90 and/or PPD that is optimized to be significantly higher than the d90 or PPD of conventional interground blended cements, they can have lower water demand and shrinkage, higher paste density, and greater long-term durability compared to conventional interground blended cements.

Similar intergrinding processes can be used to manufacture a blended SCM material, such as an initially coarse granular SCM 1-3 mm in size with an initially fine SCM powder that might otherwise be difficult to grind in a VRM or horizontal roll press. To form a stable bed, the initially coarse granular SCM is used to form a stable bed and interground with the finer SCM. For example, a volcanic ash or natural pozzolan having a moisture content or which is otherwise insufficiently reactive can be interground with a granular material to form an activated pozzolan or SCM blend having reduced moisture and finer particle size. The coarse granular SCM can be granulated blast furnace slag, steel slag, other metallurgical slags, pumice, limestone, dolomite, aggregates, sand, quartz, glass shards, recycled bricks or ceramics, recycled concrete, basalt, ores, shale, tuff, trass, or other geologic material.

If the mill used to intergrind cement clinker and initially moist SCM generates sufficient heat, such as a ball mill or VRM, the heat may be sufficient to prevent moisture released from the initially moist SCM from reacting with and prematurely hydrating a portion of ground cement clinker. Alternatively, grinding aids, such as alkyl amines or alcohol amines, can form a coating that protects or shield cement particles from prematurely hydrating. In some cases, it may be desirable or necessary to at least partially pre-dry the initially moist SCM to prevent premature hydration of ground cement particles. On the other hand, activating natural pozzolans that initially contain excessive moisture by intergrinding with coarse granular SCM materials instead of cement clinker prevents excessive moisture released from the natural pozzolan from undesirably and prematurely reacting with cement clinker, which can reduce cement reactivity and ultimate strength.

A. Review of Conventional Cements and Blended Cements

As used herein, the term "ordinary Portland cement" ("OPC") refers to Type I, II and V cements, according to ASTM C-150, and other cements having similar PSDs. By way of example, FIG. 1A is a PSD chart showing data measured by a laser diffraction technique of a commercially available Type I/II OPC having a Blaine fineness of 376 $m^2$/kg (as reported by its manufacturer). The PSD chart is further subdivided into three regions or fractions designated as "fine" (e.g., <5 μm), "medium" (e.g., 5-30 μm), and "coarse" (e.g., >30 μm). It will be appreciated that these particle size ranges and cutoffs are for illustration and comparison purposes and should not be taken as absolute or necessarily definitional. Other numeric ranges and cutoffs can be used to designate fine, medium, and coarse fractions of cement or cement-SCM blends. For example, the cutoff between the "fine" and "medium" fractions can be any integer or decimal number between 3-15 μm. Similarly, the cutoff between the "medium" and "coarse" fractions can be any integer or decimal number between 10-40 μm. For example, if the cutoff between fine and medium fractions were set at 8 μm and the cutoff between the medium and coarse fractions were set at 24 μm, particles below 8 μm would be "fine", particles between 8-24 μm would be "medium", and particles above 24 μm would be "coarse".

Figure 1B:
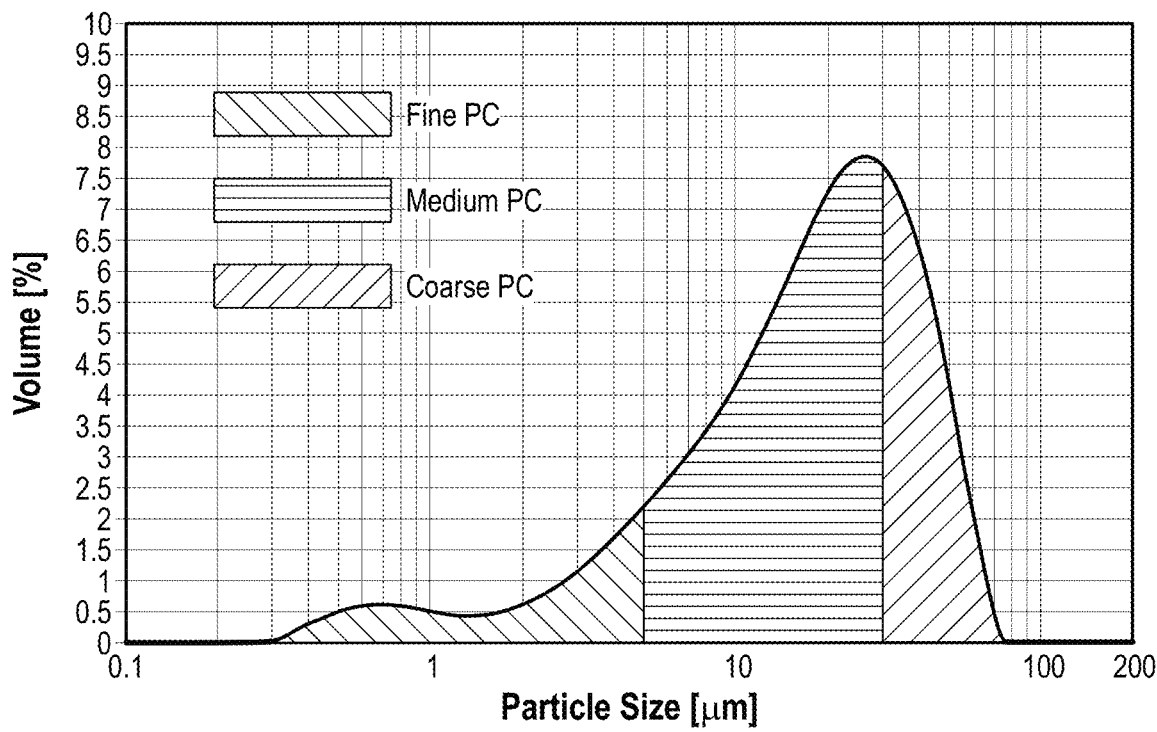

FIG. 1B is a PSD chart showing data measured by a Malvern Mastersizer 2000 of a ground cement clinker material milled using a vertical roll mill (VRM) to a d90 within a typical range of about 40-45 μm. The raw unground clinker was obtained from Drake Cement, Paulen, Ariz., and the VRM was manufactured by Gebr. Pfeiffer, located in Kaiserslautern, Germany. The PSD of the ground cement clinker shown in FIG. 1B is steeper than the PSD of the OPC shown in FIG. 1A, with a d90 of about 43.4 μm, a d50 of about 18.8 μm, and a d10 of about 3.8 μm). The ground cement clinker in FIG. 1B has fewer "fine" particles than the OPC of FIG. 1A, as illustrated by the smaller cross-hatched area designed as "fine". Nevertheless, both Portland cement materials have a typical d90 (e.g., about 40-45 μm) and also a typical d50 (e.g., about 18-20 μm) and therefore contain a substantial proportion of coarse cement particles that may not fully hydrate, particularly at lower water-to-cement ratios (w/c). Steeper PSDs are typical of OPC made using a VRM and other modern, more efficient grinding apparatus such as a horizontal roll press. Older, less efficient grinding apparatus such as a ball mill produce broader PSD cement. OPC made using modern mills having a PSD and considered too narrow is sometimes further processed using a ball mill to produce a higher proportion of fine cement particles and thereby flatten the PSD curve.

Even though the PSD of conventional OPC can be measured and represented by a PSD chart, OPC is rarely, if ever, marketed and sold based on PSD. Instead, cement producers almost universally describe cement in terms of its "fineness" or specific surface area as a description of its reactivity. The "Blaine fineness" (or simply "Blaine") is a single numeric value that can be estimated (not directly measured) using an air permeability test and has units of either $cm^2/g$ or $m^2/kg$, which differ by a factor of 10. Thus, a "Blaine" of 4000 $cm^2/g$ means the same thing as a Blaine of 400 $m^2/kg$. The simplicity of the Blaine standard belies its inherent weakness, which is the inability to account for differences caused by varying PSD. For example, two different cements can have the exact same Blaine number yet vary greatly in how they behave because of differences in PSD. For example, the PSD curves in FIGS. 1A and 1B have very different proportions of cement particle sizes along the curve and will behave differently when used to make concrete even if their Blaine numbers were identical. And even if the cements shown in FIGS. 1A and 1B have different Blaines, either curve could be shifted to the left or the right in order to make the Blaines identical. But doing so would not make the cements behave the same because the shapes of the PSD curves would still differ substantially.

Conventional blended cements formed by either intergrinding or simple mixing without intergrinding can be suboptimal in several ways. It is well-known, for example, that OPC, particularly Type I, II or V cement, includes a substantial quantity of coarse cement particles that are too large to completely hydrate, even after several months or years, particularly in high performance concrete having a w/c less than 0.42. As a result, concrete made therefrom may contain a substantial quantity of "wasted cement" that acts as an expensive filler and represents unused potential reactivity and strength-producing ability. The wasted cement also represents and is proportional to "wasted energy" consumed and "wasted carbon dioxide" emitted during the manufacture of cement clinker. If the d90 of a standard blended cement is similar to that of OPC, the blended cement will, like OPC, contain a substantial quantity of coarse cement particles that are too large to completely hydrate and are therefore "wasted cement". Moreover, even though replacing a portion of the cement with SCM in blended cements reduces the number of coarse cement particles, it also reduces the number of highly reactive fine cement particles, which can have a negative effect on strength development, particularly early (e.g., 1-7 day) strength.

Alternatively, if the blended cement has a d90 that is lower than the d90 of OPC (i.e., in order to increase reactivity), the blended cement will typically have higher water demand and shrinkage and can have lower paste density and reduced long-term durability compared to OPC. If the blended cement were hypothetically ground, such as by intergrinding, to a very high fineness and/or low d90 in order to substantially or entirely eliminate wasted cement and create high reactivity, such hypothetical blended cement would likely form cement paste having very high water demand and shrinkage and yield concrete having low long-term durability.

Blended cements made by intergrinding cement clinker and one or more SCMs to make the finished blended cement product are often ground using the same milling apparatus as OPC and can have the same Blaine fineness as OPC. However, because of reduced strength caused by intergrinding cement with less reactive SCMs, producers often compensate by grinding blended cement more finely to raise the Blaine number (e.g., from 380 $m^2/kg$ to 420 $m^2/kg$ for OPC to 420 $m^2/kg$ to 550 $m^2/kg$ for interground blends). Even so, cement producers must strike a balance between grinding more finely to increase reactivity, on the one hand, and avoiding grinding too finely to avoid excessive water demand and shrinkage, on the other. Thus, grinding more finely to improve strength provides only a small window of opportunity that is limited by the competing and offsetting effects of increased fineness.

The foregoing examples illustrate the impossibility, using conventional methods of intergrinding or simple blending, of manufacturing blended cements that simultaneously have (1) high reactivity as a result of including fine cement and SCM fractions and eliminating coarse cement particles and (2) adequately low water demand, low shrinkage, high paste density, and high concrete durability as a result of including a sufficient quantity of coarse particles that cause the blended cement to have a broad PSD (e.g., a Fuller distribution) made of both fine and coarse particles.

In contrast to conventional methods for making blended cements, the inventive compositions, methods and systems disclosed herein permit the manufacture of improved cement-SCM compositions, including dry blended cements and/or fine and coarse components that can be combined into blended cement at the time of making concrete, which combine the beneficial effects of finely ground cement and SCM materials, which significantly increases strength, particularly early strength, with the beneficial effects of including coarse particles, which significantly broadens the PSD, increases the PPD, reduces water demand and shrinkage, increases paste density, and yields concrete having higher long-term durability.

B. Analytical Framework and Methodology for Analyzing Existing Blended Cements and Designing and Manufacturing Blended Cements and Other Cement-SCM Compositions Apart from the inventive cement-SCM compositions, methods, and systems disclosed herein, a new and useful analytical framework and methodology is proposed for analyzing known cements and blended cements, as well as proposed blended cements and other cement-SCM compositions, for the purpose of predicting permissible SCM replacement levels for a given set of hydraulic cement and SCM inputs. The proposed analytical framework and methodology includes: (1) three fundamental principles for designing and producing well-optimized blended cements; (2) a process for analyzing different blended cements to determine how well they comply with the three fundamental principles to produce an optimization score; and (3) a process for predicting permissible SCM replacement levels based on the optimization score.

A "permissible" SCM replacement level for a blended cement or other cement-SCM composition means the composition will advantageously and reliably provide adequate strength, acceptable water demand, and other performance criteria based on predetermined standards. According to some embodiments, one proposed standard is whether a blended cement reliably produces strength, including early and late compressive strengths, that equal or exceed the compressive strength of OPC and has a water demand similar to that of OPC. The new analytical framework was derived from empirical data showing how blended cements compared to appropriate control cements relative to early strength (1-7 day), late strength (7-182 day), and water demand.

The "three fundamental principles" proposed herein are:
1. minimize the quantity of "coarse" hydraulic cement particles (e.g., >30 μm);
2. minimize the quantity of overly fine hydraulic cement particles (<5 μm);
3. maintain a broad particle size distribution (PSD).

"Coarse" hydraulic cement particles that do not fully hydrate within a specified time duration (e.g., 91 days)

essentially become "wasted cement". An excessive quantity of "fine" hydraulic cement particles as a proportion of overall particles in the cement-SCM composition increases water demand as a result of excessive surface area and flocculation without providing a corresponding strength benefit. A broad particle size distribution increases particle packing density, reduces water demand, shrinkage, and ion permeability, and increases workability, paste density, strength, and long-term durability.

Based on an analysis of empirical data, it has been determined and is proposed that the three fundamental principles may not have equal effect on their analytical and predictive ability. By way of example and not limitation, they can be weighted as follows relative to their observed predictive effect on optimization:

Principle 1 (minimize oversized cement particles)—1.5 (maximum score);
Principle 2 (minimize undersized cement particles)—1.0 (maximum score);
Principle 3 (maintain broad PSD)—1.5 (maximum score).

By way of example, cements and blends in compliance with a given principle can be awarded the maximum score for that principle. Conversely, cements and cement blends in violation of a given principle can be awarded a minimum score of "zero" for that principle. Cements and cement blends in partial compliance with a given principle can be awarded a partial score between zero and the maximum score depending on the degree of compliance or violation. The "optimization score" for a cement or blended cement (actual or proposed) is the sum of all three scores. Increasing scores indicate the ability to substitute more SCMs for ordinary Portland cement. A "perfect score" under the currently proposed scoring system is 4.0. The optimization score is easy to determine and, unlike the Blaine standard or even a detailed PSD chart, the optimization score has been found to be quite accurate in its ability to analyze and predict permissible SCM substitution levels.

In addition, the optimization score appears to be largely independent of the type of SCM that is utilized and is therefore very robust as a predictive tool regardless of the SCM used to make blended cement. For example, blended cements in substantial compliance with all three fundamental principles reportedly produced similar compressive and flexural strengths when using various combinations of SCMs selected from ground granulated blast furnace slag (GGBFS), Class F fly ash, steel slag, and limestone, even at very high substitution levels (55-75%). This is particularly surprising since GGBFS, Class F fly ash, steel slag, and limestone have very different chemistries and reactivities.

It is further proposed that a permissible SCM replacement level for a wide variety of different blended cements can be quickly and accurately estimated by comparing its optimization score with optimization scores determined using the proposed analytical system for blended cements described in the Examples below. The blended cements shown in the Examples had SCM replacement levels of 20%, 35%, 55%, and 75%, respectively. Coupled with a proposed baseline optimization score for 100% OPC, the proposed analytical framework provides a comparative tool that involves well-spaced SCM substitution levels ranging from 0-75%. Using the proposed analytical framework and methodology, one can analyze the strengths and weaknesses of existing and proposed blended cements and other cement-SCM compositions and then efficiently manufacture blended cements and other cement-SCM compositions that more effectively utilize SCMs as a partial replacement for hydraulic cement, such as Portland cement.

II. Cement-SCM Compositions

In some embodiments, a cement-SCM composition comprises: (A) a fine interground particulate component comprised of (1) a hydraulic cement fraction and (2) a supplementary cementitious material (SCM) fraction; (B) a coarse particulate component comprised of coarse SCM particles not interground with the fine interground particulate component; and optionally (C) an auxiliary particulate component (e.g., OPC, SCM, or other material) not interground with either of the fine interground particulate component or the coarse particulate component.

In some embodiments, components for use in making cement-SCM composition can include: (A) a fine interground particulate component comprised of (1) a ground clinker or granule fraction formed from clinkers or granules initially larger than 1-3 mm and (2) a ground finer fraction formed from particles or powders initially smaller than 1 mm; (B) a coarse particulate component comprised of coarse SCM particles not interground with the fine interground particulate component; and (C) an SCM and/or hydraulically reactive particulate component not interground with the fine interground particulate component or the coarse particulate component.

In some embodiments, a cement-SCM composition comprises: (A) a fine interground particulate component comprised of (1) a first SCM fraction and (2) a second SCM fraction; (B) a hydraulic cement component not interground with the fine interground particulate component; and (C) a coarse particulate component comprised of coarse SCM particles not interground with the fine interground particulate component or the hydraulic cement component; and optionally (D) an auxiliary particulate component (e.g., OPC, SCM, or other material) not interground with any of components (A), (B) or (C).

Cement-SCM compositions disclosed herein can be made using hydraulic cement and SCM materials known in the art of cement and concrete manufacture. Examples of cement fractions, SCM fractions, binary, ternary and quaternary cement-SCM blends and compositions that can be made according to the methods and systems disclosed herein are found in U.S. Pat. Nos. 7,799,128, 7,972,432, 8,323,399, 8,974,593, 9,067,824, 8,414,700, 8,377,201, 8,551,245 and 9,102,567, the disclosures of which are incorporated herein in their entirety.

The terms "hydraulic cement" and "cement", as used herein, include Portland cement and similar materials that contain one or more of the four clinker materials: $C_3S$ (tricalcium silicate), $C_2S$ (dicalcium silicate), $C_3A$ (tricalcium aluminate), and $C_4AF$ (tetracalcium aluminoferrite). Hydraulic cement can also include ground granulated blast-furnace slag (GGBFS) and other slags having a relatively high CaO content (which may also qualify as SCMs), white cement, calcium aluminate cement, high-alumina cement, magnesium silicate cement, magnesium oxychloride cement, oil well cements (e.g., Type VI, VII and VIII), and combinations of these and other similar materials.

In some embodiments, the hydraulic cement fraction of a fine interground particulate component and/or the overall cement-SCM composition can have a $C_3S$ content of at least 55%, 57%, 60%, 65%, 70%, or 75% by weight and/or a $C_3A$ content of at least 5%, 6%, 7%, 8%, 10%, 12%, or 15% by weight and/or a total tricalcium mineral content ($C_3S+C_3A$) of at least 63%, 65%, 68%, 72%, 77%, 82%, or 87%.

The terms "supplementary cementitious material" and "SCM" shall include any material commonly understood in the industry to constitute materials that can replace a portion of hydraulic cement in concrete, either in blended cements or added by end users when making concrete or other cementitious materials. The terms "Supplementary cementitious material" and "SCM", as used herein, shall also broadly encompass any material that can be or has been processed in such a way as to capable of replacing a portion of Portland or other hydraulic cement in concrete. Non-limiting examples of SCMs include highly reactive materials (e.g., GGBFS), moderately reactive materials (e.g., Class C fly ash, steel slag, silica fume, and metakaolin), lower reactive materials (e.g., Class F fly ash, calcined clays, natural pozzolans, ground pumice, ground glass, and metastable forms of $CaCO_3$), and filler materials (e.g., ground limestone, clay, ground shale, ground quartz, ground geologic materials, ground recycled concrete, washout fines from concrete trucks, mine tailings, and precipitated $CaCO_3$). There are claims that some unreactive filler materials, such as ground limestone, ground quartz, and precipitated $CaCO_3$, can become or be made to be reactive under certain circumstances.

In some embodiments, a fine interground particulate component can include two or more different types of materials interground together that can be blended with one or more coarser components. In some embodiments, a fine interground material can include one or more hydraulic cement clinkers interground with one or more SCMs. In other embodiments, a fine interground material can include one or more types of clinkers or granules initially larger than about 1-3 mm (e.g., cement, metallurgical slags, limestone, pumice, coal ash, sinters, waste glass, calcined shale, natural pozzolans, bricks, ceramics, recycled concrete, refractory materials, other waste industrial products, aggregates, sand, natural minerals interground with one or more finer SCMs having an initial particle size <1 mm (e.g., volcanic ash, natural pozzolans, shale dust, fly ash, waste fines from aggregate processing, red mud).

In some embodiments, at least one of the SCM fraction of the fine interground particulate component or the coarse SCM particles of the coarse particulate component may comprise one or more SCM materials selected from coal ashes, slags, natural pozzolans, ground glass, and non-pozzolanic materials. By way of example, coal ashes can be selected from fly ash and bottom ash, slags can be selected from ground granulated blast furnace slag, steel slag, and metallurgical slag containing amorphous silica, natural pozzolans can be selected from natural pozzolanic deposits, volcanic ash, metakaolin, shale dust, calcined clay, trass, and pumice, ground glass can be selected from post-consumer glass and industrial waste glass, and non-pozzolanic materials can be selected from limestone, metastable calcium carbonate produced by reacting $CO_2$ from an industrial source and calcium ions, precipitated calcium carbonate, crystalline minerals, clay, ores, mine tailings, ground shale, hydrated cements, and waste concrete (including ground recycled concrete and washout fines).

The cement-SCM compositions disclosed herein may contain components, such as the fine interground particulate component and/or the coarse particulate component, which are not generally used in the cement industry to make general purpose cements. For example, the fine interground particulate component may, by itself, be considered to be too fine for use as general purpose cement to make concrete. In some embodiments, the coarse particulate component may be considered to be too coarse and unreactive for use as a partial cement substitute when making blended cement and concrete. However, when blended together, the fine interground and coarse particulate components synergistically interact to create a blended cement or other cement-SCM composition having properties that are not only adequate for use as general purpose cement but which can be superior to general purpose cements currently used in the cement and concrete industries. In some embodiments, particularly where simplicity of manufacture is desired rather than maximizing SCM substitution level, the fine interground particulate component may be combined with a commercially available SCM, such as fly ash, GGBFS, raw feed for cement kilns, mine tailings, washout fines, or shale dust without modification.

As discussed above, a trend in the cement industry is to grind cements, particularly blended cements, more finely to increase reactivity and early strength-building potential. Over the past few decades, the Blaine fineness of cements and blended cements has increased. The benefit is increased reactivity. However, one detriment is decreased durability resulting from the decreased particle size, particularly the lowering of the d90, which reduces the preponderance of coarse particles in the cement paste. All things being equal, increased fineness increases shrinkage. Moreover, and especially in the absence of high pozzolan usage, finer cements can yield concrete having increased porosity and ion permeability, which increase the likelihood of chemical attack and reduced long-term durability.

Nevertheless, even modern finely ground cements, including interground blended cements, contain substantial quantities of coarse cement particles that never fully hydrate, even after months or years. In fact, the cement industry has reached a practical limit as to how finely it can grind OPC and blended cement (i.e., because making cement even finer will further exacerbate problems associated with shrinkage, water demand, cement paste density, and long-term durability). Moreover, partial replacement of cement with SCMs generally reduces strength, particularly early strength, of concrete, although well-designed and well-tended concrete having high SCM content may, over time, gain as much or more strength as concrete made using a similar quantity of 100% OPC. Because the industry solution to low SCM reactivity is to grind SCMs more finely, but because fineness limits have essentially been reached, there is a practical barrier that prevents the cement industry from grinding cements and blended cements even more finely. As a result, blended cements remain suboptimal and SCM substitution levels remain low.

For example, the Devils Slide plant of Lafarge-Holcim, located in Devils Slide, Utah, produces an interground blend of 75% Portland cement and 25% pozzolan (e.g., natural pozzolan) called "1P (25) Natural Pozzolan" that meets the requirements of ASTM C595 for Type 1P cement. To offset the early strength reducing effect of replacing 25% of the Portland cement with natural pozzolan, the Blain fineness is increased dramatically to 533 $m^3$/kg (Spec Sheet Version 180412). Although 25% substitution is relatively high for interground blends, it is not nearly as high as it could be if the interground blend were blended, without intergrinding, with a coarse SCM material according to the principles disclosed herein.

For example, 1P (25) Natural Pozzolan can be blended, without intergrinding, with a coarser SCM, such as waste shale dust produced as a byproduct by Utelite during manufacture of calcined shale lightweight aggregate, which is located just a few miles from the Devils Slide plant in Coleville, Utah. The Utelite shale dust has a PSD, as measured using a Microtrac—X100 particle size analyzer by RSG Inc. of Silicaga, Ala., in which the d90 is 112.6 µm, the d50 is 24.22 µm, and the d10 is 3.526 µm. This material was tested and has pozzolanic properties comparable to fly ash. Blending shale dust with 1P (25) Natural Pozzolan yields a particulate blend having a substantially broader PSD than 1P (25) Natural Pozzolan by itself, which greatly increases particle packing density, decreases shrinkage, and improves long-term durability. For example, blending two parts 1P (25) Natural Pozzolan with one part shale dust yields a cement-SCM blend containing 50% Portland cement and 50% pozzolan. Not only is this blend superior to 1P (25) Natural Pozzolan by itself, it qualifies as "high volume" pozzolan cement since it has 50% replacement.

Another cement-SCM blend that can easily be made using 1P (25) Natural Pozzolan as the fine interground particulate material is to simply blend, without intergrinding, the 1P (25) Natural Pozzolan with a portion of the raw feed for the cement kiln made by the Devils Slide plant, which would provide an essentially inexhaustible supply of coarse SCM. A typical raw feed contains up to about 90% ground limestone and approximately 10% clay or ground shale and a minor amount of an iron source, such as ground iron ore. Because limestone, clay, ground shale, and ground iron ore are described elsewhere herein as suitable non-reactive SCM fillers, the raw feed is an excellent coarse SCM blending material. Because the raw feed is made using a vertical roller mill, the PSD can be controlled to provide a coarse SCM and cement-SCM blend with controlled PSD, particle packing density, water demand, and reactivity, among other things.

Yet another cement-SCM blend that can be easily made using 1P (25) Natural Pozzolan as the fine interground particulate material is to blend, without intergrinding, the 1P (25) Natural Pozzolan with mine tailings. For example, there is an enormous mountain of mine tailings from the Bingham copper mine on the south side of Interstate-80 near Salt Lake City, Utah. These mine tailings contain mainly waste ore materials and are generally inert. They can be used as is and/or classified and/or ground to produce a coarse SCM that is blended with a fine interground particulate component, such as 1P (25) Natural Pozzolan. Even if the Bingham mine tailings contain some quantity of heavy metals, it is known that once encapsulated in cement paste, such materials do not leach from concrete. Using mine tailings as a partial replacement of Portland cement yields multiple benefits: an inexpensive and essentially inexhaustible supply of coarse SCM; cement-SCM blends with broader PSD and higher particle packing density; and a way to clean up and put the mine tailings to beneficial use.

Even still, another cement-SCM blend that can be easily made using 1P (25) Natural Pozzolan as the fine interground particulate material is to blend, without intergrinding, the 1P (25) Natural Pozzolan with waste concrete (ground recycled concrete or washout fines). For example, every concrete plant creates washout fines on a daily basis while cleaning concrete trucks following deliveries. These washout fines are recovered from a washout pond and typically stored in a pile for drying and use as inexpensive road base or other fill applications. The washout fines typically have high alkalinity and may have some amount of unhydrated cement values. The high alkalinity of washout fines can help activate the natural pozzolan in the 1P (25) Natural Pozzolan, and the pozzolan can bind to and neutralize alkali metals from the washout fines. Using washout fines and ground recycled concrete as a partial replacement of Portland cement yields multiple benefits: an inexpensive and steady supply of coarse SCM; cement-SCM blends with broader PSD and higher particle packing density; and a way to clean up and put the washout fines and/or ground recycled concrete to beneficial use.

Because blending the 1P (25) Natural Pozzolan with a coarse SCM broadens the particle size distribution, it is possible to grind the 1P (25) Natural Pozzolan even more finely to increase the reactivity of the cement and natural pozzolan without creating an unduly fine cementitious material. The increased fineness will offset any early strength reduction that may be caused by blending with the raw feed, which is essentially unreactive but nonetheless contributes to overall strength and durability through the filler effect and by providing nucleation sites (e.g., by the limestone, clay and/or shale particles).

The cement-SCM compositions disclosed herein provide a simple and elegant, yet powerful and heretofore overlooked, solution to problems faced by the cement industry. The fine interground particulate component includes a highly reactive hydraulic cement fraction that provides high early strength and/or is sufficiently fine and/or devoid of coarse cement particles that do not fully hydrate so that the hydraulic cement fraction is able to substantially fully hydrate in a standard defined time period (e.g., within 6 months, 3 months, 56 days, or 28 days). The fine interground particulate component also provides a highly reactive SCM fraction, such as highly reactive pozzolan particles and/or limestone or other filler particles that provide nucleation sites that promote hydration of the hydraulic cement fraction. The fine SCM particles may also reduce water demand by being essentially non-dissolving, non-flocculating, and less absorptive of water compared to fine cement particles in the early stages after mixing with water to form freshly mixed concrete, when workability is more important than strength development. In addition, the fine SCM particles can help disperse the fine cement particles and reduce their flocculation, which further lowers water demand and contributes to workability. In short, the fine interground particulate component provides hydraulic cement and SCM fractions having very high reactivity and high early strength potential but without creating unnecessarily high water demand, which can occur if the cement-SCM composition contains only fine hydraulic cement particles and is substantially or entirely devoid of fine SCM particles.

Another advantage of the fine interground particulate component is that it greatly simplifies the ability and/or reduces the cost of providing both fine hydraulic cement particles and fine SCM particles. For example, the authors of Zhang, et al., "A new gap-graded particle size distribution and resulting consequences on properties of blended cement," *Cement & Concrete Composites* 33 (2011) 543-550 ("Zhang I"), claim that gap graded ternary blends of cement and SCMs may contain as little as 25% Portland cement and as high as 75% SCM. However, "the preparation procedures of the gap-graded blended cements are conventionally viewed as being too complex for industrial practice" and proposed using "[c]ommercial Portland cements . . . manufactured by a vertical roller mill," which reduced the substitution level from 75% to 55% compared to earlier gap graded ternary blends of the first publication. See Zhang, et al., "Influence of preparation method on the performance of ternary blended cements," *Cement & Concrete Composites* 52 (2014) 18-26, 19 ("Zhang II"). In contrast, the use of a fine interground particulate component, as disclosed herein, is a major departure from and is superior to the two different approaches taken by Zhang et al. because (1) it is simple to make and suitable for industrial practice, in contrast to the gap-graded blended cements of Zhang I, and (2) it permits a substantial reduction in the d90 of the hydraulic cement particles compared to OPC, in contrast to the gap-graded blended cements of Zhang II using OPC, in order to reduce or eliminate wasted cement particles that are too coarse to fully hydrate, even after months or years.

In addition, the fine interground particulate component permits the inclusion of finely ground SCM particles without requiring a separate grinding step as required in Zhang I and II. Combining the grinding of fine hydraulic cement and SCM particles permits the manufacture of a fine interground particulate component containing both materials in a single milling process, which is industrially practical, in contrast to the gap graded blends of Zhang I, and is more industrially practical than blending commercial Portland cement with a fine SCM, the entirety of which must be processed separately from the Portland cement, as in Zhang II. Moreover, to the extent that the SCM particles are softer and/or are more easily ground compared to cement clinker, the fine interground particulate component can have an approximate bimodal distribution in which the SCM particles are more concentrated in the finer region of the PSD and the cement particles are more concentrated in the coarse region of the PSD of the overall interground component. In this way, the fine interground particulate component can more closely resemble the fine SCM and narrow PSD cement components of the gap graded ternary blends of Zhang I, which permitted SCM substitution levels of up to 75%, rather than 55% when simply using OPC as a compromise measure as in Zhang II.

And even in those embodiments in which the fine interground particulate component is not bimodal, it can still contain a substantial quantity of very fine SCM particles, which reduces the quantity of very fine cement particles by dilution and thereby improves workability (e.g., by significantly increasing spacing between and reducing flocculation of very fine cement particles). Moreover, the fine interground SCM particles are very reactive, either pozzolanically and/or as high quality nucleation sites that promote faster cement hydration. Finally, the fine interground particulate component includes hydraulic cement particles with reduced d90 compared to OPC and conventional interground blended cement. This reduces or eliminates the preponderance of coarse cement particles that may never fully hydrate so that the hydraulic cement fraction can substantially fully hydrate within a standard defined time period. This is not possible using OPC, conventional interground blended cement, conventional non-interground blends, or conventional self-blending methods at concrete plants.

The coarse particulate component provides coarse SCM particles that complement the fine interground particulate component, raise the d90 of the overall cement-SCM blend or composition, and broaden the PSD of the overall blend or composition compared to the fine interground particulate component by itself. This permits the overall cement-SCM composition to have any desired PSD, such a PSD similar to, or even broader than, a Fuller distribution, which is conventionally viewed as being the ideal PSD of OPC (although modern grinding practices have significantly departed from the Fuller PSD model in favor of using steeper/narrower PSD cements in order to increase early strength).

By way of background, an ideal Fuller distribution is simply a power function used to calculate the percent passing at any given particle size of all particles in concrete, including both cement and aggregates, and has no defined upper and lower particle size limits although an arbitrarily defined maximum particle size can be used for each type of particle being considered (e.g., coarse aggregate, fine aggregate, and cement):

$$P(d)=(d/d_{max})^q$$

where:
d=particle diameter
$d_{max}$=maximum particle diameter in the mixture
q=parameter (0.33-0.5) based on fineness or coarseness
P(d)=size cumulative distribution.

The assumed "ideal" power is about 0.45 but might be higher for finer particle fractions, such as cement or blended cement. Because the Fuller model contains no defined or "ideal" maximum cement particle size, one must be assigned arbitrarily. In current practice, the d90 (or particle size diameter with a percent passing of 90%) is typically selected to be 45 µm, which is lower than cements used in the past, which were significantly coarser, had broader PSDs than modern OPC, and often yielded more durable concrete. Some of this is driven by the industry trend of increasing the early strength development of OPC (e.g., because engineers most often specify 28-day strength, not long-term strength, as the standard). It has been observed, however, that concrete that is decades or even 100 years old is often stronger and more durable than newer concrete made using finer cements. Thus, selecting a d90 of 45 µm is arbitrary and not dictated by the Fuller equation.

Another driving factor is the tendency of modern and more efficient mills, such as vertical roller mills and horizontal grinding rolls, to produce narrow rather than broad PSD cement. Because narrow PSD cements made using modern mills often have fewer fine particles (e.g., FIG. 1B) compared to broader PSD cements (e.g., FIG. 1A), they further deviate from a modified Fuller distribution arbitrarily narrowed by lowering the d90. Thus, it may be necessary to further reduce the d90 just to maintain the same "standard" Blaine number (e.g., 350-450 $m^2/kg$) that customers perceive to be ideal or desirable. Moreover, the current trend among cement producers desirous of making "green cement" is to grind blended cements even more finely than OPC in an effort to boost reactivity and offset strength loss. As more cement producers adopt efficient modern mills, and especially if they produce more interground blended cements in an effort to appear "green", the trend toward using cement with ever-narrowing PSDs will continue, with little opportunity to reverse this trend, and with detrimental consequences as cement producers sacrifice long-term durability for short-term strength increases and lower grinding costs.

The cement-SCM compositions, methods, and systems disclosed herein provide a way to escape this irreconcilably negative trend and the inherent technical limitation of modern grinding mills that prevent them from making broad PSD cements. This is accomplished by separately processing fine and coarse components of blended cements and other cement-SCM compositions. Combining a coarse particulate component comprising coarse SCM particles with a fine interground particulate component comprising fine cement and fine SCM fractions is a major departure from conventional practices. It is a substantial improvement over the manufacture of interground cements, in which the cement clinker and SCM are interground to the final desired Blaine fineness and/or final desired d90 and which typically have a higher Blaine and lower d90 than OPC. It is also a substantial improvement over and major departure from conventional blending practices that blend OPC of standard fineness with SCMs such as fly ash or GGBFS, which contain both coarse and very fine SCM particles, and/or very fine and highly reactive SCMs such as silica fume or nano limestone, which contain no coarse SCM particles. The disclosed compositions, methods, and systems permit for simultaneous reduction in coarse cement particles that do not fully hydrate while maintaining or increasing the preponderance of coarse particles in the overall cement-SCM composition.

In some embodiments, an optional auxiliary particulate component can be included in addition to the fine interground and coarse particulate components. The optional auxiliary particulate component advantageously is not interground with either the fine interground particulate component or the coarse particulate component. This permits the use of supplementary particles that may be readily available and can provide additional properties as desired. The optional auxiliary particulate component can be virtually any hydraulic cement, SCM material, or blend thereof that has not been interground with either the fine interground particulate component or the coarse particulate component. By not intergrinding with either the fine interground particulate component or the coarse particulate component, the optional auxiliary particulate component provides maximum flexibility and permits fine adjustments to the properties of the cement-SCM composition. For example, it may be desirable to supplement the fine interground and coarse particulate components with fine SCMs such as silica fume, which is known to increase both early and late strengths but which is an industrial byproduct of silicon and ferrosilicon manufacture and more expensive than either hydraulic cement or conventional SCMs. And while it may be efficient to simply intergrind limestone as part of the fine interground particulate component, it may be desirable, in some cases, to add additional limestone, such as nano limestone, in order to increase the rate of hydration and early strength formation.

In some cases, it may be desirable to supplement the fine interground and coarse particulate components with conventional OPC or other hydraulic cement to increase the ratio of cement to SCM in the composition, such as to increase heat of hydration and/or early strength (e.g., in cold weather and/or where it is desired to remove forms and/or put the concrete into service more rapidly). In addition or instead of adding hydraulic cement, it may be desirable to supplement the fine interground and coarse particulate components with conventional SCMs, such as GGBFS and/or fly ash, in order to decrease the ratio of cement to SCM in the composition, such as to reduce heat of hydration (e.g., when making thick concrete structures, such as drilling platforms used in the oil and natural gas industries, bridge decks or structural footings and/or pillars) or otherwise increase SCM levels for any desired reason.

The auxiliary particulate component may itself be an interground blend of cement and SCM, but which is not interground with either the fine interground particulate component or the coarse particulate component but merely blended therewith. This permits the manufacture of different types of interground components and blends, which can then be reblended with other blends in different ratios to obtain a wide range of cement-SCM compositions having almost any conceivable range of desired properties.

In short, the ability to supplement the fine interground and coarse particulate components with one or more auxiliary particulate components permits self-blending, as is customary in the concrete industry. It also permits a high degree of fine tuning to the extent that the fine interground and coarse particulate components produce basic general purpose cement that can be used for many or most projects but which cannot be optimized for every conceivable project or situation. In some embodiments, the cement-SCM compositions can be engineered to produce higher strength than the same quantity of OPC at the same or similar w/cm. This permits the use of less overall binder in concrete to yield the same strength and/or replacement of a portion of the cement-SCM composition with additional SCM.

A. Fine Interground Particulate Component

As used herein, the term "fine interground particulate component" includes a cement-SCM material that is made, at least in part, by intergrinding hydraulic cement (e.g., Portland cement clinker) with one or more SCMs (e.g., slags, pozzolans, ashes, and fillers). Alternatively, the term "fine interground particulate component" includes first and second SCM components and is made, at least in part, by intergrinding a coarse SCM material (e.g., clinker or granules at least 1-3 mm in size, such as metallurgical slag, limestone, geologic minerals, recycled pozzolans, e.g., glass, bricks, ceramics, etc.) with one or more other SCMs (e.g., which can be coarse or fine). As a general rule with few, if any, exceptions, the fine component made by intergrinding two or more different materials will be significantly different than the material produced by separately processing and then blending the same two or more different materials together.

This is particularly true in the case of cement clinker, which typically has multiple compounds (i.e., clinker minerals) that form separate crystalline structures that are agglomerated together in each clinker nodule, and almost any SCM, which, by definition, is primarily not a hydraulic cement (although it may have some self-cementing properties if it contains a sufficient quantity of calcium oxide) and will have very different chemical and physical characteristics. Pozzolanic SCMs will contain a substantial quantity of glassy, amorphous silica, which is generally not contained in cement clinker in significant quantities, and, with few exceptions, will contain little, if any, of the four clinker minerals of Portland cement (GGBFS may contain calcium silicates, but in much smaller amounts than cement clinker). Non-pozzolanic SCMs, such as limestone, will contain neither cement clinker minerals nor amorphous and pozzolanically reactive silica. Many SCMS, such as limestone and certain pozzolans, can be significantly softer and more easily ground than cement clinker. Other SCMs, such as GGBFS, steel slags, and certain ashes, can be harder than cement clinker and therefore harder to grind.

The probability that an SCM exists that will have the exact same grinding characteristics as cement clinker, other selected hydraulic cement, or SCM granules is low. At the very least, the PSD of each material fraction within a fine interground particulate component will differ in some way compared to the same material if milled separately (e.g., with respect to at least one of the dl, d5, d10, d15, d25, d35, d50, d65, d75, d85, d90, d95, or d99). Such variations can be extrapolated by comparing the different PSDs of 100% cement clinker and interground blends of the same cement clinker and natural pozzolan as illustrated in FIGS. 2A-4A. The variability even among different natural pozzolans is quite evident by noting the very different morphologies and glassiness of the two natural pozzolans in FIGS. 5A and 5B, as well as the observation that it was easier and required less energy to intergrind the pozzolan of FIG. 5A with cement clinker than intergrinding the pozzolan of FIG. 5B with the same clinker and at the same ratio of materials.

Moreover, intergrinding is believed to form a more intimate and uniformly blended mixture of two or more different components compared to separate processing and simply blending. While separate processing and simple blending of coarse particles to yield a coarse blend may achieve similar blending uniformity as intergrinding, that is not the case with very fine materials, which contain orders of magnitude more particles than coarse materials. The extremely large number of particles coupled with more particle-particle interactions in the case of fine particulate materials, make blending uniformity much more difficult. Thus, intergrinding two or more components to yield a finely ground blend is far more likely to yield an intimate and uniformly blended mixture than separate processing and simple mixing of the same fine materials.

Achieving a certain level of uniformity that is largely unachievable through simple blending can be particularly beneficial in the case of blends of fine cement and SCM particles. One of the problems with the very fine cement particles in OPC is their tendency to flocculate when first mixed with water, which greatly increases viscosity and yield stress and decreases flow and workability. Common ways to modify concrete having inadequate flow and workability include adding more water, which substantially reduces strength by increasing the water-to-cement ratio (w/c) and can be harmful, adding a water reducer/dispersant to at least partially deflocculate and disperse the cement particles, and/or introducing energy into the concrete by mixing or vibration. Intergrinding cement and SCM to yield a more intimately mixed blend than is possible by separate processing and simple blending can be particularly beneficial where the fine SCM particles are capable of dispersing fine cement particles and reducing flocculation. While SCMs, such as fine fly ash, slag, or other pozzolans, can assist in dispersing fine cement particles and reducing flocculation, this beneficial property is less pronounced when the cement and dispersing SCMs are not well mixed. In such cases, intergrinding should increase the dispersing and deflocculating effect of fine cement particles by the SCM fraction compared to simple blending. This further demonstrates that fine interground blends are qualitatively different than simple blends of fine cement and SCM particles in addition to being physically different (e.g., in terms of PSD and/or morphology).

Figure 2A:
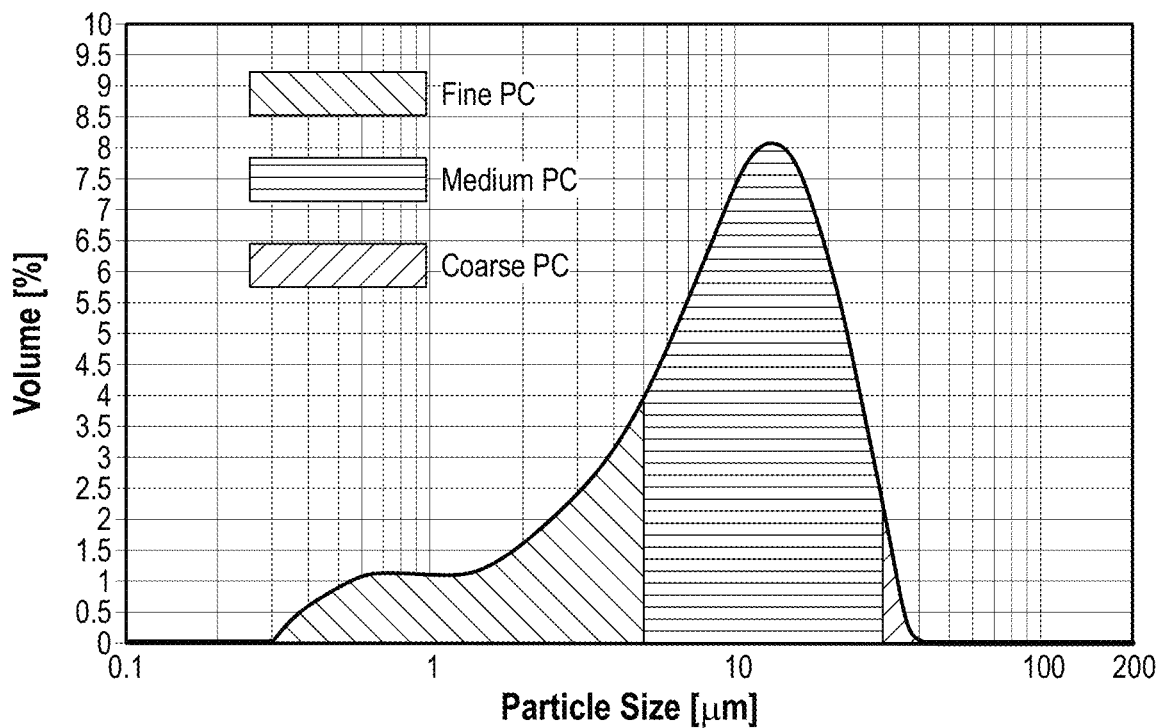
FIG. 2A is PSD chart of a finely ground cement clinker subdivided to show fine, medium, and coarse fractions.
Figure 2B:
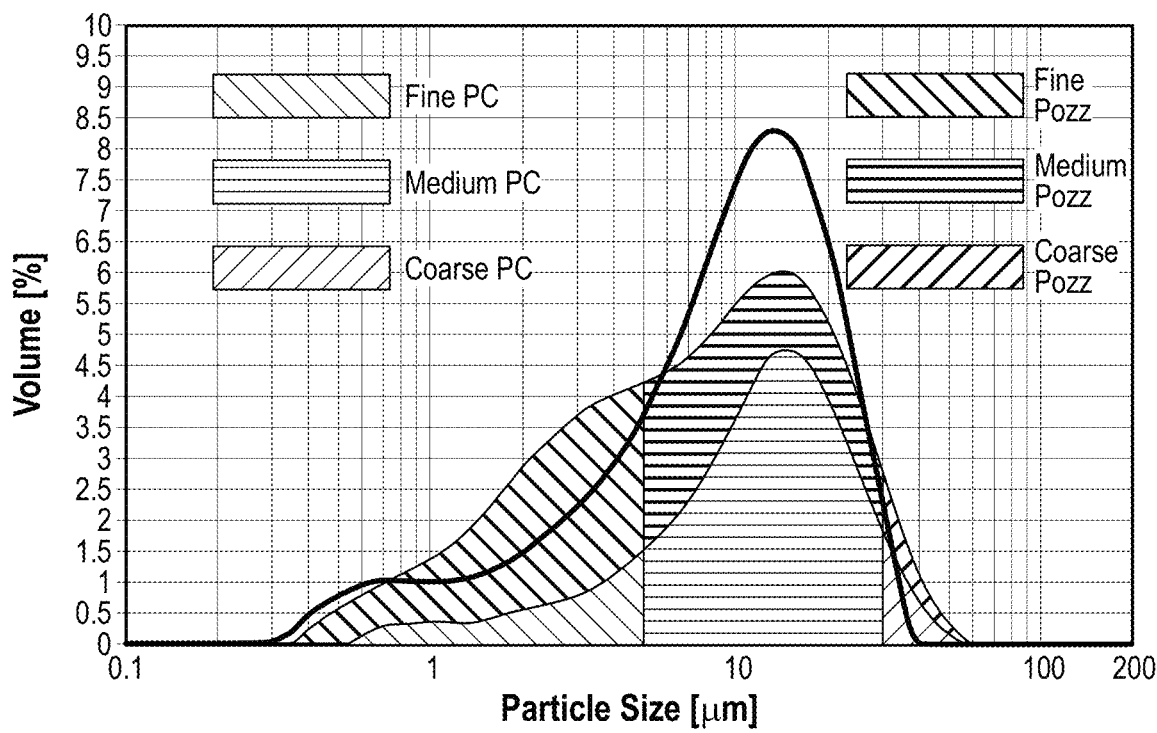
FIG. 2B is a PSD chart comparing the PSD of the finely ground cement clinker of FIG. 2A with the PSD of a finely interground cement clinker and natural pozzolan having an approximate bimodal PSD, with estimated proportioning of the cement and pozzolan fractions within the fine, medium, and coarse fractions.
Figure 3A:
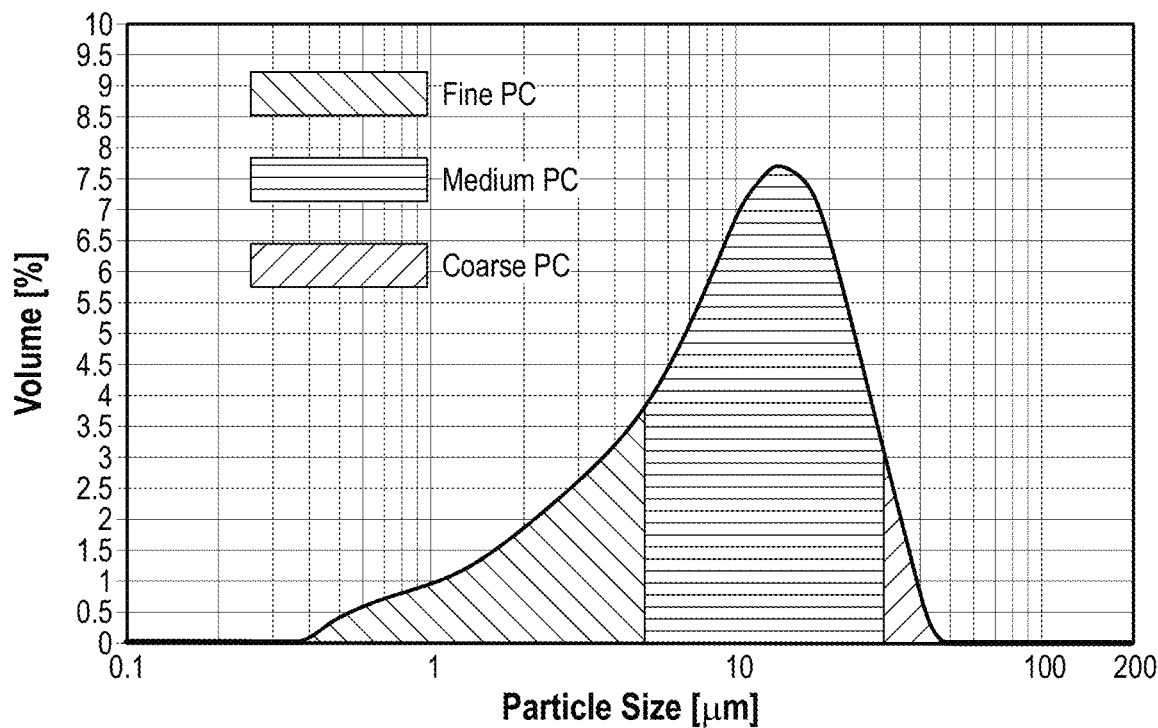
FIG. 3A is a PSD chart of another finely ground cement material made using cement clinker and subdivided to show fine, medium, and coarse fractions.
Figure 3B:
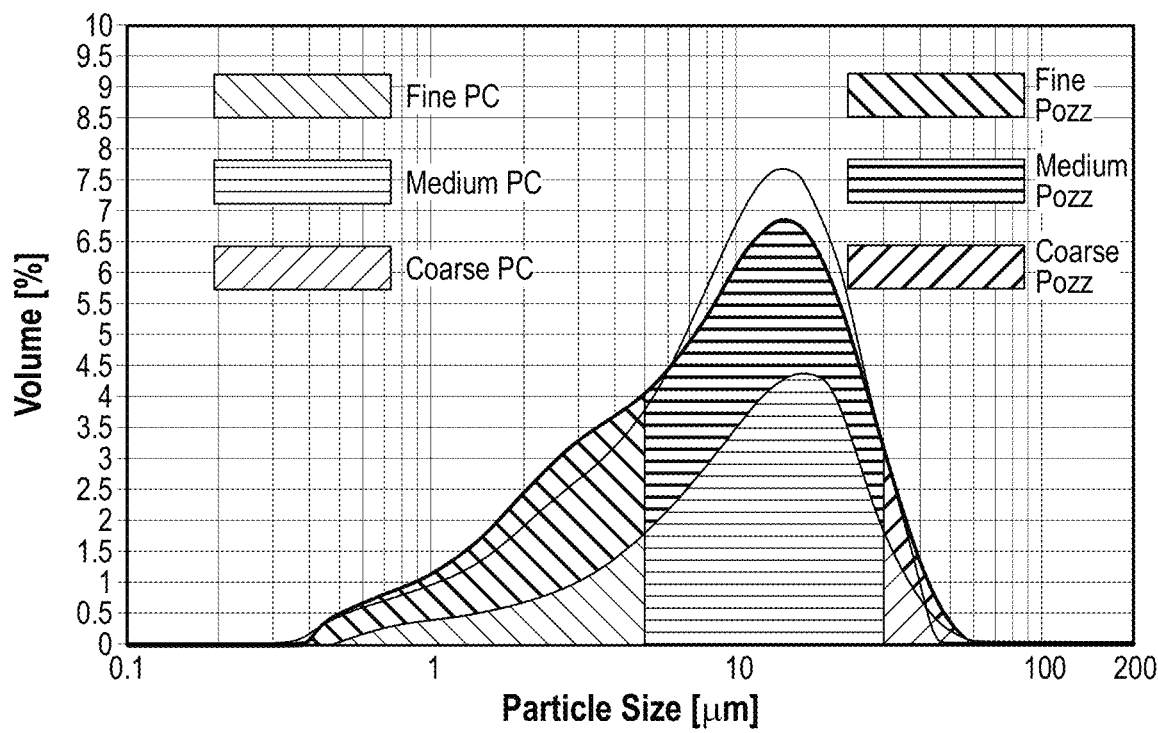
FIG. 3B is a PSD chart comparing the PSD of the finely ground cement material of FIG. 3A with the PSD of another finely interground cement clinker and natural pozzolan having an approximate bimodal PSD, with estimated proportioning of the cement and pozzolan fractions within the fine, medium, and coarse fractions.
Figure 4A:
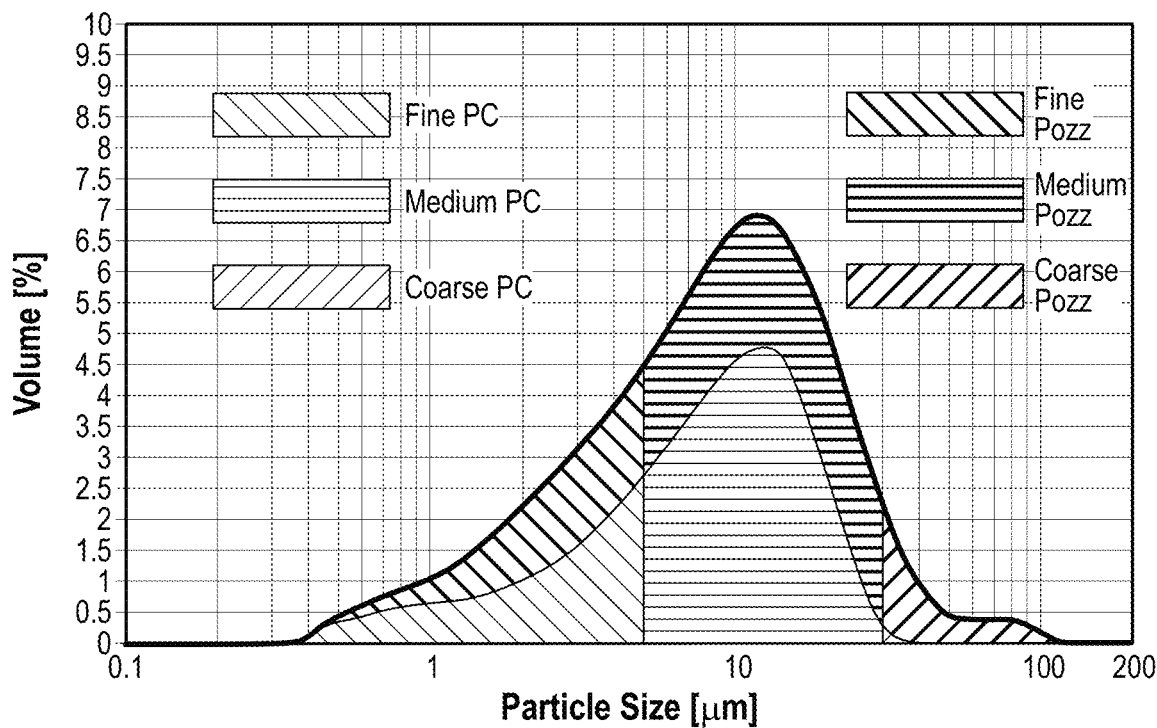
FIG. 4A is graph illustrating the PSD of another finely interground cement clinker and natural pozzolan without an apparent bimodal PSD, with estimated proportioning of the cement and pozzolan fractions within the fine, medium, and coarse fractions.

FIGS. 2B, 3B, and 4A are PSD charts showing data measured by a Malvern Mastersizer 2000 of example fine interground particulate components having hydraulic cement and SCM fractions, which can be used to manufacture cement-SCM compositions as disclosed herein. The interground material of FIG. 4B can be used as an auxiliary blending component. For comparison purposes, FIG. 2A is a PSD chart, illustratively subdivided with fine, medium, and coarse fractions, showing data measured by a Malvern Mastersizer 2000, of a finely ground cement material consisting of 100% Portland cement made from the same batch of Drake cement used for the material of FIG. 1B and milled using the same Pfeiffer VRM. Interestingly, the PSD chart of FIG. 2A has a shape very similar to the PSD chart of FIG. 1B even though the two cements have very different d90s. The finely ground cement material has a d90 of about 22.1 µm, a d50 of about 9.9 µm, and d10 of about 1.8 µm. Compared to the PSDs of the conventional Portland cement materials shown in FIGS. 1A and 1B, the fine cement of FIG. 2A has a substantially lower d90, higher reactivity, and substantially fewer particles, if any, that will not fully hydrate within a standard defined time period (e.g., 28 days). This can be readily seen by comparing the areas under the PSD curves corresponding to the "coarse" Portland cement fraction which, for illustrative purposes, was selected here to be particles >30 µm.

The PSD of the finely ground cement material shown in FIG. 2A is similar to or characteristic of the PSD of Type III rapid hardening cement, as defined by ASTM C-150. As a result, this material is generally unsuitable as general purpose cement for use in making concrete, such as ready mixed concrete, commonly used to manufacture large concrete structures such as drilling platforms, roads, driveways, sidewalks, bridges, buildings, and structural components of buildings. Rapid hardening cement is mainly used for specialty projects and is characterized by higher early strength and lower long-term strength. It is used where it is critical to remove forms very quickly and/or where the concrete must be put into service very quickly (e.g., in less than 7 days).

FIG. 2B graphically illustrates and compares the PSDs of the 100% ground Portland cement clinker of FIG. 2A (bold line curve) and a 50:50 (w/w) interground blend (thin line curve) of the same batch of Drake cement clinker and a natural pozzolan, also obtained from Drake Cement. The PSD chart in FIG. 2B of the 50:50 blend is apparently bimodal and is further subdivided to illustratively show fine, medium, and coarse fractions of each cement and pozzolan fraction. For illustration purposes, the PSD curve of FIG. 2A, which is overlaid over the PSD chart for the 50:50 blend, was used to extrapolate and estimate the relative proportions of fine cement and pozzolan within the fine, medium, and coarse fractions. The PSD curve of the cement fraction in FIG. 2B was assumed to have similar shape as the PSD curves of FIGS. 1B and 2A, with the apparent bimodal feature being attributed to the different grinding characteristics of the softer natural pozzolan interground with the cement clinker.

The clinker and pozzolan were initially pre-blended and then milled using the same Pfeiffer VRM. The interground blend has a d90 of about 24.1 µm, a d50 of about 7.9 µm, and a d10 of about 1.5 µm. The PSD of the 50:50 (w/w) interground blend appears to have an approximate bimodal shape, which suggests a non-uniform distribution of cement and pozzolan particles within the interground blend. Because the energy required to produce the 50:50 (w/w) interground blend shown in FIG. 2B was significantly lower and the throughput was significantly higher than the energy and throughput for the finely ground Portland cement clinker material of FIG. 2A, it is postulated that this may be due to the easier grindability of the natural pozzolan as compared to the cement clinker. This observation, coupled with the fact that the natural pozzolan was finer to begin with, suggests that the finer particles in the 50:50 interground blend (e.g., below the d50) are predominately composed of natural pozzolan particles and the coarser particles (e.g., above the d50) are predominately composed of Portland cement particles. Classifying the interground blend at about 8 µm using a classifier capable of making sharp cuts at this particle size, such as a high efficiency air classifier from Netzsch, and chemically analyzing and comparing the fine and coarse fractions would confirm this.

For comparison purposes, FIG. 3A is a PSD chart, illustratively subdivided to show fine, medium, and coarse fractions, showing data measured by a Malvern Mastersizer 2000 of another finely ground cement material made from Drake cement using the Pfeiffer VRM. The finely ground cement material has a d90 of about 24.4 µm, a d50 of about 10.2 µm, and d10 of about 2.1 µm. Compared to the PSDs of the conventional Portland cement materials shown in FIGS. 1A and 1B, the fine cement material of FIG. 3A has a substantially lower d90, higher reactivity, and substantially fewer particles that will not fully hydrate at 28 days.

FIG. 3B graphically illustrates and compares the PSDs of the finely ground cement material of FIG. 3A (thin line curve) and another 50:50 (w/w) interground blend (bold line curve) of Drake cement clinker and Drake natural pozzolan. The clinker and pozzolan were initially pre-blended and then milled using the Pfeiffer VRM. The interground blend has a d90 of about 24.6 µm, a d50 of about 9.2 µm, and a d10 of about 1.8 µm. Similar to FIG. 2B, the PSD of the 50:50 (w/w) interground blend in FIG. 3B appears to have an approximate bimodal shape, although not as distinctive as in FIG. 2B, which again suggests a non-uniform distribution of cement and pozzolan particles within the interground blend. It is postulated that the finer particles in the 50:50 interground blend (e.g., below the d50) are predominately composed of natural pozzolan particles and the coarser particles (e.g., above the d50) are predominately composed of Portland cement particles. For illustration purposes, the PSD curve of FIG. 3A, which is overlaid over the PSD chart for the 50:50 blend, was used to extrapolate and estimate the relative proportions of cement and pozzolan within the fine, medium, and coarse fractions. The PSD curve of the cement fraction in FIG. 3B was assumed to have similar shape as the PSD curves of FIG. 3A, with the apparent bimodal feature being attributed to the different grinding characteristics of the softer natural pozzolan interground with the cement clinker. Classifying the interground blend at about 9 μm using a classifier capable of making sharp cuts at this particle size and chemically analyzing and comparing the fine and coarse fractions would confirm this.

Figure 3C:
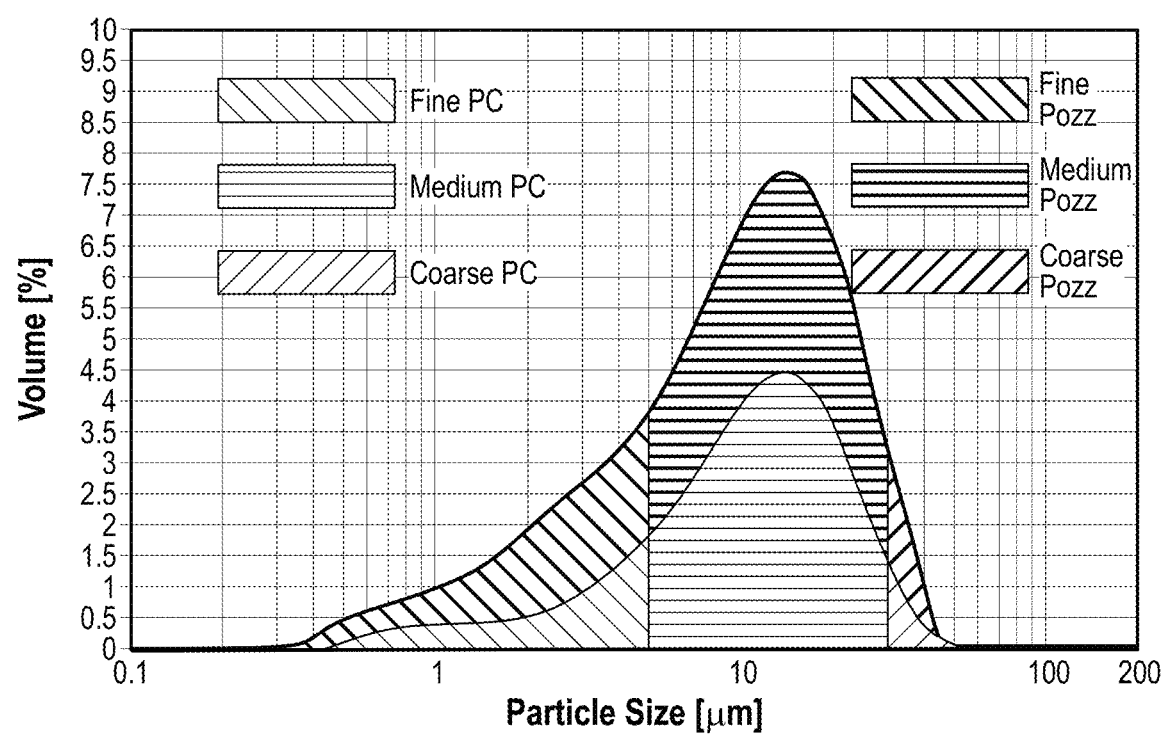
FIG. 3C is a PSD chart of a fine interground cement clinker and natural pozzolan, with estimated proportioning of the cement and pozzolan fractions within the fine, medium, and coarse fractions.

FIG. 3C is a PSD chart of an interground blend of cement clinker and Drake natural pozzolan that does not have an apparent bimodal shape. Nevertheless, the shape of the PSD curve of the cement fraction was assumed to have the same shape as the PSD curves in FIGS. 1B and 2A for the same cement material. On this assumption, FIG. 3C is subdivided between cement and pozzolan materials throughout the PSD curve and still shows a higher preponderance of fine pozzolan particles in the fine particle region and a higher preponderance of cement particles in the medium and coarse particle regions even without an apparent bimodal distribution within the overall interground blend.

FIG. 4A is a chart PSD of a 50:50 (w/w) interground blend of Drake cement and a different natural pozzolan (i.e., "west desert ash") obtained from Jack B. Parsons Ready Mix, located in Utah, a subsidiary of Oldcastle, Inc. The clinker and natural pozzolan were initially pre-blended and then milled using the Pfeiffer VRM. This interground blend has a d90 of about 24.0 μm, a d50 of about 8.8 μm, and a d10 of about 1.9 μm. The PSD of this interground blend does not appear to have a bimodal shape, which might suggest a fairly uniform distribution of cement and natural pozzolan particles throughout the interground blend. Alternatively, because the energy required to produce the 50:50 (w/w) interground blend shown in FIG. 4A was higher and the throughput lower than the energy and throughput for the interground blends of FIGS. 2B and 3B, it is possible this natural pozzolan is harder to grind than cement clinker. In such case, the interground blend might possibly have a higher preponderance of cement particles in the fine particle region and a higher preponderance of pozzolan particles in the coarse particle region. For purely illustrative purposes, the PSD chart is subdivided to show the relative preponderance cement and pozzolan particles within fine, medium, and coarse regions of the PSD curve.

Figure 4B:
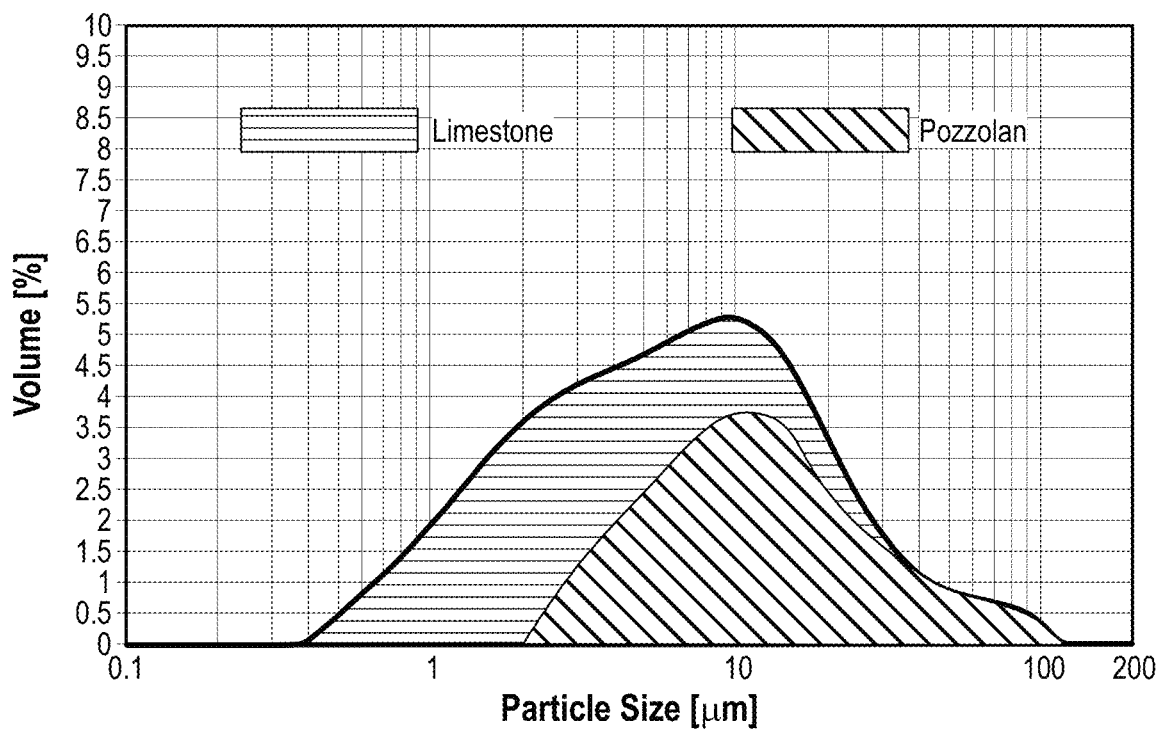
FIG. 4B is graph illustrating the PSD of an interground limestone and natural pozzolan having an approximate bimodal PSD, with estimated proportioning of the limestone and pozzolan fractions within the fine, medium, and coarse fractions.

FIG. 4B is a PSD chart of a 50:50 (w/w) interground blend of limestone and the Parson natural pozzolan. The limestone and natural pozzolan were initially pre-blended and then milled using the same Pfeiffer VRM. The interground blend of limestone and natural pozzolan has a d90 of about 24.2 μm, a d50 of about 6.3 μm, and a d10 of about 1.4 μm. The PSD of this interground blend has an approximate bimodal shape, which suggests a non-uniform distribution of limestone and pozzolan particles within the interground blend. Because limestone is generally softer than cement clinker, because this natural pozzolan appears to be as hard or harder than cement clinker, and because the PSD is broadened compared to the other illustrated PSDs, it is hypothesized that the finer particles in this 50:50 interground blend (e.g., below the d50) are predominately composed of limestone particles and the coarser particles (e.g., above the d50) are predominately composed of natural pozzolan particles. The PSD chart was subdivided for illustrative purposes based on an extrapolation of the PSD curves shown in FIGS. 2A-4B. Classifying the blend at about 8 μm using a classifier capable of making sharp cuts at this particle size, such as a high efficiency air classifier from Netzsch, and chemically analyzing and comparing the fine and coarse fractions might confirm this. The inclusion of finely ground limestone particles can beneficially offset the retardation effect of many pozzolans in cement-SCM blends.

The PSDs of the interground blends in FIGS. 2B, 3B, and 4B suggest that it may be possible to produce a fine interground particulate component having an approximate trimodal distribution formed by three materials of different hardnesses, e.g., a first softer component (e.g., limestone) that predominates in the finest third of the overall PSD of the fine interground particulate component, a second harder component (e.g., natural pozzolan) that predominates in the in the intermediate third of the overall PSD, and a third hardest component (e.g., cement clinker) that predominates in the coarsest third of the overall PSD of the fine interground particulate component.

Figure 5A:
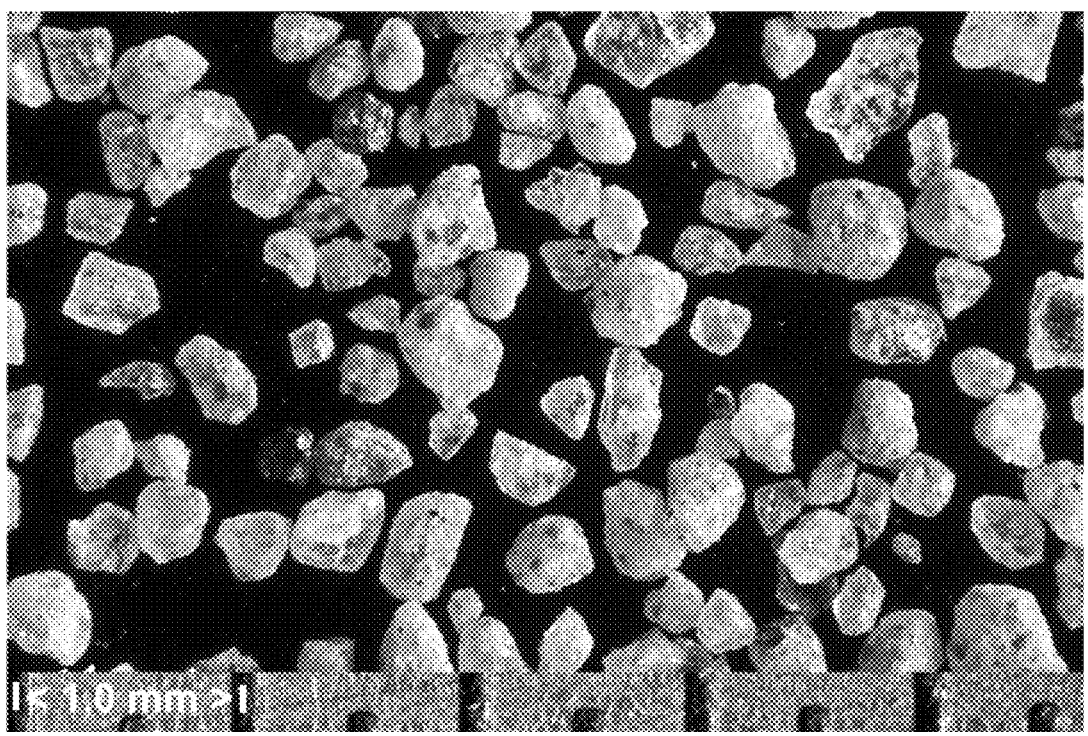
FIG. 5A is a photograph made using a conventional microscope of sieved natural pozzolan particles that are opaque and have a more rounded morphology.

FIG. 5A is a photograph made using a conventional microscope of sieved coarse natural pozzolan particles provided by Drake cement, which is the pozzolan used to make the fine interground blended materials described with reference to FIGS. 2B, 3B, and 3C. The coarse particles appear to be substantially opaque with a generally rounded and somewhat globular morphology. Although the natural pozzolan particles are not spherical like fly ash, their generally rounded morphology should permit them to be a reasonably good coarse particulate SCM material for use in making cement-SCM blends as disclosed herein. Some amount of classifying and/or sieving may be required to control the PSD. Coarse SCM particles having a generally rounded morphology should in theory provide higher fluidity and lower water demand compared to more jagged particles. Nevertheless, because the pozzolan particles are not perfect spheres, they have some uneven surface that might provide for improved pozzolanic reactivity. Intergrinding with cement to make a fine interground particulate material as disclosed herein would likely significantly increase their pozzolanic reactivity.

Figure 5B:
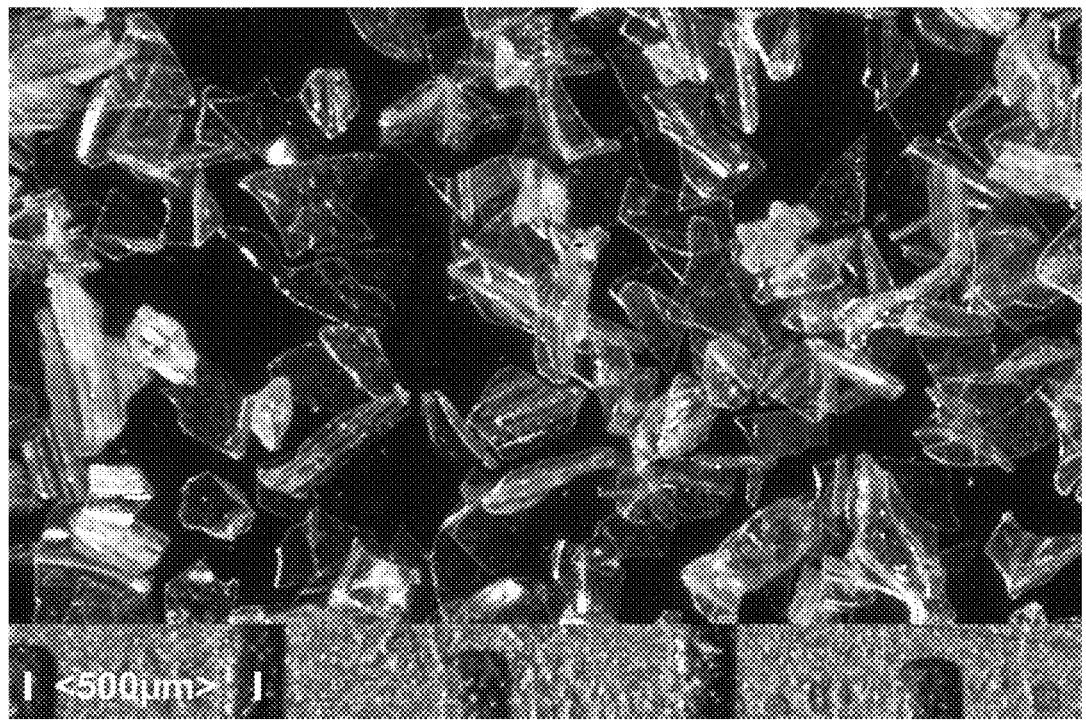
FIG. 5B is a photograph made using a conventional microscope of sieved natural pozzolan particles that have a glassy appearance and a jagged and flat morphology.

FIG. 5B is a photograph made using a conventional microscope of sieved coarse natural pozzolan particles provided by Jack B. Parsons Ready Mix, which is the pozzolan used to make the fine interground blended materials described with reference to FIGS. 4A and 4B. The coarse particles have a glassy, more transparent appearance, suggesting an amorphous rather than crystalline structure and a jagged and more flat morphology. The glassy and jagged nature of these particles might increase their pozzolanic reactivity compared to spherical pozzolanic particles, such as fly ash, of similar size. However, their flat, plate-like morphology may reduce fluidity and increase water demand compared to similarly sized particles having a rounded morphology. Some amount of grinding may produce a coarse particulate SCM material for use in making cement-SCM blends as disclosed herein. Intergrinding with cement to make a fine interground particulate material as disclosed herein would likely significantly increase their pozzolanic reactivity.

In some embodiments, the fine interground particulate component can have a d90 equal to or less than about 45 µm, 42.5 µm, 40 µm, 37.5 µm, 35 µm, 32.5 µm, 30 µm, 27.5 µm, 25 µm, 23 µm, 21 µm, or 20 µm. In such cases, the d90 can be selected so as to be greater than about 10 µm, 11 µm, 12 µm, 13 µm, 14 µm, 15 µm, 17 µm, or 19 µm. In other embodiments, the fine interground particulate component has a d90 equal to or less than about 25 µm, 23 µm, 21 µm, 19 µm, 17.5 µm, 16 µm, 15 µm, 14 µm, 13 µm, 12 µm, or 11 µm. In such cases, the d90 can be selected so as to be equal to or greater than 5 µm, 6 µm, 7 µm, 8 µm, 9 µm, or 10 µm.

In some embodiments, the fine interground particulate component can have a d10 equal to or less than about 5 µm, 4.5 µm, 4 µm, 3.5 µm, 3 µm, 2.75 µm, 2.5 µm, 2.25 µm, 2 µm, 1.75 µm, 1.5 µm, 1.35 µm, 1.25 µm, 1.15 µm, 1.07 µm, or 1 µm. In some embodiments, the d10 of the fine interground particulate component can be equal to or greater than about 0.2 µm, 0.25 µm, 0.3 µm, 0.35 µm, 0.4 µm, 0.5 µm, 0.6 µm, 0.7 µm, 0.8 µm, 0.9 µm, or 1.0 µm.

In some embodiments, the fine interground particulate component can have a d50 equal to or less than about 18 µm, 16 µm, 14.5 µm, 13 µm, 12 µm, 11 µm, 10 µm, 9 µm, 8 µm, or 7 µm and/or equal to or greater than 4 µm, 5 µm, 6 µm, 7 µm, 8 µm, 9 µm, 10 µm, 11 µm, or 12 µm.

In some embodiments, the hydraulic cement and SCM used to make the fine interground particulate component can have different grinding characteristics so that the fine interground particulate component has a particle size distribution (PSD) and includes a hydraulic cement fraction having a d50 (cement d50) and an SCM fraction having a d50 (SCM d50), wherein the cement d50 is either less than, equal to, or exceeds the SCM d50. In some embodiments, the cement d50 exceeds the SCM d50 by at least about 1 µm, 1.5 µm, 2 µm, 2.5 µm, 3 µm, 4 µm, 5 µm, 6.5 µm, 8 µm, 10 µm, 12 µm, or 14 µm. In some embodiments, the fine interground particulate component can have a cement d50 to SCM d50 ratio greater than 1:3, 1:2.5, 1:2, 1:18, 1:1.65, 1:1.5, 1:1.4, 1:1.3, 1:1.25, 1:1.2, 1:1.15, 1:1, 1.15:1, 1.2:1, 1.25:1, 1.3:1, 1.4:1, 1.5:1, 1.65:1, 1.8:1, 2:1, 2.25:1, 2.5:1, 2.75:1, 3:1, 3.5:1, 4:1, 4.5:1, or 5:1.

In some embodiments, the SCM fraction of the fine interground particulate component comprises at least about 5%, 10%, 15%, 20%, 25%, 35%, 40%, or 45% and less than about 90%, 80%, 70%, 60%, or 50% by weight of the fine interground particulate component and/or the hydraulic cement fraction of the fine interground particulate component comprises at least about 10%, 20%, 30%, 40%, or 50% and less than about 95%, 90%, 85%, 80%, 75%, 70%, 65%, or 55% by weight of the fine interground particulate component.

In some embodiments, the fine interground particulate component further includes gypsum, which can be included in an amount that is optimal for the fine interground particulate component by itself or the overall cement-SCM composition. Alternatively, at least a portion of the gypsum required to regulate setting of the cement-SCM composition can be provided as a separate component, such as by some or all of an auxiliary particulate component.

In some embodiments, the fine interground particulate component comprises at least about 15%, 20%, 25%, 30%, 35%, 40%, 50%, or 60% and less than 95%, 90%, 85%, 80%, 75%, 70%, or 65% of the combined fine interground and coarse particulate components.

B. Coarse Particulate Component

As used herein, the term "coarse particulate component" means a material that is predominately or entirely composed of one or more SCM materials and that is not interground with the fine interground particulate component. The coarse particulate component can include any SCM material that is capable of partially replacing hydraulic cement in blended cement and/or when making concrete. The coarse particulate component may also contain a lesser quantity of materials that may be considered to be hydraulic cement, the only requirement being that the coarse particulate component is not interground with the fine interground particulate component. This is because separately processing the fine interground particulate component and the coarse particulate component permits for tighter control of their respective PSDs. In this way, the cement and SCM materials can each be better optimized and more effectively contribute their respective beneficial properties to the overall cement-SCM composition. In addition, the coarse particulate component can have a PSD that complements the PSD of the fine interground particulate component in order to broaden the overall PSD of the cement-SCM composition. This can be used to offset the inability of some milling apparatus to produce a ground cement or blended blend having a desirably broad PSD.

Examples of coarse SCMs include coarse fly ash, such as out of specification fly ash, leftovers from classification, or dedusted fly ash, ground metallurgical slags, steel slag, mine tailings, raw cement kiln feed ("raw meal" or "raw feed"), shale flue dust, bottom ash, ground waste glass, quarry fines from aggregate manufacturer, ground geological materials, ground quartz, ground basalt, ground limestone, calcined and uncalcined clay, silts, sludges, red mud, rock dust, stone dust, marble dust, and the like.

The use of a separately processed coarse particulate component can at least partially offset variability in cement quality that is often observed with interground blended cements. Differences in the grindability of multiple materials can cause differences in the PSD, which can be particularly problematic and difficult to control when the grindability of one or more of the materials fluctuates unpredictably over time. Providing a fine interground particulate component with a lower d90 compared to conventional interground blended cements has been observed to reduce the differences between the PSDs of the different fine sub-fractions in the interground blend, which should result in more uniformity of a more finely ground interground blend than a coarse interground blend when fluctuations in grindability occur. Greater uniformity is further provided by blending the fine interground particulate component with the coarse particulate component, which is not interground with the fine interground particulate component and which can therefore be processed to have a more tightly controlled PSD. Because it is impossible to control the PSD of a coarse SCM when interground with the fine components of a blended cement, separate processing of the coarse particulate fraction is perhaps the only, or at least most predictable, way to reliably control the PSD of the coarse particulate fraction and reduce or eliminate PSD variability. Accordingly, separately processing the fine interground particulate component and independently controlling its PSD, particularly the d90, and also separately processing the coarse particulate component and independently controlling its PSD, particularly the d10 and d90, both contribute to better control of the quality and properties of the cement-SCM composition compared to either intergrinding the entire material in a single process or simple blending of cement and SCM materials that are not particle size optimized to work well with each other.

In some embodiments, a coarse particulate material of SCM particles can be provided with a desired or acceptable d90 and d10 without further processing. In other embodiments, it may be possible or necessary to grind and/or classify and/or sieve an intermediate SCM material to reduce the d90 to within a desired range. In some embodiments, it may be possible or necessary to "dedust" an intermediate SCM material, such as by using air classification and/or sieving apparatus known in the art, to increase the d10 to within a desired range. In other embodiment, commercially available SCMs, such as fly ash and GGBFS, can be used with little or no modification as the coarse particulate component.

In still other embodiments, the coarse particulate component may comprise fly ash, slags other than GGBFS, bottom ash, or other SCMs that would otherwise be considered to be too coarse and/or unreactive to serve as a partial replacement for OPC. For example, in the case where the fine interground particulate component is more reactive than OPC, it may be possible and even desirable to use a coarse and/or less reactive SCM. The present invention therefore permits the use of SCMs that might otherwise be discarded as undesirable, such as fly ash or other pozzolans having a reactivity index that falls below a specified minimum standard (e.g., ASTM C-618).

In cases where an SCM material is classified or dedusted to remove the finest particles and raise the d10 to a desired level, the removed fine material can be used for any purpose where fine SCMs are required or desired. For example, the removed fine SCM particles can be sold as a micro silica material (e.g., as a silica fume substitute). Silica fume and silica fume substitutes often have a market price exceeding the price of OPC, thus providing a value-added way to beneficially utilize the entire SCM material. In some cases, the removed fine SCM particles can be further processed, such as through additional milling as needed, to further increase reactivity and market value.

Alternatively, the removed fine SCM particles can be used as part or all of the SCM feed material used to manufacture the fine interground particulate component. Because the removed fine SCM particles are already very fine to start with, using the removed fine SCM particles as a feed material can reduce grinding cost and/or throughput of the fine interground particulate component and/or it may increase the propensity of forming a bimodal blend, with a higher concentration of fine SCM particles in the finer PSD region of the fine interground particulate component.

In some embodiments, the coarse particulate component can have a d10 equal to or greater than about 1 µm, 2 µm, 3 µm, 4 µm, 5 µm, 6 µm, 8 µm, 10 µm, 12 µm, 15 µm, 20 µm, 25 µm, 30 µm, or 35 µm and a d90 equal to or greater than about 25 µm, 30 µm, 35 µm, 40 µm, 50 µm, 60 µm, 75 µm, 100 µm, 120 µm, or 150 µm and less than about 500 µm, 400 µm, 300 µm, 250 µm, 200 µm, 175 µm, 150 µm, 125 µm, or 100 µm.

In some embodiments, the coarse particulate component has a d50 that exceeds the d50 of the fine interground particulate component by at least about 5 µm, 7.5 µm, 10 µm, 12.5 µm, 15 µm, 17.5 µm, 20 µm, 25 µm, 30 µm, 35 µm, 40 µm, 45 µm, or 50 µm.

In some embodiments, the fine interground and coarse particulate components form a dry blend, which can be distributed to one or more concrete plants and stored in a silo. In other cases, the fine interground and coarse particulate components can be blended in situ, such as when manufacturing dry concrete containing aggregate or freshly mixed concrete that contains water, aggregate, and optionally one or more chemical admixtures. For example, the fine interground particulate component can be distributed to concrete plants as a premium cement blend that is combined with one or more of fly ash, slag, shale flue dust, mine tailings, ground slags, other SCMs, or OPC at the concrete plant. Alternatively, the fine interground particulate component can be used by itself as a substitute for Type III cement or other highly reactive cement binder.

In some embodiments, the coarse particulate component comprises at least about 5%, 10%, 15%, 20%, 25%, 30%, 35%, 40%, 45%, or 50% and/or less than about 85%, 80%, 75%, 70%, 65%, 60%, 50%, 40%, 35%, 30%, 25%, or 20% of the combined fine interground and coarse particulate components.

C. Auxiliary Particulate Component(s)

In some embodiments, cement-SCM compositions may further include at least one auxiliary particulate component, which is advantageously not interground with either the fine interground particulate component or the coarse particulate component. The auxiliary particulate component can be one or more of commercially available hydraulic cements, such as OPC, or commercially available SCMs, such as fly ash (Class C and/or Class F), GGBFS, metakaolin, silica fume, rapid hardening cement, supersulfated cement, magnesium cement, aluminate cement, low $CO_2$ cement, low $C_3S$ and high $C_2S$ cement, calcium salt, magnesium salt, or geopolymer cement.

In some embodiments, the auxiliary particulate component may include auxiliary hydraulic cement, such as for example, hydraulic cement having a d90 less than the d90 of the coarse particulate component and a d10 less than the d10 of the coarse particulate component. In some embodiments, the d90 of auxiliary hydraulic cement may have a d90 that is greater than, equal to, or less than the d90 of the fine interground particulate component.

In some embodiments, the auxiliary particulate component may include an auxiliary SCM material, such as for example, a very fine particulate SCM material having a d90 less than the d90 of the fine interground component and/or a d10 less than the d10 of the fine interground component. Examples include any of the various micro silica materials known in the art, such as silica fume, which is an industrial byproduct formed during the manufacture of silicon and ferrosilicon materials. A very fine auxiliary component may be desirable when the fine interground particulate component is deficient in the quantity of very fine particles, particularly very fine SCM particles (e.g., below 2 µm, which are generally more desirable than cement particles below 2 µm; very fine cement particles increase water demand and cement paste porosity while very fine SCM particles can reduce water demand and reduce paste porosity).

In some embodiments, the auxiliary particulate component may include an auxiliary SCM material containing coarse SCM particles having a d90 greater than the d90 of the fine interground particulate component and/or greater than the d90 of the coarse particulate component. In some cases, the d10 of the auxiliary particulate component can be greater than the d10 of the fine interground particulate component and/or greater than the d10 of the coarse particulate component.

The auxiliary particulate component may comprise ultra-coarse particles, such as unreactive fillers such as ground limestone, ground recycled concrete, quartz, minerals, bottom ash, mine tailings, crystalline metallurgical slags, or other industrial waste materials that have little or no reactivity and are well suited as a non-reactive filler.

The cement-SCM compositions may optionally include at least about 1%, 3%, 5%, 10%, 15%, 20%, 25%, 30%, 35%, or 40% and/or not more than about 80%, 75%, 70%, 65%, 60%, 50%, 45%, 40%, 35%, 30%, 25%, 20%, 15%, or 10% of an auxiliary particulate component.

III. Manufacture of Cement-SCM Compositions

The cement-SCM compositions disclosed herein can be made using commercially available milling, separating, and blending apparatus known in the art, sometimes with modification in order to obtain blends and compositions having a desired PSD. Non-limiting examples of milling apparatus include vertical roller mills, high pressure grinding rolls, horizontal roll presses, ball mills, rod mills, hammer mills, jaw mills, Raymond mills, jet mills, dry bead mills, ultrasonic fracturing mills, and the like. Non-limiting examples of separating apparatus include stand-alone classifiers, classifiers integrated with a vertical roller mill, and sieving apparatus. Non-limiting examples of blending apparatus include planetary mixers, dry rotating mixers, blade mixers, dry stirring apparatus, dry shakers, and concrete mixing apparatus, such as concrete mixing trucks and batch plant mixers. Examples of methods and apparatus for the manufacture and distribution of cement-SCM compositions, or components thereof, are described in the following patent applications, which are incorporated by reference: U.S. Pat. Pub. No. 2012/0145046, Int'l Pat. Pub. No. WO 2012/075208, and U.S. patent application Ser. No. 13/357,121, filed Jan. 24, 2012, and entitled "Methods And Systems For More Efficient Utilization Of Cements And SCMs."

In some embodiments, a method of manufacturing a cement-SCM composition comprises: (1) intergrinding hydraulic cement (e.g., cement clinker) with one or more SCMs to form a fine interground particulate component as described herein; (2) blending, without intergrinding, a coarse particulate component as described herein and the fine interground particulate component; and (3) optionally combining, without intergrinding, an auxiliary particulate component with the fine interground particulate component and the coarse particulate component.

In some embodiments, a method of manufacturing a cement-SCM composition comprises: (A) intergrinding one or more clinkers or granules initially larger than about 1-3 mm with one or more finer particles or powders having an initial particle size less than about 1 mm to form a fine interground particulate component; (B) blending, without intergrinding, the fine interground particulate component with a coarse particulate component comprised of coarse SCM particles; and optionally (C) further combining, without intergrinding, an auxiliary particulate component with the fine interground particulate component and the coarse particulate component. Where fine interground component (A) is insufficiently hydraulically reactive, the auxiliary particulate component may advantageously include hydraulically reactive particles.

In some embodiments, a method of manufacturing a cement-SCM composition comprises: (A) intergrinding (1) a first SCM component and (2) a second SCM component to form a fine interground particulate component; (B) blending, without intergrinding, the fine interground particulate component with a hydraulic cement component; and (C) blending, without intergrinding, the fine interground particulate component and the hydraulic cement component with a coarse particulate component; and optionally (D) further combining, without intergrinding, an auxiliary particulate component (e.g., OPC, SCM, or other material) with components (A), (B) and (C).

In order to ensure that the fine interground and coarse particulate fractions have respective PSDs within desired parameters, it is typically advantageous to periodically sample and accurately determine particle size and PSD, such as by using particle size analyzers and techniques known in the art. For example, PSD can be determined using laser diffraction techniques. An example of a particle size analyzer that is commonly used to determine the PSD of cements and SCMs is a Malvern Mastersizer 2000. Another example is an online laser diffraction particle size analyzer, such as the Malvern Insitec Fineness Analyzer, available from Malvern Instruments (Worcestershire, UK), which can automatically take a series of PSD measurements of the product in real time and, through a feedback loop, such information can be used to modify the grinding and/or classification process to maintain the PSD within a desired range. Other methods for determining or estimating particle size include, but are not limited to, sieving, optical or electron microscope analysis, x-ray diffraction, sedimentation, elutriation, microscope counting, Coulter counter, and Dynamic Light Scattering.

In some embodiments, at least one of the intergrinding or blending processes described herein can be performed at a cement plant that includes a kiln for producing the cement clinker. Such a process may be used, for example, to temporarily or permanently increase production capacity of an existing cement plant without having to build an expensive new pyroprocessing system in parallel to an existing system. Whereas it may take many years to approve and build more clinker producing capacity at an existing cement plant, a grinding-blend facility as described herein can be introduced at a cement plant within a much shorter time period. Not only would this permit a cement producer to meet increased market demand more quickly, it would increase production capacity at much lower capital investment (e.g., at less than 25%, 20%, 15%, or 10% the cost of a fully integrated cement facility).

Alternatively, at least one of the intergrinding or blending processes can be performed at a manufacturing facility that does not include a kiln for producing cement clinker, such as a dedicated grinding and/or blending facility. According to some embodiments, the manufacturing facility can be located at a concrete manufacturing plant, which is a significant departure from conventional cement manufacturing methods.

In some embodiments, the manufacturing facility can be a dedicated grinding-blending facility that imports cement clinker from one or more cement plants, utilizes a local or inexpensively obtained SCM, and distributes the cement-SCM composition to a plurality of concrete manufacturers. This is also a significant departure from conventional cement manufacturing methods. A grinding-blending facility as described herein is analogous to a mini-mill for reprocessing scrap iron and steel, which is far more economical to build and operate than a fully integrated steel mill. And whatever may be the economic viability of a dedicated grinding facility that grinds cement clinker and produces finished cement more efficiently and at lower cost than purchasing finished cement at market price from a fully integrated cement plant, further blending the cement clinker with one or more less expensive SCMs further improves the cost savings. Moreover, optimizing the particle sizes of the cement and SCM materials can reduce cost without sacrificing performance, as typically occurs when making conventional blended cements.

Depending on the location of the dedicated grinding-blending facility, particularly where it is located at a terminal used to import cement clinker from great distances, the dedicated grinding-blending facility can be located at least 200, 300, 400, 500, 750, 1000, 2500, 5000, or 10,000 miles from a cement plant from which it obtains clinker. For example, the dedicated grinding-blending facility is at or includes a terminal configured to receive clinker shipped by boat. By using a locally available SCM, the total net shipping cost and distance for the overall cement-SCM composition can be greatly reduced compared to simply producing OPC from imported clinker.

In some embodiments, a method of manufacturing a fresh cementitious material comprises combining a cement-SCM composition as described herein with water, aggregate, and optionally one or more admixtures. The cement-SCM composition can be provided as a dry blend comprised of the fine interground particulate component, coarse particulate component, and optionally an auxiliary particulate component, stored in a dedicated silo, and dispensed into a mixing apparatus together with water, aggregate, and optionally one or more admixtures. Alternatively, the cement-SCM composition can be formed in situ by combining the fine interground particulate component, coarse particulate component, and optionally an auxiliary particulate component stored in separate silos and dispensed into a mixing apparatus together with water, aggregate, and optionally one or more admixtures.

In some embodiments, a method of manufacturing a hardened cementitious material from a cement-SCM composition comprises forming a fresh cementitious mixture comprising a cement-SCM composition as described herein and causing or permitting the fresh cementitious mixture to harden.

Figure 6:
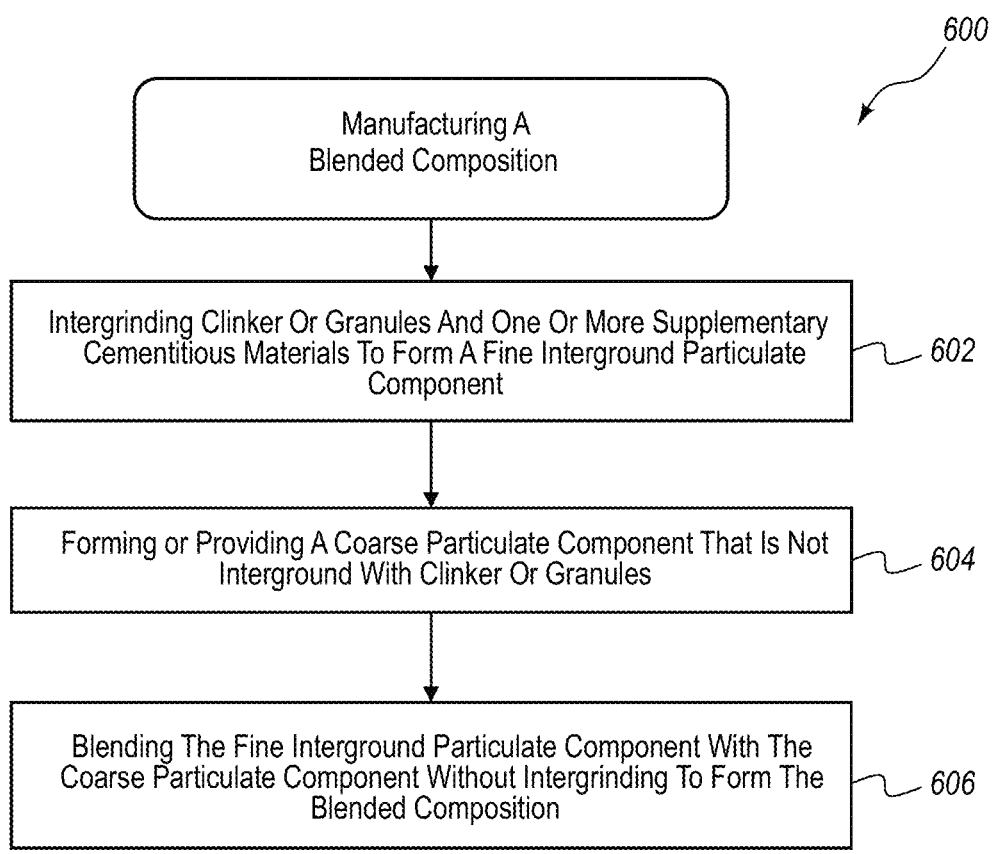
FIGS. 6-9 are flow diagrams illustrating example methods of manufacturing Cement-SCM compositions and/or components thereof.

FIGS. 6-9 are flow charts that illustrate exemplary methods for manufacturing cement-SCM compositions and/or components thereof as disclosed herein. FIG. 6 illustrates a basic method of manufacturing a blended composition (e.g., cement-SCM composition) 600 comprising: step 602—intergrinding clinker (e.g., cement clinker) or granules (e.g., metallurgical slag, aggregate, or ground mineral) and one or more SCMs to form a fine interground particulate component; step 604—forming or providing a coarse particulate component that is not interground with the fine interground particulate component; and step 606—blending the fine interground particulate component with the coarse particulate component without intergrinding to form a blended composition (e.g., cement-SCM composition). To this blended composition may optionally be added one or more other additional components as disclosed herein, such as hydraulic cement, SCM or other component, to yield a modified cement-SCM composition.

Figure 7:
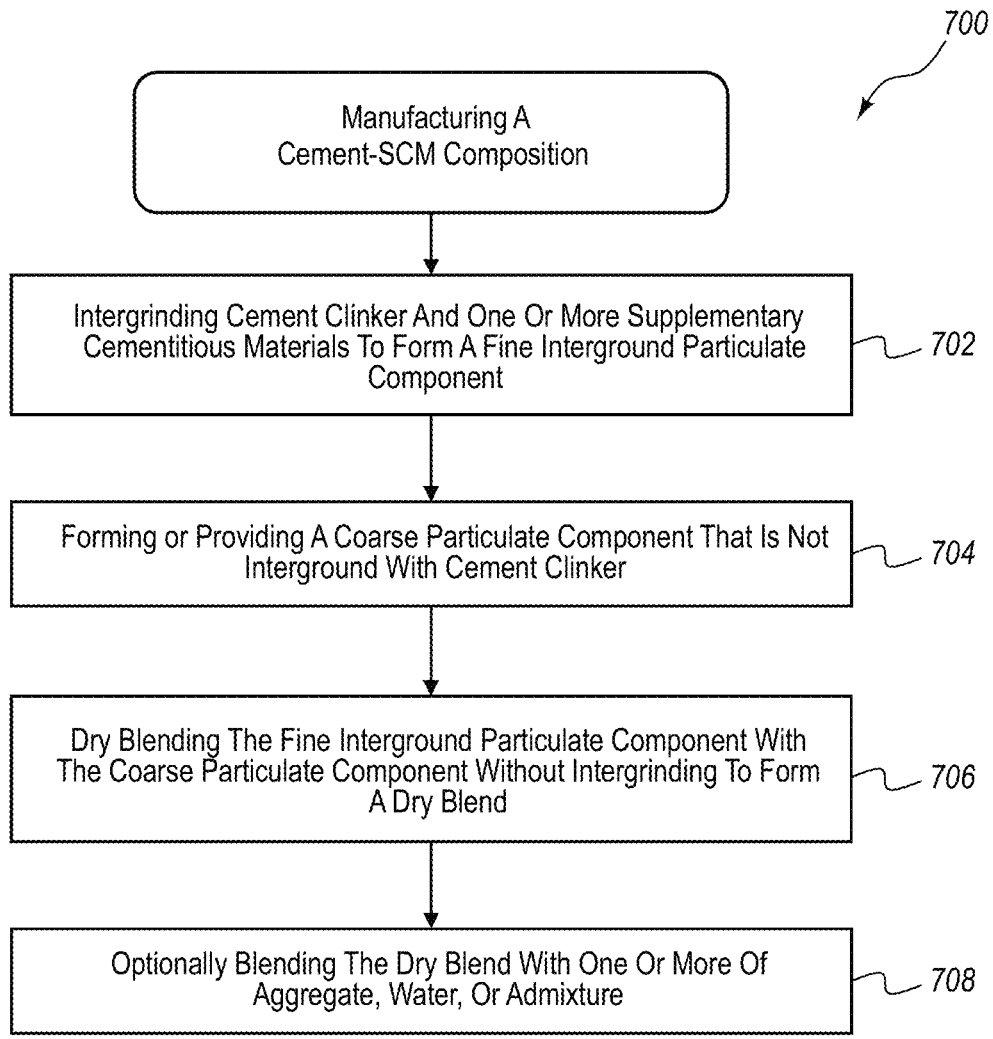

FIG. 7 illustrates a method of manufacturing a cement-SCM composition 700 comprising: step 702—intergrinding cement clinker and one or more SCMs to form a fine interground particulate component; step 704—forming or providing a coarse particulate component that is not interground with the fine interground particulate component; step 706—dry blending the fine interground particulate component with the coarse particulate component without intergrinding to form a dry blend; and step 708, optionally blending the dry blend with one or more of aggregate, water, or admixture. To the cement-SCM composition following either of steps 706 or 708 can optionally be added one or more other additional components as disclosed herein to yield a modified cement-SCM composition.

Figure 8:
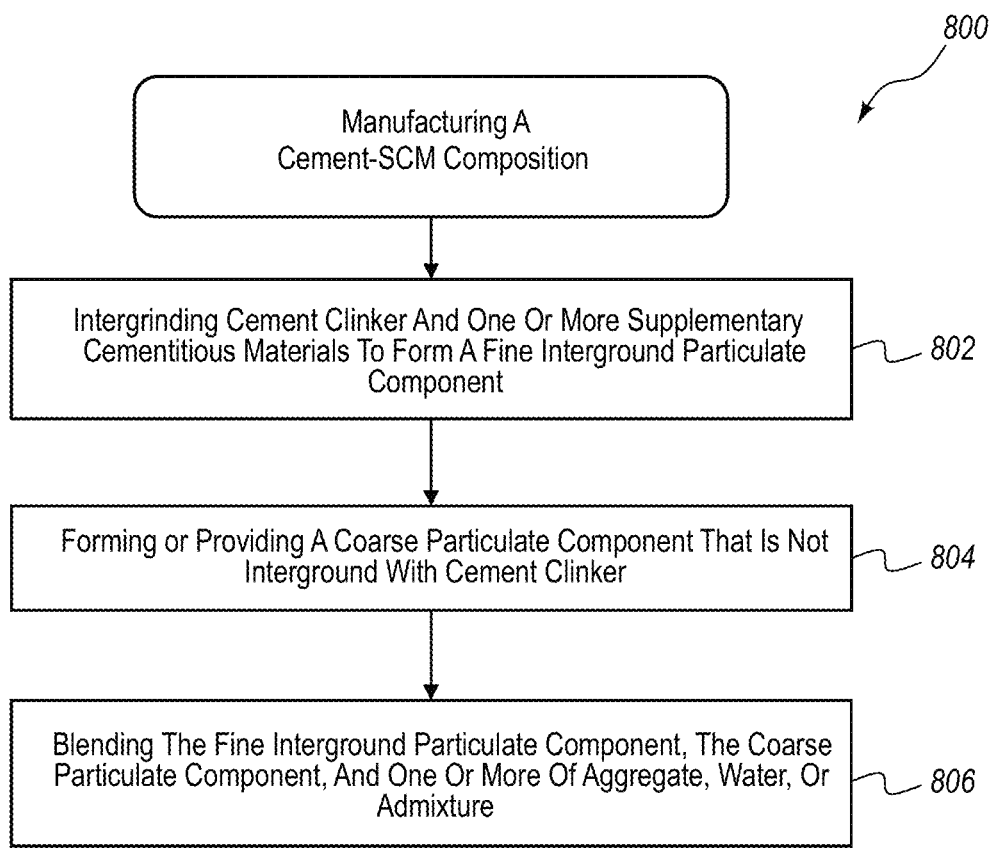

FIG. 8 illustrates another method of manufacturing a cement-SCM composition 800 comprising: step 802—intergrinding cement clinker and one or more SCMs to form a fine interground particulate component; step 804—forming or providing a coarse particulate component that is not interground with the fine interground particulate component; and step 806—blending the fine interground particulate component, the coarse particulate component, and one or more of aggregate, water, or admixture. To the cement-SCM composition, as part of or following step 806, can be added one or more other additional components as disclosed herein to yield a modified cement-SCM composition.

Figure 9:
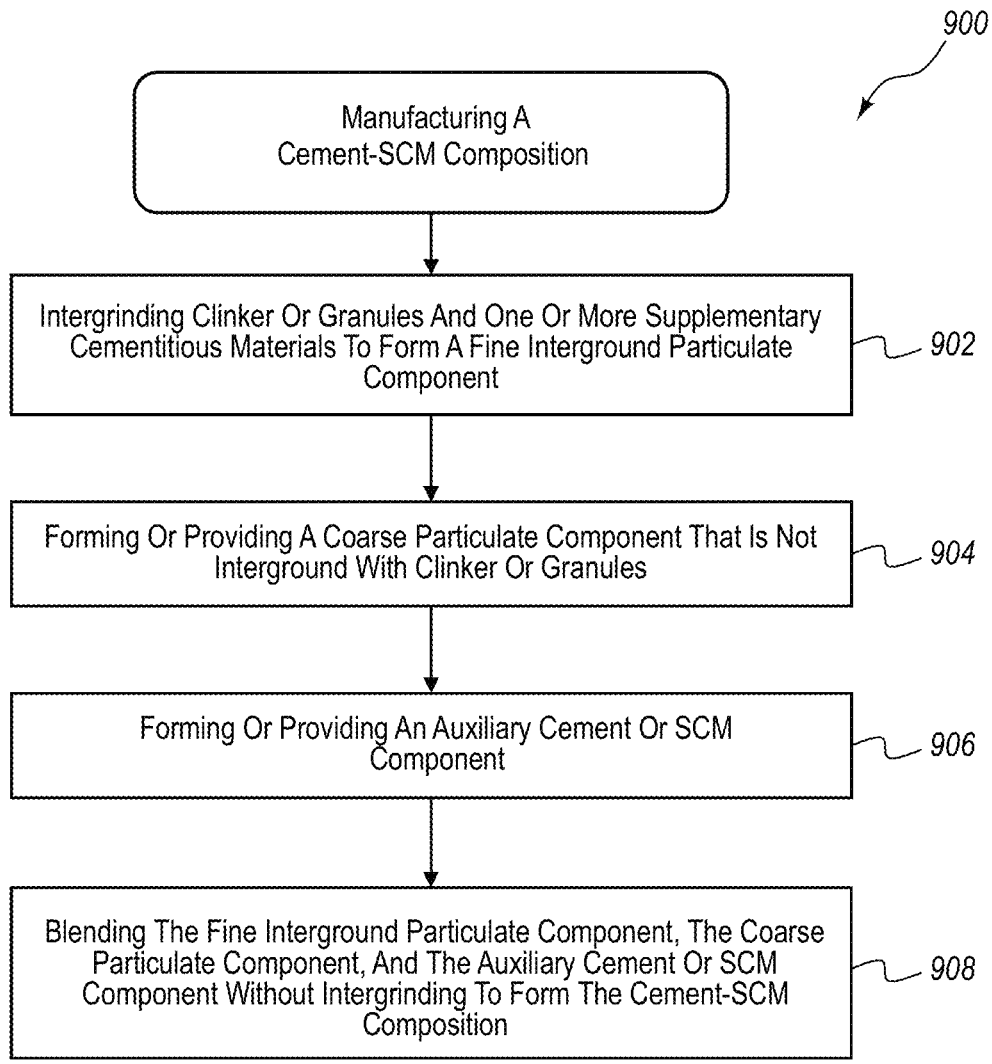

FIG. 9 illustrates another method of manufacturing a cement-SCM composition 900 comprising: step 902—intergrinding clinker or granules, such as cement or SCM, and one or more SCMs to form a fine interground particulate component; step 904—forming or providing a coarse particulate component that is not interground with the clinker or granules of used to make the fine interground particulate component; step 906—forming or providing an auxiliary particulate component, such as hydraulic cement or SCM; and step 908—blending the fine interground particulate component, the coarse particulate component, and the auxiliary particulate component without intergrinding to form the cement-SCM composition. To the cement-SCM composition can be added one or more other additional components as disclosed herein to yield a modified cement-SCM composition.

Although some of the foregoing methods identify "cement clinker" is being interground with one or more SCMs to yield the fine particulate component, it is understood that other granules or clinkers other than cement clinker can be used to form the fine particulate component, such as one that includes a plurality of SCMs. In such case, the source of hydraulic cement (e.g., OPC) can be blended with the fine particulate component to yield a ternary blend of two separate feed streams. This blend can be blended with a coarse SCM without intergrinding to yield a quaternary blend of three different feed streams.

In some embodiments, a system of manufacturing a cement-SCM composition comprises: (A) one more milling apparatus configured to intergrind hydraulic cement (e.g., cement clinker) and one or more SCMs to form a fine interground particulate component; (B) one or more blending apparatus configured to blend, without intergrinding, the fine interground particulate component with a coarse particulate component comprised of coarse SCM particles; and optionally (C) one or more apparatus for combining, without intergrinding, an auxiliary particulate component with the fine interground particulate component and the coarse particulate component.

In some embodiments, a system of manufacturing a cement-SCM composition comprises: (A) one more milling apparatus configured to intergrind one or more clinkers or granules initially larger than about 1-3 mm with one or more finer particles or powders having an initial particle size less than about 1 mm to form a fine interground particulate component; (B) one or more blending apparatus configured to blend, without intergrinding, the fine interground particulate component with a coarse particulate component comprised of coarse SCM particles; and optionally (C) one or more apparatus for combining, without intergrinding, an auxiliary particulate component with the fine interground particulate component and the coarse particulate component. Where fine interground component (A) is insufficiently hydraulically reactive, the auxiliary particulate component may advantageously include hydraulically reactive particles.

In some embodiments, a system of manufacturing a cement-SCM composition comprises: (A) one more milling apparatus configured to intergrind (1) a first SCM component and (2) a second SCM component to form a fine interground particulate component; (B) one or more blending apparatus configured to blend, without intergrinding, the fine interground particulate component with a hydraulic cement component; and (C) one or more blending apparatus configured to blend, without intergrinding, the fine interground particulate component and the hydraulic cement component with a coarse particulate component; and optionally (D) one or more apparatus for combining, without intergrinding, an auxiliary particulate component (e.g., OPC, SCM, or other material) with components (A), (B) and (C).

Figure 10A:
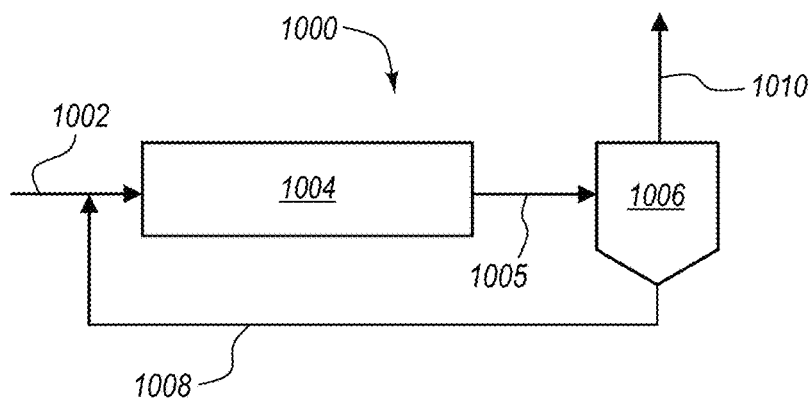
FIGS. 10A and 10B schematically illustrate example milling apparatus for manufacturing one or more components of a cement-SCM composition, including a fine interground particulate component.
Figure 10B:
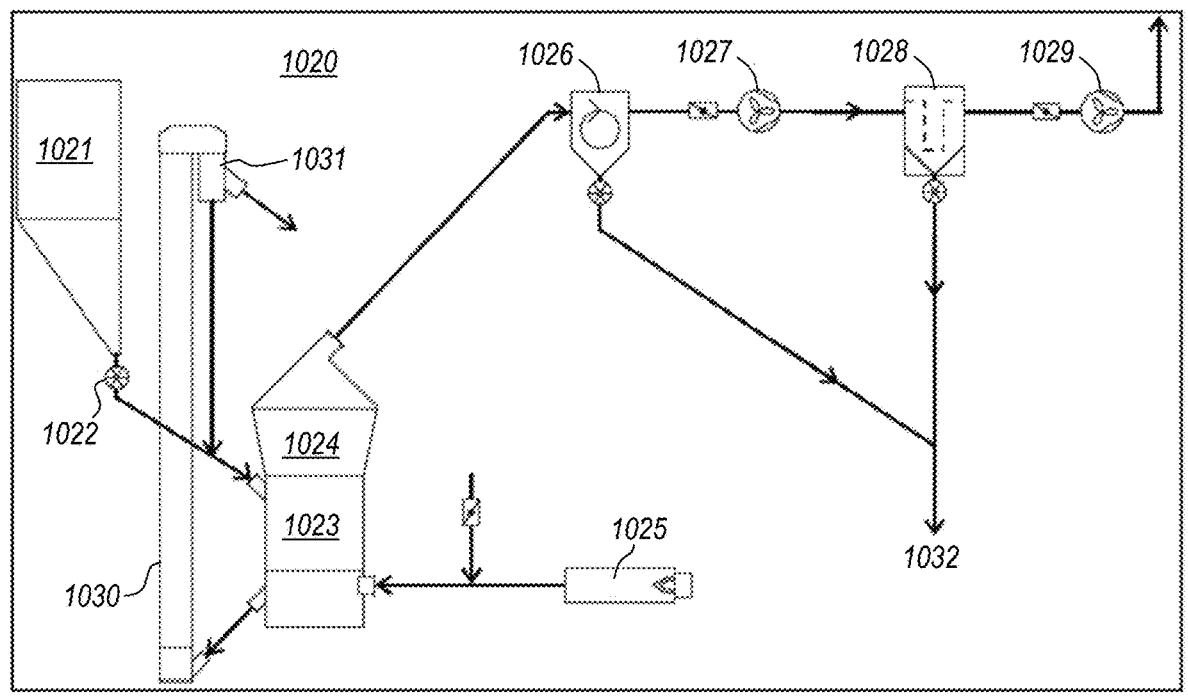

FIGS. 10A and 10B schematically illustrate exemplary milling apparatus that can be used to manufacture the fine interground particulate component and, optionally, in the manufacture at least part of the coarse particulate component and/or the optional auxiliary particulate component.

FIG. 10A more particularly discloses a milling circuit 1000 that includes a transport conduit, conveyor, or apparatus 1002 configured to deliver a stream or mixture of particles, clinker and/or other material to a mill 1004 that comminutes or otherwise reduces the particle size of the material to form a comminuted stream 1005. A separator 1006 integrated with or separate from mill 1004 further processes comminuted stream 1005 and separates it into a coarse fraction 1008, which can be collected as product and/or recycled back to mill 1004 for further comminution, and a fine fraction 1010, which can be collected as product and/or intermediate material that is subjected to further processing using known processing equipment, including, for example, processing equipment disclosed herein. Mill 1004 and/or separator 1006 can be adjusted or modified to produce a fine fraction 1010 having a desired d90, d50, d10 and/or fineness.

Mill 1004 can be any mill used in the art of grinding or comminuting. In the case where mill 1004 and separator 1006 are independent rather than integrated apparatus, mill 1004 can be any known mill that does not include an integrated or internal separator. Non-limiting examples include a ball mill, rod mill, horizontal roll press, high pressure grinding roll, hammer mill, jaw mill, Raymond mill, jet mill, bead mill, high velocity impact mill, acoustic fracturing mill, and the like. Independent separator 1006 can be any known separator, such as a high efficiency air classifier, cyclonic separator, or sieving apparatus.

FIG. 10B more particularly discloses a vertical roller mill system 1020 that includes a feed silo 1021 for storing and delivering a feed material to be processed, metering equipment 1022, such as an auger, for delivering feed material at a predetermined rate, and a vertical roller mill 1023, which receives feed material and mills it using a rotating table (not shown) and rotating stationary rollers (not shown) positioned above the rotating table. A high efficiency classifier 1024 is integrated with and positioned above vertical roller mill 1023. A hot gas generator 1025, which can be powered by natural gas, other fuel, or waste heat from a cement kiln, produces hot gas, which is introduced into vertical roller mill 1023 at a desired temperature, pressure and velocity. The hot gases move upwardly around the outer perimeter of the rotating table within vertical roller mill 1023, where they contact ground particles expelled from the rotating table by centrifugal force and carry at least a portion of the milled particles upward to high efficiency classifier 1024. The hot gases also dry the milled particles. Coarse particles (not shown) that are not carried by the upwardly moving gases to high efficiency classifier 1024 instead drop down below the rotating table, where they are carried by a bucket elevator 1030, passed through a magnetic separator 1031, which separates a waste iron containing stream from a remaining portion of the coarse particles, and the remaining portion is returned to vertical roller mill 1023 (e.g., together with the feed material from feed silo 1021).

High efficiency classifier 1024 separates the milled particles received from vertical roller mill 1023 into a finer fraction, which is carried by the upwardly moving gases to cyclone collector 1026, and a coarser fraction (not shown), which is dropped back onto the rotating table of vertical roller mill 1023 for further milling. The d90 of the finer fraction can be controlled by modifying various parameters of the vertical roller mill system 1020, such as the rate at which the feed material is introduced into vertical roller mill 1023, the pressure exerted on the rotating stationary rollers and transferred to the grinding bed of particles, the speed and/or pressure of the hot gases, and the speed of a rotor containing fins or blades within high efficiency classifier 1024. The d90 can be periodically measured using known PSD-measuring equipment known in the art, such as a laser-diffraction measuring device. A mill fan 1027 assists in causing upward flow of hot gases through vertical roller mill 1023 and high efficiency classifier 1024 and separating milled product 1032 from ultrafine particles, which are collected by a filter 1028 and then combined with milled product 1032 from cyclone collector 1026. A filter fan 1029 assists in moving the ultrafine particles from cyclone collector 1026 toward filter 1028 and expels waste gases into the air.

Figure 11:
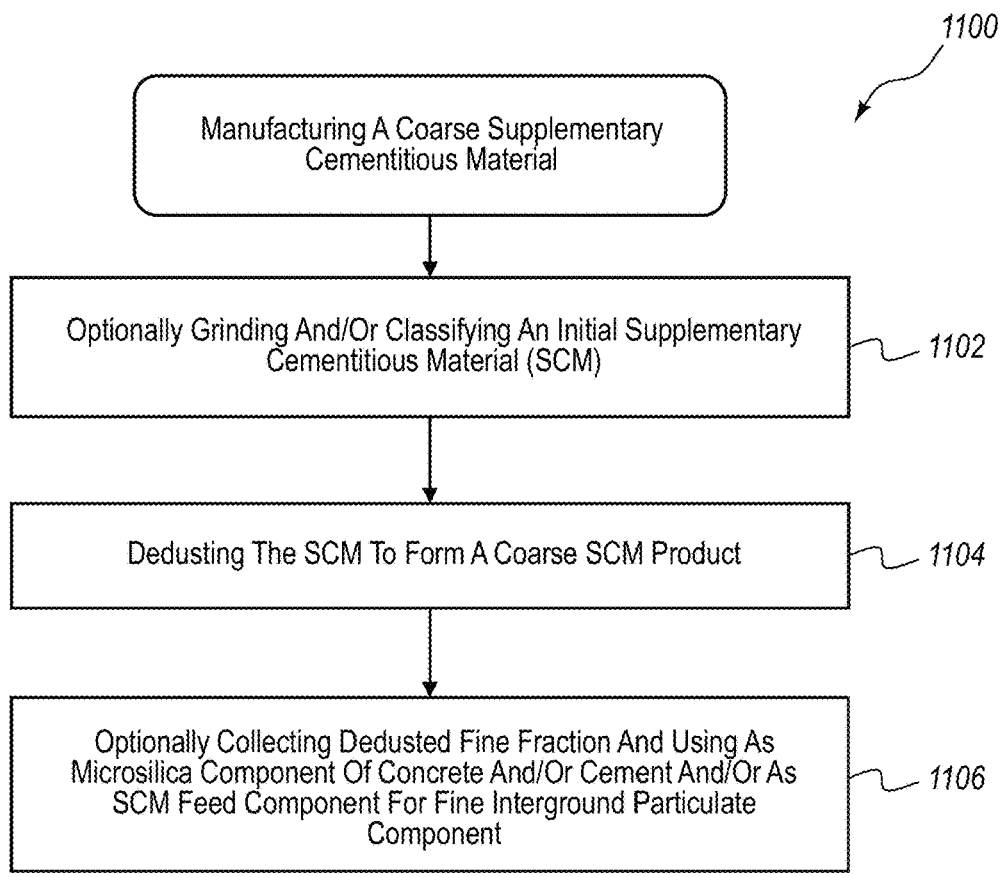
FIG. 11 is a flow diagram illustrating an example method of manufacturing a coarse supplementary cementitious material (SCM), including at least a portion of a coarse particulate component.

FIG. 11 is a flow diagram that illustrates an exemplary method 1100 of manufacturing a coarse supplementary cementitious material comprising: step 1102—optionally grinding and/or classifying an initial SCM; step 1104—dedusting the SCM to form a coarse SCM product; and step 1106—optionally collecting the dedusted fine fraction and using it as desired. For example, the dedusted fine fraction can be used as a micro silica component of concrete and/or blended cement and/or as an SCM feed component for manufacturing the fine interground particulate component. The dedusting process can be performed using known apparatus, such as a high efficiency air classifier that is capable of making sharp cuts or separations, a sieve apparatus, or combination thereof.

Figure 12:
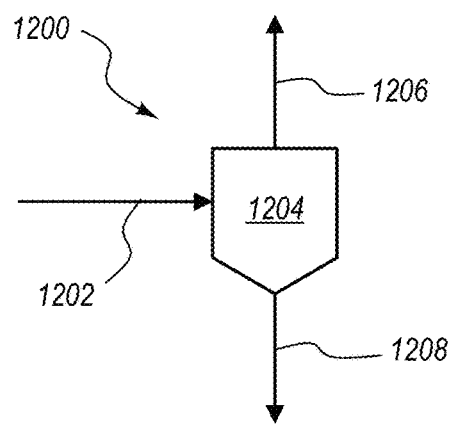
FIG. 12 schematically illustrates an example separation apparatus for use in making one or more components of a cement-SCM composition, including a coarse SCM.

FIG. 12 schematically illustrates an exemplary separation apparatus 1200, which can be used to manufacture one or more particulate components, such as the coarse particulate component and, optionally, in the manufacture of the fine interground particulate component and/or the auxiliary particulate component. The separation apparatus 1200 further includes one or more separation mechanisms 1204 known in the art of particle separation, which receives a stream of particles 1202 and separates the particles into at least a finer particle fraction 1206 and a coarser particle fraction 1208. The one or more separation mechanisms 1204 may also be configured to produce other particle fractions, such as an intermediate particle fraction (not shown) that is less fine than finer particle fraction 1206 and/or less coarse than coarser particle fraction 1208. Examples of one or more separation mechanisms 1204 include apparatus associated with a high efficiency classifier, a cyclonic separator, sieving apparatus, or filter.

Figure 13A:
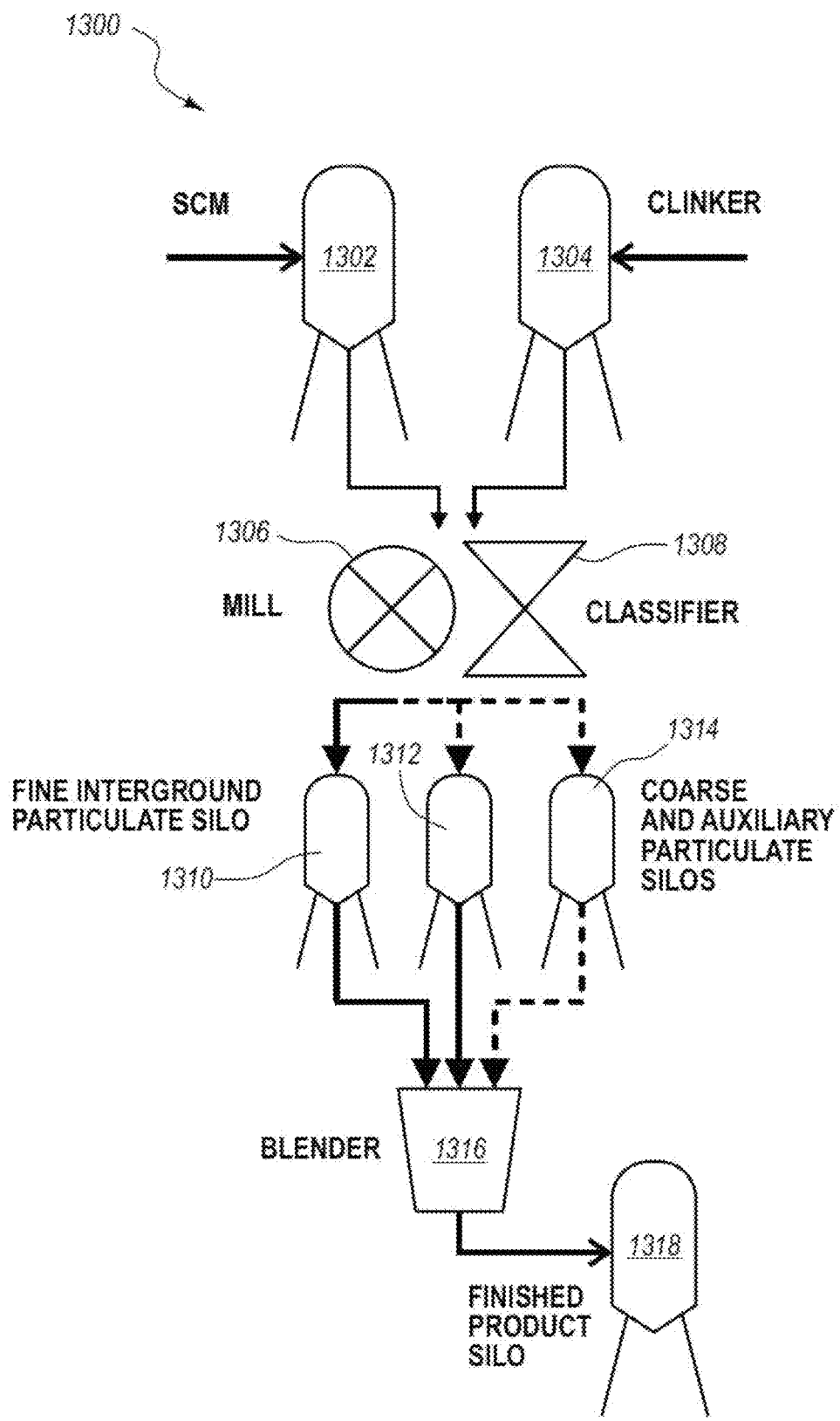
FIGS. 13A-13C schematically illustrate exemplary manufacturing systems for making one or more cement-SCM compositions.

FIG. 13A schematically illustrates an exemplary system 1300 for manufacturing cement-SCM compositions as disclosed herein. System 1300 more particularly includes at least a first storage silo or other container 1302 for a pozzolan or other SCM and a second silo or other storage container 1304 for cement clinker, which can be raw or partially milled clinker or other hydraulic cement material, or other large particulate, clinker, or nodule material. Clinker(s) and SCM(s) from storage containers 1302, 1304 are processed according to methods disclosed herein and/or other methods known to those of ordinary skill in the art, such as by means of one or more grinders 1306 or other milling apparatus and one or more classifiers 1308 or other separation apparatus to yield desired materials for making cement-SCM compositions. These include at least (1) a fine interground particulate component comprising a hydraulic cement fraction and an SCM fraction (or first and second SCM fractions), which can be stored within a fine interground particulate silo 1310, and (2) a coarse particulate component comprising coarse SCM particles, which can be stored within a coarse particulate silo 1312. In addition, an optional auxiliary particulate material can be stored within an auxiliary particulate silo 1314.

In some embodiments, as indicated by the dotted arrow leading to coarse particulate silo 1312, the coarse particulate component may be used as received without milling, dedusting or further processing (e.g., fly ash, GGBFS, shale dust, mine tailings, raw feed for cement kiln, or other SCMs having a sufficient proportion of coarse particles that complement the fine particulate component). While this may sometimes yield cement-SCM compositions that are less optimal than cement-SCM compositions made using milled, dedusted or other further processed SCMs, simplification of the manufacturing process may justify this outcome (e.g., by reducing capital and/or operating costs of the manufacturing facility). In some embodiments, as indicated by the dotted arrow leading to auxiliary particulate silo 1314, the optional auxiliary particulate component may come pre-processed and need not be further processed by apparatus used to process the fine interground particulate component and/or the coarse particulate component.

A blender 1316 can be used to blend the fine interground particulate material, coarse particulate material, and optional auxiliary particulate material to form a finished product, which, in the case of a dry blended composition, can be stored within finished product silo 1318. In other cases, blender 1316 can be a concrete mixer, such as a stationary mixer used for mixing and batching concrete, or a concrete mixing truck used to mix and transport concrete.

Figure 13B:
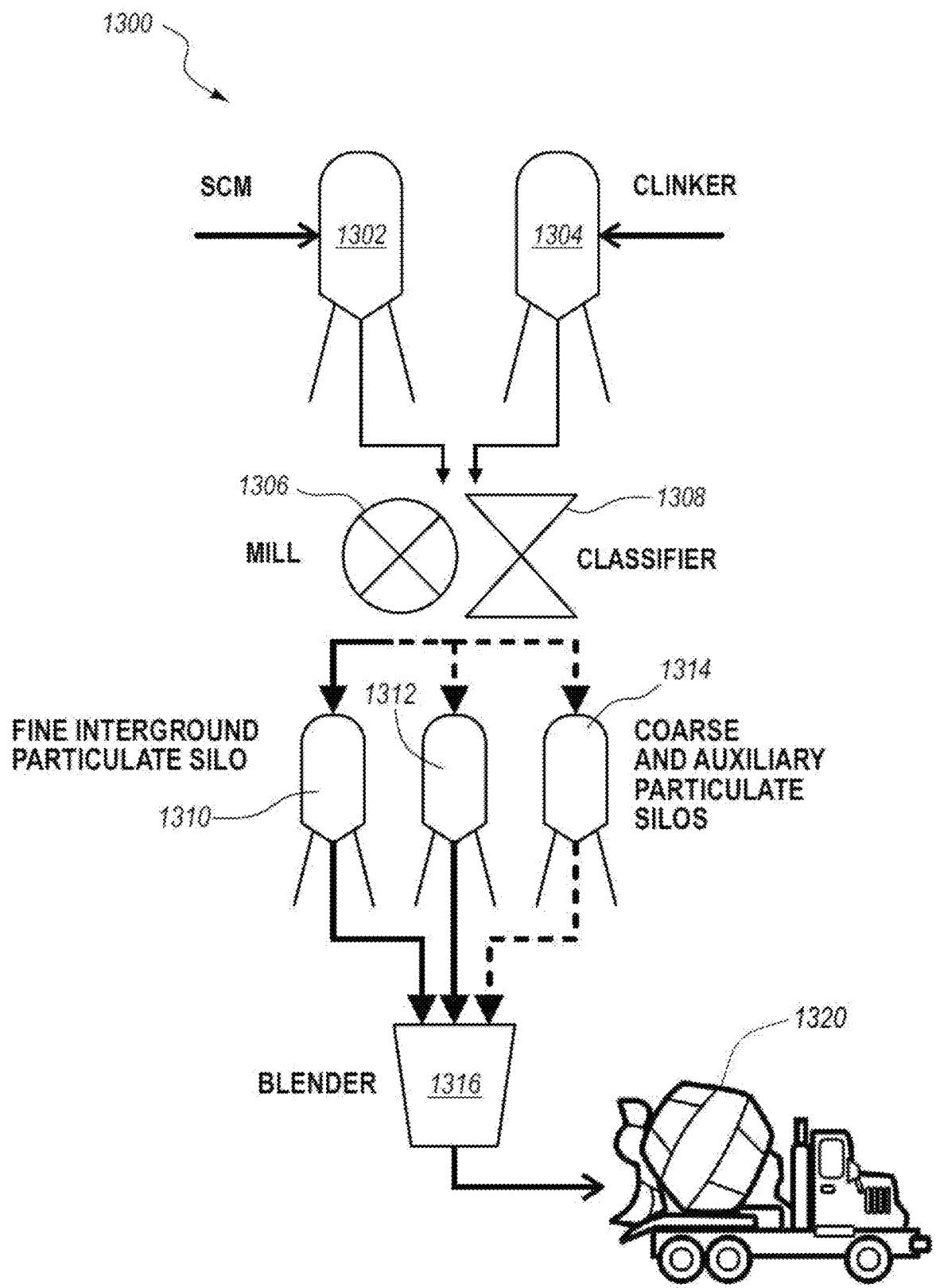

For example, FIG. 13B illustrates a modified system 1300 that includes a blender 1316 that is a stationary mixer used to make a dry blend or fresh concrete mixture that is then fed to a concrete delivery truck or vehicle 1320. If blender 1316 produces a dry blend, water and admixtures can be added directly to concrete delivery vehicle 1320 to form freshly mixed concrete, either at the concrete batch plant, during transport, or at the job site.

Figure 13C:
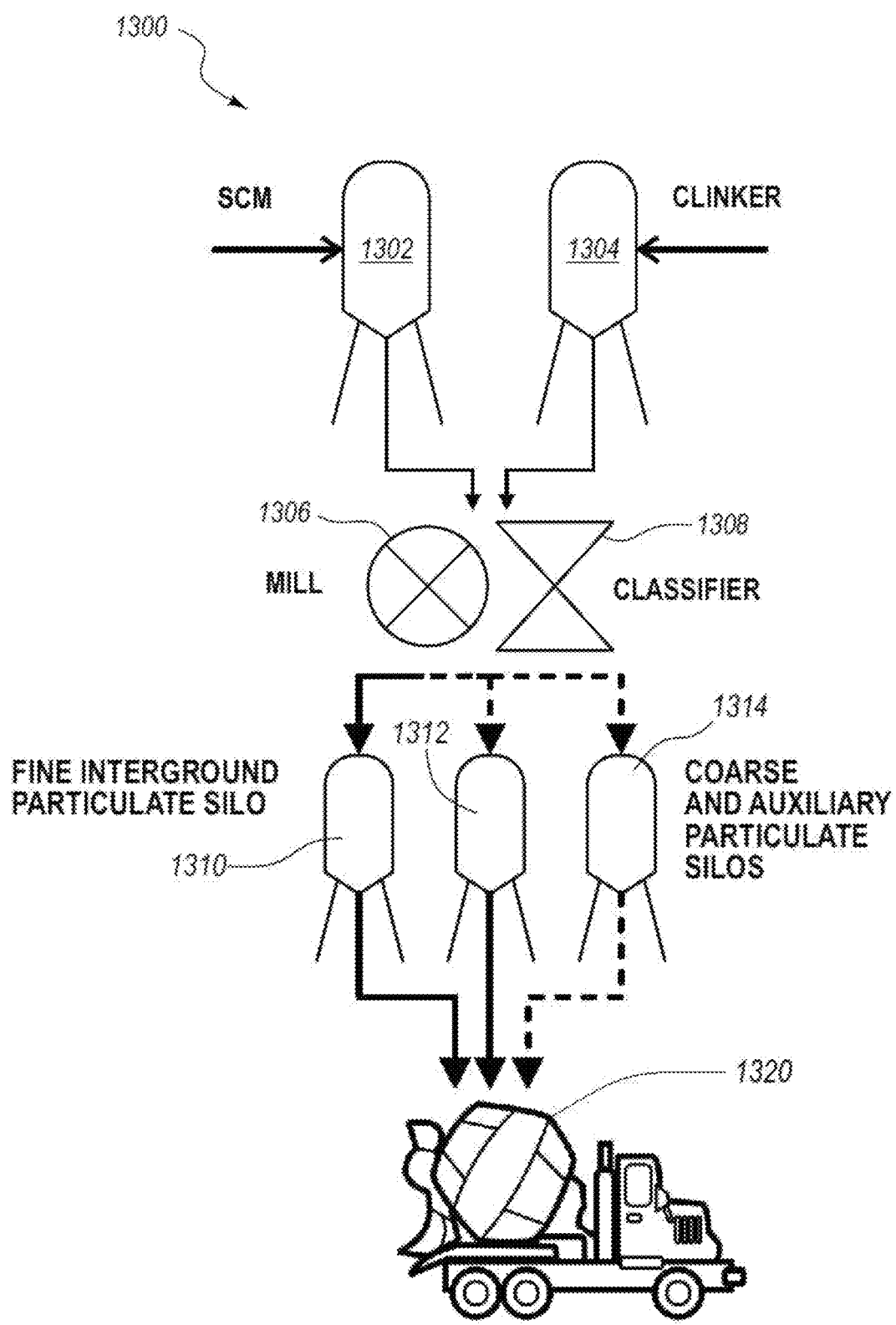

FIG. 13C illustrates yet another modified system 1300 in which the blending apparatus is a concrete delivery truck or vehicle 1320. For example, fine interground particulate silo 1310, coarse particulate silo 1312, and optional auxiliary particulate silo 1314 can be located at a concrete manufacturing plant for dispensing and mixing these material directly within concrete delivery vehicle 1320. As in FIG. 13B, water and admixtures can be added directly to concrete delivery vehicle 1320 to form freshly mixed concrete, either at the concrete batch plant, during transport, or at the job site.

IV. Cementitious Products Made from Cement-SCM Compositions

In some embodiments, cement-SCM compositions disclosed herein can be used as general purpose or specialty cements in place of OPC and other hydraulic cements known in the art. They can be used as sole or supplemental binder to make concrete, ready mix concrete, bagged concrete, bagged cement, mortar, bagged mortar, grout, bagged grout, oil well cement, molding compositions, or other fresh or dry cementitious compositions known in the art. The cement-SCM compositions can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to a cementitious composition continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, ornamental stone, and the like.

V. Examples

The following examples are provided to illustrate example cement-SCM compositions that can be made according to the disclosure. Comparative Examples are also provided to assist in understanding differences and advantages of the inventive cement-SCM compositions and the inventive methods for making cement-SCM compositions compared to other blended cements and methods for making blended cements.

In addition, an analysis of empirical data from the Comparative Examples relating the strength and workability was used by the inventor to develop an analytical framework and proposed methodology for analyzing existing blended cements and designing and manufacturing blended cements and other cement-SCM compositions. The proposed analytical framework and methodology includes: (1) the three fundamental optimization principles described above (Principles 1-3) for designing and producing well-optimized blended cements; (2) the process described above for analyzing different blended cements to determine how well they comply with the three fundamental principles to produce an optimization score; and (3) the process described above for predicting permissible SCM replacement levels based on the optimization score. A description of how each category of blended cement in the Comparative Examples was analyzed and assigned an optimization score is set forth below. A description of how these scores can be used to predict permissible SCM replacement levels for other blended cements based on their optimization scores is also provided.

As described below, the blended cements shown in the Comparative Examples had SCM replacement levels of 20%, 35%, 55%, and 75%, respectively, with estimated assigned optimization scores of 2.0, 2.5, 3.0, and 4.0, respectively. Coupled with a proposed baseline optimization score of 1.0 for 100% OPC, the proposed analytical framework provides a comparative tool that involves well-spaced SCM substitution levels ranging from 0-75% with well-spaced optimization scores ranging from 1.0-4.0. Using the proposed analytical framework and methodology, one can readily and accurately analyze the strengths and weaknesses of existing and proposed blended cements and other cement-SCM compositions and then efficiently manufacture blended cements and other cement-SCM compositions.

Comparative Examples 1-20

Comparative Examples 1-20 describe the strength results of mortar cube testing performed by the National Institute of Standards and Technology (NIST) according to ASTM C-109 on binary blends of separately processed and non-interground blends of hydraulic cement and fly ash. The w/c ratio of the 100% cement control was 0.35. The same volume of water used in the control mix was used in the blended cement mixes, sometimes with a high range water reducer (HRWR) to maintain flow. Because fly ash has a lower specific gravity than cement, substitution was performed on a volumetric rather than a weight basis. The "volumes" of the fly ash components were estimated by multiplying the weight of the fly ash at a proposed substitution level by the ratio of assumed specific gravities of fly ash to cement.

Examples 1-2 employed a commercially available Type I/II (ASTM C-150) cement to provide a control reference. The PSD chart of the control cement is shown in FIG. 1A. Comparative Example 2 also employed a commercially available Class F fly ash (ASTM C-618) to provide a reference control blend. Examples 3-19 each employed one of four different narrow PSD cements obtained by modifying the Type I/II cement of Examples 1 and 2 to have reduced d90 values (e.g., by classifying the commercial cement to a target d90, regrinding the removed coarse material to the same target d90, and recombining the classified and reground fractions in proportions selected to maintain the same chemistry as the starting cement to yield the narrow PSD cement for testing). Examples 3-18 each employed Class F fly ashes obtained by removing the coarsest particles by classification and then dedusting the pre-classified fly ash to a target d10. Example 19 employed a commercially available Class C fly ash without modification. Example 20 employed a coarse dedusted fly ash and a commercially available Type III cement to provide another control reference.

The measured d90 values for four modified cements were 9 μm (cement 10, "C10"), 11 μm (cement 9, "C9"), 12 μm (cement 8, "C8"), and 24 μm (cement 7, "C7"), in contrast to a d90 of 36 μm for the original cement (C6). The measured fly ash d10 values were 4 μm (fly ash 5, "F5"), 11 μm (fly ash 4, "F4"), 13 μm (fly ash 3, "F3"), and 15 μm (fly ash 2, "F2"), in contrast to 2.7 μm for the original fly ash (fly ash 1, "F1"). The Class C ash is designated as "c ash", and the Type III cement is designated as "C-III". The d90 of the Type III cement was reportedly about 18 μm.

The cement and fly ash sample identities and the volumetric percentages of cement and fly ash used in Examples 1-20 are set forth in Table 1 below. Replacement of cement with fly ash was performed on a volumetric basic to account for differences in the specific gravities of cement and fly ash. As a result, the water-to-cementitious binder ratios (w/cm) of the binary blends were higher than the w/c of the control cement. Had substitution been done on a weight basis while correspondingly reducing the amount of sand, as is almost universally done in the cement industry and in test labs, the measured strengths of the binary blends would have been higher than those reported by NIST and reproduced in Table 1 below.

In some cases, a high range water reducer (HRWR) was added to maintain adequate flow without changing the volume of added water. The amounts of HRWR, if any, are set forth in Table 1 and expressed in terms of weight percent of total binder (e.g., 1% means 1 g per 100 g of total binder).

The 1-, 3-, 7-, 28-, 91-, and 182-day compressive strengths (MPa and psi) of mortar cubes measured according to ASTM C-109 by NIST for Examples 1-20 are also set forth in Table 1.

TABLE 1

| Example | Mix (%) | HRWR g/100 g cem | 1-day (MPa) (psi) | 3-day (MPa) (psi) | 7-day (MPa) (psi) | 28-day (MPa) (psi) | 91-day (MPa) (psi) | 182-day (MPa) (psi) |
|---|---|---|---|---|---|---|---|---|
| 1 | C6 100 | 0.00 | 36.7 5320 | 54.4 7900 | 63.6 9220 | 80.3 11640 | 84.7 12280 | 86.0 12470 |
| 1 repeat | C6 100 | 0.00 | 36.3 5260 | 55.1 7990 | 62.7 9090 | 79.4 11510 | 87.9 12750 | 92.6 13430 |
| 2 | C6 50 F1 50 | 0.00 | 13.6 1980 | 21.3 3090 | 29.3 4250 | 49.1 7120 | 70.6 10240 | 79.5 11520 |
| 3 | C7 65 F3 35 | 0.00 | 27.4 3980 | 39.7 5780 | 51.8 7380 | 69.7 10100 | 79.2 11480 | 90.9 13170 |
| 4 | C7 50 F2 50 | 0.00 | 15.9 2300 | 24.8 3600 | 31.7 4780 | 46.8 6790 | 58.7 8520 | 66.3 9620 |
| 5 | C8 65 F2 35 | 0.37 | 37.9 5500 | 48.0 6960 | 59.3 8600 | 65.6 9510 | 77.1 11180 | 81.8 11860 |
| 6 | C9 50 F4 50 | 0.28 | 22.7 3300 | 31.8 4620 | 38.3 5550 | 47.0 6820 | 56.2 8160 | 65.1 9450 |
| 7 | C10 35 F2 65 | 0.00 | 11.7 1700 | 15.9 2310 | 19.2 2780 | 26.0 3770 | 33.0 4790 | 41.8 6060 |
| 8 | C9 65 F5 35 | 0.48 | 39.0 5660 | 50.9 7380 | 58.3 8460 | 70.0 10150 | 82.9 12030 | 88.9 12890 |
| 9 | C10 80 F5 20 | 1.00 | 66.1 9590 | 76.3 11070 | 85.9 12460 | 102 14740 | 107 15510 | 105 15250 |
| 10 | C10 65 F4 35 | 0.67 | 44.6 6460 | 53.4 7750 | 64.8 9400 | 72.4 10500 | 80.6 11690 | 83.3 12080 |
| 11 | C8 35 F4 65 | 0.00 | 10.2 1480 | 14.7 2130 | 18.8 2720 | 27.3 3960 | 38.1 5530 | 49.4 7160 |
| 12 | C10 50 F3 50 | 0.05 | 25.2 3650 | 33.7 4880 | 40.7 5910 | 49.4 7170 | 57.6 8360 | 63.3 9190 |
| 13 | C7 80 F4 20 | 0.05 | 36.7 5320 | 50.8 7360 | 63.5 9220 | 78.1 11330 | 89.8 13020 | 91.8 13310 |
| 14 | C8 80 F3 20 | 0.80 | 53.6 7770 | 68.5 9940 | 80.1 11620 | 89.7 13010 | 93.9 13620 | 99.6 14440 |
| 15 | C7 35 F5 65 | 0.00 | 8.4 1210 | 14.6 2110 | 18.3 2660 | 30.5 4430 | 47.7 6910 | 57.0 8270 |
| 16 | C8 50 F5 50 | 0.05 | 22.3 3240 | 32.1 4660 | 40.1 5810 | 51.6 7480 | 64.9 9410 | 71.6 10390 |

TABLE 1-continued

| Example | Mix (%) | HRWR g/100 g cem | 1-day (MPa) (psi) | 3-day (MPa) (psi) | 7-day (MPa) (psi) | 28-day (MPa) (psi) | 91-day (MPa) (psi) | 182-day (MPa) (psi) |
|---|---|---|---|---|---|---|---|---|
| 17 | C9 80 | 1.00 | 54.5 | 66.7 | 78.4 | 92.9 | 94.3 | 96.2 |
|    | F2 20 |      | 7910 | 9680 | 11370 | 13470 | 13680 | 13960 |
| 18 | C9 35 | 0.00 | 10.2 | 14.8 | 19.1 | 25.7 | 35.7 | 46.2 |
|    | F3 65 |      | 1480 | 2150 | 2770 | 3730 | 5180 | 6710 |
| 19 | C9 65 | 0.67 | 38.8 | 51.4 | 61.4 | 79.6 | 85.9 | 90.9 |
|    | C ash 35 |   | 5620 | 7460 | 8910 | 11540 | 12450 | 13180 |
| 20 | C-III 65 | 0.48 | 31.8 | 45.6 | 49.6 | 66.3 | 77.6 | 84.2 |
|    | F5 35 |      | 4611 | 6620 | 7197 | 9620 | 11260 | 12207 |

The compressive strength results indicate that the binary blends tested by NIST, which did not contain an interground cement-SCM component, were able to achieve adequate strength compared to the 100% control cement at substitution levels of 20% and 35%. At a substitution level of 20% (80% cement, 20% fly ash), the high fineness of the cement component caused significant water demand issues, particularly as the cement became finer, requiring the use of a high range water reducer (HRWR) to obtain adequate flow, as required by ASTM C-109. Cement 10 was so fine that the 80-20 blend (Example 9) could not achieve adequate flow even with HRWR, had high shrinkage, and was considered by NIST to be a flawed material. Even at 35% substitution, only cement 7 was able to form a binary blend that did not require HRWR (Example 3), but that blend did not have high early strength like the other 65-35 blends (Examples 5, 8, 10), which required a significant quantity of HRWR. At substitution levels above 35%, namely 50% (Examples 2, 4, 6, 12, 16) and 65% (Examples 7, 11, 15, 18), none of the binary blends was able to match the strength performance of the control cement at any test day. The 65-35 binary blend using commercially available Type III cement (Example 20) largely underperformed the 65-35 blends made using cements 7-10 (Examples 3, 5, 8, 10, and 19) in most respects, with a few exceptions.

Baseline Optimization Score—100% OPC

The Control Cement used in Comparative Examples 1-2 was commercially available Type I-II OPC with a d90 of 40-45 μm, d10 of 1-2 μm, and PSD narrower than a Fuller distribution. as illustrated by the PSD chart of FIG. 1A. A representative OPC having an even steeper PSD is illustrated in the PSD chart of FIG. 1B. The representative 100% OPC compositions illustrated by the PSD charts in FIGS. 1A and 1B violate Principles 1 and 2 because the cross-hatched areas labeled "fine PC" (e.g., particles <5 μm) and "coarse PC" (particles >30 μm) consist entirely of Portland cement particles. The OPC compositions are in substantial (but not total) compliance with Principle 3 because the PSDs, though broad, are substantially narrower than a Fuller distribution. The optimization score for the OPC in FIG. 1A is estimated to be 1.0 (0.0+0.0+1.0). The optimization score for the OPC in FIG. 1B is also estimated to be 1.0 (0.0+0.25+0.75). The score for Principle 2 in the OPC of FIG. 1B was increased to 0.25.0 because of the reduced quantity of fine particles below 0.5 μm compared to the OPC of FIG. 1A; however, the score for Principle 3 was reduced to 0.75 because of the steeper PSD curve shown in FIG. 1B, which deviates more from a Fuller distribution than the PSD curve of FIG. 1A. This illustrates how different cements can be equally suboptimal for SCM substitution for different reasons under the proposed analytical framework.

The low optimization score for OPC also illustrates why simple blended cements consisting of OPC and separately processed SCM can show a drop in strength, particularly early strength, when compared to 100% OPC at even modest substitutions in OPC of 15-25%. Indeed, the 50:50 blend of Example 2 using OPC had lower early (1-7 day) strengths compared to each of the 50:50 binary blends of Examples 4, 6, 12 and 16, particularly the 1-day strength. For this reason, it is customary to increase the total binder content in concrete to make up for the drop in early strength (e.g., 500 lbs. of 100% OPC in a cubic yard of concrete might be replaced with 600 lbs. of blended cement consisting of 400 lbs. of OPC and 200 lbs. of fly ash).

Optimization Score—80% Cement, 20% SCM

The binary blend of Comparative Example 13 was analyzed using the analytical framework to determine the optimization score for binary blends having 20% SCM because it had a strength and water demand that most resembled the strength and water demand of the Control Cement of Comparative Example 1. The binary blend of Comparative Example 13 used cement 7, which had a d90 of 24 μm, and is therefore in substantial, but not total, compliance with Principle 1 due to the small but not insignificant fraction of coarse cement particles >24 μm. It violates Principle 2 due to the large amount of very fine cement particles <8 μm. It substantially, but not entirely, complies with Principle 3 because the coarse fly ash particles of fly ash 4 blended with cement 7 broadened the overall PSD of the binary blend, but not to the extent of a Fuller distribution. The estimated score is 2.0 (1.0+0.0+1.0), which explains why this binary blend had similar strength at all ages compared to the Control Cement consisting of 100% OPC of Example 1, which is an improvement over simple blends of 80% OPC and 20% fly ash, which typically show a loss of early strength compared to 100% OPC.

Optimization Score—65% Cement, 35% SCM

The binary blend of Comparative Example 19 was analyzed using the analytical framework to determine the optimization score for binary blends having 35% SCM because it had a strength that most resembled the strength of the Control Cement of Comparative Example 1. The binary blend of Comparative Example 19 used cement 9, which had a d90 of 11 μm, which fully complies with Principle 1 due to the elimination of coarse cement particles that do not fully hydrate. It violates Principle 2 due to the very large amount of very fine cement particles <8 μm. It substantially, but not entirely, complies with Principle 3 because the fly ash particles broaden the overall PSD of the blend, but not to the extent of the desired Fuller distribution. The estimated score is 2.5 (1.5+0.0+1.0), which explains why this binary blend had similar strength at all ages compared to the Control Cement consisting of 100% OPC of Example 1 at 65% cement and 35% fly ash and had higher SCM content compared to the binary blend of Comparative Example 13 with a score of 2.0. The score of 2.5 also explains why the binary blend Comparative Example 19 is a substantial improvement over simple blends of 65% OPC and 35% fly ash, which typically show a substantial loss of early strength and a drop in later strength when compared to 100% OPC.

Examples 21-38

Each of Comparative Examples 3-20 is modified by replacing the cement components (cements 7-10 and Type III cement) with an interground blend of Portland cement clinker and pozzolan (e.g., one or more of coal ash, natural pozzolan, or metallurgical slag) ground to the same d90 as the cement component in the corresponding Comparative Example. In addition, each of Comparative Examples 3-20 is modified by reducing the amount of coarse pozzolan in order to maintain the same overall percent substitution of SCM. The amounts of cement clinker and pozzolan in the fine interground particulate component and also the amounts of fine interground particulate component and coarse particulate component are provide below in Table 2. The "blend type" refers to the percent of each of the fine and coarse components (e.g., 80% fine and 20% coarse has a blend type designated as "80/20"). The relative amounts of the cement fraction and pozzolan fraction in the fine interground component of each Example was selected to provide a cement-pozzolan blend with predicted water demand and HRWR requirements similar to or less than in the corresponding Comparative Example.

TABLE 2

| Example (d90 of fine component) | Corresponding Comparative Example (Blend Type) | Fine Interground Component (% of whole) | Cement Fraction (% of IG Comp.) | Pozzolan Fraction (% of IG Comp.) | Coarse Particulate Component (% of whole) |
| --- | --- | --- | --- | --- | --- |
| 21 (24 μm) | 13 (80/20) | 86.0 | 93 | 7 | 14.0 |
| 22 (24 μm) | 3 (65/35) | 76.5 | 85 | 15 | 23.5 |
| 23 (24 μm) | 4 (50/50) | 69.5 | 72 | 28 | 30.5 |
| 24 (24 μm) | 15 (35/65) | 63.6 | 55 | 45 | 36.4 |
| 25 (12 μm) | 14 (80/20) | 84.2 | 95 | 5 | 15.8 |
| 26 (12 μm) | 5 (65/35) | 76.5 | 85 | 15 | 23.5 |
| 27 (12 μm) | 16 (50/50) | 69.5 | 72 | 28 | 30.5 |
| 28 (12 μm) | 11 (35/65) | 63.6 | 55 | 45 | 36.4 |
| 29 (11 μm) | 17 (80/20) | 84.2 | 95 | 5 | 15.8 |
| 30 (11 μm) | 8 (65/35) | 76.5 | 85 | 15 | 23.5 |
| 31 (11 μm) | 19 (65/35) | 76.5 | 85 | 15 | 23.5 |
| 32 (11 μm) | 6 (50/50) | 69.5 | 72 | 28 | 30.5 |
| 33 (11 μm) | 18 (35/65) | 63.6 | 55 | 45 | 36.4 |
| 34 (9 μm) | 9 (80/20) | 84.2 | 95 | 5 | 15.8 |
| 35 (9 μm) | 10 (65/35) | 76.5 | 85 | 15 | 23.5 |
| 36 (9 μm) | 12 (50/50) | 69.5 | 72 | 28 | 30.5 |
| 37 (9 μm) | 7 (35/65) | 63.6 | 55 | 45 | 36.4 |
| 38 (18 μm) | 20 (65/35) | 76.5 | 85 | 15 | 23.5 |

The cement-SCM compositions according to Examples 21-38, when tested according to ASTM C-109 and made with the same water-to-cementitious binder ratio (w/cm) used in each of Comparative Examples 3-20, are predicted to have higher early (1- to 7-day) and long-term (28- to 182-day) strength, the same or better water demand and flow, the same or lower HRWR requirement, and the same or higher long-term durability compared to each corresponding Comparative Example, which were made using a fine cement not interground with pozzolan.

With regard to strength, because each of Examples 21-38 contains a higher quantity of fine pozzolan, a lesser quantity of coarse pozzolan, and the same quantity of fine cement in comparison to each corresponding Comparative Example, it is predicted, based on the principles disclosed herein, that Examples 21-38 will have higher early and long-term strengths (e.g., because they will have higher pozzolanic reactivity at all ages and no corresponding reduction in cement reactivity).

The beneficial effects of increased early and long-term strength will be more pronounced with increasing pozzolan content (i.e., because of the progressively increasing fine-to-coarse pozzolan ratio permitted at higher pozzolan substitution levels because, in the Comparative Examples, water demand problems decreased with increasing pozzolan substitution levels). For example, the 80/20 blends of Examples 25, 29, and 34 have a fine-to-coarse pozzolan ratio of 0.27:1, as compared to 0.49:1 for the 65/35 blends, 0.64:1 for the 50/50 blends, and 0.79:1 for the 35/65 blends.

The 80/20 blend of Example 21 is an anomaly due to the low water demand and HRWR requirement of Comparative Example 13 and can therefore be permitted to have a substantially higher fine-to-coarse pozzolan ratio compared to the other 80/20 blends (0.58:1 versus 0.27:1). As a result, it is predicted that the relative strength increase of Example 21 compared to corresponding Comparative Example 13 would be greater than in Examples 25, 29, and 34 since each of their corresponding Comparative Examples already had strengths that far exceeded the strength of the 100% control blend at all ages. Therefore, not only will intergrinding cement and pozzolan to form a fine interground particulate component beneficially increase early and long-term strengths with increasing pozzolan content in comparison to the Comparative Examples, as explained in the previous paragraph, it will dramatically increase strength relative to Comparative Examples using non-interground fine cement fractions with higher d90, which have lower water demand, lower reactivity, and lower strength to begin with compared to cement fractions having lower d90. Such differing trends in the beneficial effect on strength of using a fine interground particulate component instead of a non-interground fine cement devoid of fine interground pozzolan particles, are surprising and unexpected in the absence of the knowledge and understanding provided herein.

With regard to water demand, flow and HRWR requirement, the inclusion of fine pozzolan particles interground with fine cement particles will, all things being equal, increase interparticle spacing between and reduce flocculation of the fine cement particles. It is predicted that the beneficial effects of the fine interground pozzolan relating to water demand, flow and HRWR requirement will substantially offset any negative effects on these variable that may be caused by reducing the quantity of coarse pozzolan particles in the overall composition. To the extent that one or more of Examples 21-38 results in increased water demand and HRWR requirement relative to their corresponding Comparative Examples, one of skill in the art, with the aid of the teachings disclosed herein, could modify any of such examples, such as by altering the relative quantities of hydraulic cement and pozzolan in the fine interground particulate component and/or modifying the amount of the coarse pozzolan component in the cement-SCM composition in order to achieve similar or lower water demand and HRWR requirement compared to the corresponding Comparative Example(s). Conversely, to the extent that that one or more of Examples 21-38 results in decreased water demand and HRWR requirement relative to their corresponding Comparative Examples, other modifications could be made to increase water demand and/or HRWR requirement to within an acceptable level with the aim of increasing strength or other beneficial property.

With regard to long-term durability, it is predicted that the inclusion of fine pozzolan particles interground with fine cement particles will increase cement paste density and reduce chloride ion permeability, both of which will beneficially increase durability.

Example 39

Any of Examples 21-38 is modified by replacing some or all of the Portland cement clinker with one or more hydraulic cements known in the art, including any of the hydraulic cements disclosed herein. Compared to a control cementitious composition comprising hydraulic cement and pozzolan or other SCM, the modified cement-SCM compositions made using a fine interground particulate component comprising a hydraulic cement fraction and an SCM fraction together with a coarse particulate component comprising coarse SCM particles will achieve higher strength compared to the control cementitious composition.

Example 40

Any of Examples 21-39 is modified by replacing a portion of the pozzolan in the fine to interground particulate component with an amount of limestone sufficient to increase heat of hydration and/or early strength of the cement-SCM composition. For example, to the extent that any of Examples 21-39 has adequate long-term strength (e.g., similar to or higher than a 100% control cement) but has inadequate early strength, adding finely ground limestone can beneficially increase early strength when so desired. Because limestone may reduce long-term strength, the addition of limestone will be more suitable for cement-SCM blends having higher long-term strength compared to the control cement. In such cases, an amount of limestone can be added that will reduce the long-term strength to the same level as the control cement while beneficially increasing early strength. In this way, the strength curve of the modified cement-SCM composition can more closely resemble the strength curve of the control cement compared to the cement-SCM blend devoid of limestone.

Example 41

Any of examples 21-40 is modified by adding, without intergrinding with the fine interground particulate component and the coarse particulate component, one or more auxiliary particulate components known in the art and/or as disclosed herein in order to modify the properties of the cement-SCM composition. For example, one or more of silica fume, OPC, finely ground cement, blended cement, GGBFS, finely ground limestone, or fly ash can, without further modification, be combined with the cement-SCM composition of any of Examples 1-40 to form a modified cement-SCM composition having desired properties.

Example 42

Any of examples 21-41 is modified by adding an amount of a calcium-based set accelerator, such as calcium oxide (CaO), calcium chloride ($CaCl_2$), calcium nitrite ($Ca(NO_2)_2$, or calcium nitrate ($Ca(NO_3)_2$ and/or an alkali metal salt capable of increasing the pH of the mix water, such as sodium hydroxide (NaOH), sodium citrate, or other alkali metal salt of a weak acid. The calcium ions provided by the calcium-based set accelerator will not only accelerate hydration of the hydraulic cement fraction of the cement-SCM composition (e.g., in cold weather or other situations where it is desired to increase early strength), they can beneficially react with silicate ions from the pozzolan to form additional cement binder products. Alternatively, or in addition, the increased pH provided by the alkali metal salt can accelerate the pozzolanic reaction by accelerating dissolution of silicate ions and/or aluminate ions from the pozzolan and making them more readily available for reaction with calcium and/or magnesium ions provided by the hydraulic cement fraction.

Comparative Examples 43-49

Five gap graded ternary blends were prepared according to Zhang, et al., "A new gap-graded particle size distribution and resulting consequences on properties of blended cement," *Cement & Concrete Composites* 33 (2011) 543-550. Each of the five gap graded ternary blends, designated herein as Comparative Examples 43-47, was prepared so as to have three fractions designed as "fine" (<8 μm), "middle" (8-32 μm), and "coarse" (<32 μm) fractions, in which a fine SCM, a narrow PSD cement, and a coarse SCM were arranged in the fine, middle, and coarse fractions, respectively, and in amounts of 36%, 25%, and 39%, respectively, to yield gap graded blends containing 25% cement and 75% total SCM. The fine, middle, and coarse fractions were each made by classifying a broader PSD starting material to yield a fraction having the desired PSD.

The middle fraction in each of Examples 43-47 consisted of a narrow PSD cement clinker. Example 43 included GGBFS in the fine and coarse fractions and was designated as "BCB". Example 44 included GGBFS in the fine fraction and Class F fly ash in the coarse fraction and was designated as "BCF". Example 45 included GGBFS in the fine fraction and steel slag in the coarse fraction and was designated as "BCS". Example 46 included GGBFS in the fine fraction and limestone in the coarse fraction and was designated as "BCL". Example 47 included steel slag in the fine and coarse fractions and was designated as "SCS".

A control "Portland cement", designated herein as Comparative Example 48, consisted of 100% OPC made using the same cement clinker used to make the narrow PSD cement in Examples 43-47. A control "reference cement", designated herein as Comparative Example 49, consisted of a single interground blend of the same GGBFS, cement clinker, and fly ash materials used to make the gap graded cement of Example 44. Neither the Portland cement nor the reference cement of Examples 48 and 49 had separate fine, middle, and coarse fractions and were not "gap graded".

The relative water requirements for attaining normal consistency (flow) of the gap-graded cements, Portland cement ("PC"), and reference cement ("RC") of Examples 43-49 were reportedly as follows:

RC>>BCF>BCB>BCL>BCS>SCS>PC.

The relative 3-day compressive strengths for Examples 43-49 were reportedly as follows:

PC>BCB>BCS>BCF>BCL>SCS>>RC.

The relative 28-day compressive strengths for Examples 43-49 were reportedly as follows:

PC>BCS>BCB>BCF>SCS>BCL>RC.

The relative 3-day flexural strengths for Examples 43-49 were reportedly as follows:

BCB>BCS>PC>BCF=BCL>SCS>>RC.

The relative 28-day flexural strengths for Examples 43-49 were reportedly as follows:

BCB>BCL>BCS>BCF=PC=SCS>>RC.

The relative particle packing densities for Examples 43-49 were reportedly as follows:

BCS>BCB>SCS>BCL>BCF>>PC>RC.

The reference cement, made by intergrinding all of the components together to form a single interground blend that did not contain separate fine, middle, and coarse fractions, performed the worst in every tested category. The reference cement had the highest water demand and the lowest strength. The reference cement also had the lowest rate of heat evolution and heat of hydration, both of which are negative, and the highest porosity and pore diameter, which are also negative. This data suggest that conventional blended cements made by intergrinding all components together to form a single blended material are suboptimal. Nevertheless, there has been no obvious effort by the cement industry to remedy this problem other than simply blending OPC and one or more SCMs together without any intergrinding. In neither case—intergrinding everything together or intergrinding nothing together—is there any demonstrated understanding as to the benefits of combining separately processed fine and coarse fractions having complementary, rather than substantially overlapping, PSDs.

On the other hand, the gap graded blends of Examples 43-47 made from separately processed fine, middle, and coarse fractions and without any intergrinding, demonstrated that blended cements having up to 75% SCM content and as little as 25% Portland cement content can perform similar to 100% OPC. The main problem with the gap graded blends of Examples 43-47 is that they are, according to Zhang, et al., "conventionally viewed as being too complex for industrial practice". This is likely due to the fact that the authors do not propose, nor seem to be aware of, any economically feasible way to manufacture the fine, middle, and coarse fractions required to make the gap graded cements, particularly the narrow PSD cement constituting the middle fraction.

Optimization Score—25% Cement, 75% SCM

The gap-graded ternary blends of Comparative Examples 43-47 substantially comply with Principles 1 and 2 because the fine and coarse particles mainly consist of SCM particles and are substantially devoid of Portland cement particles. The gap-graded ternary blends also substantially comply with Principle 3 because the overall PSD of the blend approximates a Fuller distribution even though it consists of three separate fractions with narrow but complementary PSDs. The estimated score approaches 4.0 (1.5+1.0+1.5) because the gap-graded ternary blends of Comparative Examples 43-47 had the highest SCM substitution levels of any studied example.

Comparative Examples 50-59

To remedy the perceived difficulties with the gap graded cements of Comparative Examples 43-47, five (5) additional gap graded cements were manufactured using a commercial Portland cement having a standard Blaine fineness (350 $m^2$/kg) and a PSD that was somewhat narrower than a Fuller distribution in place of the narrow PSD cement used in Comparative Examples 43-47. The Portland cement contained 95% ground cement clinker and 5% gypsum. The five additional gap graded cements, designated as Comparative Examples 50-54, are described in Zhang, et al., "Influence of preparation method on the performance of ternary blended cements," *Cement & Concrete Composites* 52 (2014) 18-26.

As in Comparative Examples 43-47, the gap graded blends of Comparative Examples 50-54 included a fine SCM fraction (<8 μm) and a coarse SCM fraction (>32 μm) in addition to commercial Portland cement middle fraction. However, the amounts of the SCM components were reduced such that the modified gap graded cements of Examples 50-54 included 25% SCM in the fine fraction, 35% SCM in the coarse fraction, and 45% Portland as a modified middle fraction, which yielded gap graded blends containing 45% cement and 55% SCM. For comparison purposes, five corresponding interground blends, designated as Comparative Examples 55-59, were made from the same materials used in corresponding Comparative Examples 50-54.

Example 50 included GGBFS in the fine and coarse fractions and was designated as "$G_{BCB}$". Example 51 included GGBFS in the fine fraction and Class F fly ash in the coarse fraction and was designated as "$G_{BCF}$". Example 52 included GGBFS in the fine fraction and steel slag in the coarse fraction and was designated as "$G_{BCS}$". Example 53 included GGBFS in the fine fraction and limestone in the coarse fraction and was designated as "$G_{BCL}$". Example 54 included both GGBFS (20% of total cement) and Class F fly ash (5% of total cement) in the fine fraction and Class F fly ash in the coarse fraction and was designated as "$G_{(B+F)CF}$".

Examples 55-59 were made by intergrinding the same SCM and Portland cement materials used to make Examples 50-54, respectively, and were designated as Example 55: "$I_{BCB}$"; Example 56: "$I_{BCF}$"; Example 57: "$I_{BCS}$"; Example 58: "$I_{BCL}$"; and Example 59: "$I_{(B+F)CF}$". The water requirement for normal consistency were reportedly about the same for the gap graded and interground blend and therefore were not an issue. The compressive and flexural strengths of the gap graded blends of Examples 50-54 were similar to the compressive and flexural strengths of 100% OPC (e.g., Comparative Example 48) but far superior to the compressive and flexural strengths of the interground blends of Examples 55-59, as shown in Table 3.

TABLE 3

| Example | Cement ID | Compressive Strength (MPa) | | Flexural Strength (MPa) | |
|---|---|---|---|---|---|
| | | 3-day | 28-day | 3-day | 28-day |
| Gap Graded Blended Cements | | | | | |
| 50 | $G_{BCB}$ | 26.5 | 49.2 | 6.8 | 9.8 |
| 51 | $G_{BCF}$ | 25.6 | 47.3 | 6.5 | 9.7 |
| 52 | $G_{BCS}$ | 26.6 | 48.2 | 6.8 | 9.3 |
| 53 | $G_{BCL}$ | 22.7 | 44.8 | 5.1 | 9.1 |
| 54 | $G_{(B+F)CF}$ | 24.9 | 45.5 | 6.4 | 9.4 |
| Interground Blended Cements | | | | | |
| 55 | $I_{BCB}$ | 16.1 | 37.9 | 3.9 | 8.6 |
| 56 | $I_{BCF}$ | 13.7 | 34.5 | 3.5 | 8.5 |
| 57 | $I_{BCS}$ | 13.5 | 33.6 | 3.4 | 8.1 |
| 58 | $I_{BCL}$ | 8.9 | 27.9 | 2.7 | 7.8 |
| 59 | $I_{(B+F)CF}$ | 11.2 | 31.3 | 3.1 | 8.1 |

The data in Table 3 again demonstrate that conventional blended cements made by intergrinding all components together are suboptimal compared to gap graded blends in which the three components are processed separately in order to provide fine, medium, and coarse fractions having complementary PSDs. Nevertheless, although the gap graded blends of Comparative Examples 50-54 performed substantially better than the interground blends of Comparative Examples 55-59, they only permitted the use of 55% SCM and 45% Portland cement rather than 75% SCM and only 25% Portland cement as in the gap graded blends of Examples Comparative Examples 43-47.

Optimization Score—45% Cement, 55% SCM

Using the proposed analytical framework, it was determined that the ternary blends of Comparative Examples 50-54 substantially, but not fully, comply with Principle 1 due to the smaller but still significant fraction of coarse cement particles (>24 μm). They partially comply with Principle 2 due to the existence of significant quantities of both very fine cement and SCM particles (<8 μm). They comply with Principle 3 because the high quantity of fine and coarse SCM particles broadens the overall PSD of the blend to approach a Fuller distribution. The estimated score is 3.0 (1.0+0.5+1.5), which explains why the ternary blends of Comparative Examples 50-54 had higher SCM substitution (55%) compared to the binary blend of Comparative Example 19 (35%) having a score of 2.5 but lower SCM substitution (55%) compared to the gap-graded ternary blends (75%) of Comparative Examples 43-47 with a score approaching 4.0. The ternary blends of Comparative Examples 50-54 are therefore suboptimal compared to the gap-graded ternary blends of Comparative Examples 43-47 because they contain a substantial quantity of "wasted cement" that is unavailable for making cement paste binder and also unavailable as a source of calcium ions for reacting with pozzolanically reactive materials in the blends.

Summary of Findings

Based on the foregoing, it is proposed that the analytical framework and methodology can be used to determine the permissible SCM content of virtually any blended cement by first determining its optimization score and then comparing it to the optimization scores of known cements determined above, which are summarized in Table 4.

TABLE 4

Summary of optimization scores, SCM content, and OPC content

| Cement Material | SCM Content | Cement Content | Optimization Score |
|---|---|---|---|
| OPC | 0% | 100% | 1.0 |
| Binary Blend | 20% | 80% | 2.0 |
| Binary Blend | 35% | 65% | 2.5 |
| Ternary Blend | 55% | 45% | 3.0 |
| Ternary Blend | 75% | 25% | 4.0 |

By way of illustration, it was determined that a simple 80:20 blend of OPC and fly ash has an optimization score similar to OPC by itself (about 1.0). As a result, a cubic yard of concrete made using a simple 80:20 blend of OPC (400 lbs.) and fly ash (100 lbs.) will typically have lower early strength than a cubic yard of concrete made using 500 lbs. of OPC and no fly ash at the same water to cementitious binder ratio (w/cm). In contrast, concrete made using a binary blend with an optimization score of 2.0 will have the same or better early strength as concrete made using 100% OPC.

An interground blend of 80% Portland cement and 20% SCM will typically yield concrete having better strength than the simple 80:20 blend of OPC and fly ash but with lower strength and/or higher water demand compared to concrete made using 100% OPC at the same w/cm. This can be explained by interground blends having an optimization score of about 1.25-1.75. Intergrinding Portland cement and SCM can increase the score for one or both of Principles 1 and 2 by an estimated 0.25-0.5 depending on the relative grinding characteristics of the Portland cement clinker and SCM materials and maintains or slightly lowers the score for Principle 3 depending on the Blaine, which is often increased in interground blends compared to OPC to increase reactivity and offset strength loss caused by the dilution of Portland cement with SCM.

The proposed analytical framework explains why, because of the offsetting effects caused by increasing or decreasing the Blaine relative to Principles 1 and 3 (i.e., raising one necessarily lowers the other), little is gained by increasing Blaine to increase the strength of interground blended cements. It also explains why interground blended cements of very high Blaine, while highly reactive even at high SCM levels, are nonetheless suboptimal because increasing the Principle 1 score by reducing or eliminating coarse cement particles above 24 μm causes a corresponding or greater decrease in the Principle 3 score by significantly or substantially narrowing the PSD, which increases water demand, shrinkage, and other negative features of overly fine cement.

Examples 60-64

Each of Comparative Examples 43-47 is modified by replacing the fine SCM fraction and the middle narrow PSD Portland cement fraction with a fine interground particulate component formed by intergrinding the SCM and cement clinker materials used to make the fine and middle fractions of each of Comparative Examples 43-47 in a manner so as to have the same d90 as the middle cement fraction (e.g., 21.54 μm). The coarse fraction used in each of Comparative Examples 43-47 remains unchanged and constitutes a coarse particulate component that is not interground with the fine interground particulate component in Examples 60-64. The relative quantities of the materials used to make the fine, middle, and coarse particulate fractions in Comparative Examples 43-47 remain the same such that the cement-SCM compositions of Examples 60-64 contain 36% of fine interground SCM material, 25% of fine interground cement material (for a combined total of 61% interground materials), and 39% of coarse SCM material not interground with the fine interground particulate component.

It is postulated that the cement-SCM compositions according to Examples 60-64, when tested according to ASTM C-109 and made with the same water-to-cementitious binder ratio (w/cm) as in each of Comparative Examples 43-47, will have comparable 3- and 28-day compressive and flexural strengths, comparable water demand and flow, comparable HRWR requirement, and comparable long-term durability compared to each corresponding Comparative Example 43-47.

It is postulated that the cement-SCM compositions according to Examples 60-64 can perform as well or almost as well as the gap graded blends of Comparative Examples 43-47 relative to 3- and 28-day strength development owing to the fact that Examples 60-64 do not include a greater quantity of coarse cement particles that do not fully hydrate within 28 days as compared to the gap graded blends of Comparative Examples 43-47. As result, the strength developing properties of the cement fraction should be similar in each of Comparative Examples 43-47 and Examples 60-64. In addition, the amount of calcium ions released by the cement component for promoting the pozzolanic reaction should be similar.

And while it is possible that intergrinding the fine SCM fraction with cement as in Examples 60-64, rather than providing it as a separate fine fraction as in Comparative Examples 43-47, may reduce somewhat the reactivity of the fine SCM fraction and reduce strength development, it is a worthwhile tradeoff since Examples 60-64 can be manufactured in an industrially feasible manner, while Comparative Examples 43-47 are reportedly not industrially feasible. Even if the SCM substitution levels are reduced from the 75% level achieved in Comparative Examples 43-47, such as to 70%, 65%, or even 60%, they would still be significantly to substantially higher than the 55% substitution level achieved in Comparative Examples 50-54, which is surprising and unexpected in view of current practices and knowledge.

Examples 65-69

Each of Comparative Examples 50-54 is modified by replacing the fine SCM fraction and the commercial Portland cement fraction with a fine interground particulate component formed by intergrinding the SCM and cement clinker materials used to make the fine and middle fractions of each of Comparative Examples 50-54 in a manner so as to significantly reduce the quantity of coarse cement particles that do not fully hydrate within 28 days compared to commercial Portland cement. For example, the fine interground particulate component could be ground to the same or lower d90 as in Examples 60-64 (i.e., 21.54 μm). Alternatively, the d90 can be raised to compensate for increased fineness that may result when using the fine interground particulate component in place of the fine SCM fraction and the commercial Portland cement used in Comparative Examples 50-54 (e.g., the d90 of the fine interground particulate component can be higher than 21.54 μm and less than the d90 of the commercial Portland cement used in Examples 50-54, such as a d90 equal to or less than 42.5 μm, 40 μm, 37.5 μm, 35 μm, 32.5 μm, 30 μm, 27.5 μm, 25 μm, or 23 μm).

The coarse SCM fraction used in each of Comparative Examples 50-54 remains unchanged and constitutes a coarse particulate component that is not interground with the fine interground particulate component. The relative quantities of the materials used to make the fine, middle, and coarse particulate fractions in Comparative Examples 50-54 remain the same such that the cement-SCM compositions of Examples 65-69 contain 25% of fine interground SCM material, 45% of fine interground cement material (for a combined total of 70% interground materials), and 30% of coarse SCM material not interground with the fine interground particulate component.

The cement-SCM compositions according to Examples 65-69, when tested according to ASTM C-109 and made with the same water-to-cementitious binder ratio (w/cm) used in each of Comparative Examples 50-54, will have higher 3- and 28-day compressive and flexural strengths, comparable water demand and flow, comparable HRWR requirement, and higher long-term durability compared to each corresponding Comparative Example 50-54.

It is postulated that the cement-SCM compositions according to Examples 65-69 would perform better than the gap graded blends of Comparative Examples 50-54 relative to 3- and 28-day strength development owing to the fact that Examples 65-69 include a lower quantity of coarse cement particles that do not fully hydrate within 28 days as compared to the gap graded blends of Comparative Examples 50-54, which use commercial Portland of standard fineness and PSD and are therefore believed to be suboptimal. As result, the strength developing properties of the cement fraction should be superior in Examples 65-69 compared to Comparative Examples 50-54. In addition, the amount of calcium ions released by the cement component for promoting the pozzolanic reaction should be significantly greater in Examples 65-69.

And while it is possible that intergrinding the fine SCM fraction with cement as in Examples 65-69, rather than providing it as a separate fine fraction as in Comparative Examples 50-54, may reduce somewhat the reactivity of the fine SCM fraction and reduce strength development attributable to the pozzolanic reaction, it is postulated that the increased reactivity of the fine cement fraction will more than offset any strength reducing effect caused by the fine interground SCM fraction compared to a separately processed fine SCM fraction as in Examples 50-54. More particularly, it is postulated that increasing the reactivity of the more reactive component (cement) will cause a greater net increase in total cement-SCM reactivity even if the reactivity of the less reactive component (pozzolan or other SCM) is reduced.

Because Examples 65-69 should provide higher 3- and 28-day strengths compared to Comparative Examples 50-54, a manufacturer or user can choose whether to make or use a cement-SCM composition having higher strength, by keeping the relative cement and SCM proportions the same, increasing the level of SCM substitution while maintaining similar strength, or some hybrid having both higher strength and higher SCM substitution. Providing a cement-SCM composition having superior strength should permit the use of less cement when making the same quantity of concrete having the same strength rating and which, all things being equal, should reduce cost and lower the carbon footprint of the concrete. Alternatively, proving a cement-SCM composition having superior strength would permit the use of additional SCM materials, such as may be provided as an optional auxiliary particulate component.

Alternatively, it would be possible to create even higher strength cement-SCM compositions by reducing the level of SCM substitution and/or by blending the cement-SCM compositions of Examples 65-69 with a more reactive hydraulic cement material, such as a more reactive cement-SCM composition made according to the present disclosure or a binary blend made according to Comparative Examples 9, 14, or 17. The more reactive hydraulic cement material would constitute an optional auxiliary particulate component.

Finally, Examples 65-69 should provide substantially greater strength as compared to the interground blended cements of Comparative Examples 55-59, which have no particle size optimized cement or SCM components and are reflective of current commercial practices used to make interground blended cements. For one thing, Examples 65-69 contain fewer coarse cement particles that do not fully hydrate in 28 days compared to the interground blends of Comparative Examples 55-59, making Examples 65-69 more reactive relative to cement hydration. In addition, by grinding the fine interground particulate component to a d90 that is substantially lower than the d90 of OPC and conventional interground blended cements, the fine interground SCM components in Examples 65-69 would be expected to be finer than the finer SCM fractions contained in Comparative Examples 55-59, providing Examples 65-69 with higher pozzolanic reactivity (in the case of pozzolanic SCM) and/or cement nucleation potential (in the case of limestone or other non-reactive SCM). Finally, the potentially lower reactivity of the coarse SCM component in Examples 65-69 is more than offset by the higher reactivity of the fine interground cement fraction (and possibly also the higher reactivity of the fine SCM fraction).

Optimization Scores of Examples 60-69

Using the analytical framework, it was determined that the cement-SCM compositions of Examples 60-69 should have an optimization score greater than 2.5 and may approach 4.0. The fine interground particulate component can be ground so as to reduce, minimize, or eliminate coarse cement particles above 24 μm and substantially or fully comply with Principle 1. The fine SCM sub-fraction reduces the quantity of fine cement particles below 8 μm compared to fine cement ground independently, which increases (but may not fully reach) compliance with Principle 2. Intergrinding cement clinker with a soft SCM can reduce the preponderance of fine cement particles below 8 μm in the fine interground cement-SCM fraction and further increase compliance with Principle 2. Blending the fine interground particulate component with the coarse particulate component substantially or fully complies with Principle 3. Depending on the level of compliance with Principles 1-3, it should be possible for cement-SCM compositions to have an optimization score of 3.0 or higher, which should yield blended cements having the same or higher SCM level as the ternary blends of Comparative Examples 50-54 (55%), which is surprising and unexpected in view of current practices and available knowledge.

It is also postulated that cement-SCM compositions as disclosed herein may permit SCM substitution levels of up to 75%, similar to the gap graded ternary blends of Examples 43-47, while greatly simplifying the manufacture of cement-SCM blends and permitting their manufacture in an industrially feasible manner, which is surprising and unexpected in view of current practices and available knowledge.

It is also postulated that the cement-SCM compositions of Examples 21-38 would permit the use of greater quantities of SCM in place of Portland cement while also maintaining similar or greater strength as 100% OPC compared to any of Comparative Examples 1-20.

Example 70

Any of Examples 60-69 is modified by replacing some or all of the Portland cement clinker with one or more hydraulic cements known in the art, including any of the hydraulic cements disclosed herein. Compared to a control cementitious composition comprising hydraulic cement and pozzolan or other SCM, the modified cement-SCM compositions made using a fine interground particulate component comprising a hydraulic cement fraction and an SCM fraction together with a coarse particulate component comprising coarse SCM particles will achieve higher strength compared to the control cementitious composition.

Example 71

Any of Examples 60-70 is modified by replacing a portion of the pozzolan in the fine interground particulate component with an amount of limestone sufficient to increase heat of hydration and/or early strength of the cement-SCM composition. For example, to the extent that any of Examples 60-70 has adequate long-term strength (e.g., similar to or higher than a 100% control cement) but has inadequate early strength, adding finely ground limestone can beneficially increase early strength when so desired. Because limestone may reduce long-term strength, the addition of limestone will be more suitable for cement-SCM blends having higher long-term strength compared to the control cement. In such cases, an amount of limestone can be added that will reduce the long-term strength to the same level as the control cement while beneficially increasing early strength. In this way, the strength curve of the modified cement-SCM composition can more closely resemble the strength curve of the control cement compared to the cement-SCM blend devoid of limestone.

Example 72

Any of examples 60-71 is modified by adding, without intergrinding with the fine interground particulate component and the coarse particulate component, one or more auxiliary particulate components known in the art and/or as disclosed herein in order to modify the properties of the cement-SCM composition. For example, one or more of silica fume, OPC, finely ground cement, blended cement, GGBFS, finely ground limestone, or fly ash can, without further modification, be combined with the cement-SCM composition of any of Examples 60-71 to form a modified cement-SCM composition having desired properties.

Example 73

Any of examples 60-72 is modified by adding an amount of a calcium-based set accelerator, such as calcium oxide (CaO), calcium chloride ($CaCl_2$), calcium nitrite ($Ca(NO_2)_2$, or calcium nitrate ($Ca(NO_3)_2$ and/or an alkali metal salt capable of increasing the pH of the mix water, such as sodium hydroxide (NaOH), sodium citrate, or other alkali metal salt of a weak acid. The calcium ions provided by the calcium-based set accelerator will not only accelerate hydration of the hydraulic cement fraction of the cement-SCM composition (e.g., in cold weather or other situations where it is desired to increase early strength), they can beneficially react with silicate ions from the pozzolan to form additional cement binder products. Alternatively, or in addition, the increased pH provided by the alkali metal salt can accelerate the pozzolanic reaction by accelerating dissolution of silicate ions and/or aluminate ions from the pozzolan and making them more readily available for reaction with calcium and/or magnesium ions provided by the hydraulic cement fraction.

Example 74—40% SCM Substitution

A cement-SCM composition comprising 60% hydraulic cement and 40% SCM is manufactured as follows. A fine interground particulate component is manufactured by intergrinding in a mill, such as a vertical roller mill, 360 parts by weight of Portland cement clinker and 90 parts by weight of SCM to a d90=25 μm±2 μm, as measured using a standard PSD measuring device, which yields 450 parts by weight of the fine interground particulate component. The SCM used to make the fine interground particulate component may primarily or exclusively comprise one or more pozzolans (e.g., slag, natural pozzolan, and/or coal ash), but may optionally include limestone or other filler material in addition to the one or more pozzolans. The quantity of cement clinker and/or SCM used to make the fine interground particulate component can be adjusted to account for moisture loss during the intergrinding process and/or to permit the inclusion of a quantity of gypsum to yield a properly sulfate balanced cement-SCM composition (after blending). Gypsum may be considered to form part of the cement component, the SCM component, or both (e.g., prorated between the two).

The 450 parts of fine interground particulate component is blended with 150 parts of a coarse SCM component having a d90=75 μm±10 μm, as measured using a standard PSD measuring device, to yield 600 parts of the cement-SCM composition. The coarse SCM component may primarily or exclusively comprise one or more pozzolans (e.g., slag, natural pozzolan, and/or coal ash), but may optionally include limestone or other filler material in addition to, or instead of, the one or more pozzolans.

The 360 parts of Portland cement clinker (optionally including gypsum) constitutes 60% of the 600 parts of total cement-SCM composition. The 90 parts of SCM in the fine interground particulate component and the 150 parts of SCM in the coarse SCM component total 240 parts, which constitutes 40% of the 600 parts of total cement-SCM composition.

The cement-SCM composition, when tested according to ASTM C-109 and compared to 100% OPC made from the same Portland cement clinker used to make the fine interground particulate component, has a compressive strength that is at least 90% of the compressive strength of the 100% OPC, when tested according to ASTM C-109 at the same w/cm as the cement-SCM composition, at 1 day, 3 days, 7 days, and 28 days.

Example 75—50% SCM Substitution

A cement-SCM composition comprising 50% hydraulic cement and 50% SCM is manufactured as follows. A fine interground particulate component is manufactured by intergrinding in a mill, such as a vertical roller mill, 300 parts by weight of Portland cement clinker and 130 parts by weight of SCM to a d90=22 μm±2 μm, as measured using a standard PSD measuring device, which yields 430 parts by weight of the fine interground particulate component. The SCM used to make the fine interground particulate component may primarily or exclusively comprise one or more pozzolans (e.g., slag, natural pozzolan, and/or coal ash), but may optionally include limestone or other filler material in addition to the one or more pozzolans. The quantity of cement clinker and/or SCM used to make the fine interground particulate component can be adjusted to account for moisture loss during the intergrinding process and/or to permit the inclusion of a quantity of gypsum to yield a properly sulfate balanced cement-SCM composition (after blending). Gypsum may be considered to form part of the cement component, the SCM component, or both (e.g., prorated between the two).

The 430 parts of fine interground particulate component is blended with 170 parts of a coarse SCM component having a d90=75 μm±8 μm, as measured using a standard PSD measuring device, to yield 600 parts of the cement-SCM composition. The coarse SCM component may primarily or exclusively comprise one or more pozzolans (e.g., slag, natural pozzolan, and/or coal ash), but may optionally include limestone or other filler material in addition to, or instead of, the one or more pozzolans.

The 300 parts of Portland cement clinker (optionally including gypsum) constitutes 50% of the 600 parts of total cement-SCM composition. The 130 parts of SCM in the fine interground particulate component and the 170 parts of SCM in the coarse SCM component total 300 parts, which constitutes 50% of the 600 parts of total cement-SCM composition.

The cement-SCM composition, when tested according to ASTM C-109 and compared to 100% OPC made from the same Portland cement clinker used to make the fine interground particulate component, has a compressive strength that is at least 90% of the compressive strength of the 100% OPC, when tested according to ASTM C-109 at the same w/cm as the cement-SCM composition, at 1 day, 3 days, 7 days, and 28 days.

Example 76—60% SCM Substitution

A cement-SCM composition comprising 40% hydraulic cement and 60% SCM is manufactured as follows. A fine interground particulate component is manufactured by intergrinding in a mill, such as a vertical roller mill, 240 parts by weight of Portland cement clinker and 170 parts by weight of SCM to a d90=20 μm±2 μm, as measured using a standard PSD measuring device, which yields 410 parts by weight of the fine interground particulate component. The SCM used to make the fine interground particulate component may primarily or exclusively comprise one or more pozzolans (e.g., slag, natural pozzolan, and/or coal ash), but may optionally include limestone or other filler material in addition to the one or more pozzolans. The quantity of cement clinker and/or SCM used to make the fine interground particulate component can be adjusted to account for moisture loss during the intergrinding process and/or to permit the inclusion of a quantity of gypsum to yield a properly sulfate balanced cement-SCM composition (after blending). Gypsum may be considered to form part of the cement component, the SCM component, or both (e.g., prorated between the two).

The 410 parts of fine interground particulate component is blended with 190 parts of a coarse SCM component having a d90=75 µm±8 µm, as measured using a standard PSD measuring device, to yield 600 parts of the cement-SCM composition. The coarse SCM component may primarily or exclusively comprise one or more pozzolans (e.g., slag, natural pozzolan, and/or coal ash), but may optionally include limestone or other filler material in addition to, or instead of, the one or more pozzolans.

The 240 parts of Portland cement clinker (optionally including gypsum) constitutes 40% of the 600 parts of total cement-SCM composition. The 170 parts of SCM in the fine interground particulate component and the 190 parts of SCM in the coarse SCM component total 360 parts, which constitutes 60% of the 600 parts of total cement-SCM composition.

The cement-SCM composition, when tested according to ASTM C-109 and compared to 100% OPC made from the same Portland cement clinker used to make the fine interground particulate component, has a compressive strength that is at least 90% of the compressive strength of the 100% OPC, when tested according to ASTM C-109 at the same w/cm as the cement-SCM composition, at 1 day, 3 days, 7 days, and 28 days.

Example 77—70% SCM Substitution

A cement-SCM composition comprising 30% hydraulic cement and 70% SCM is manufactured as follows. A fine interground particulate component is manufactured by intergrinding in a mill, such as a vertical roller mill, 180 parts by weight of Portland cement clinker and 180 parts by weight of SCM to a d90=15 µm±2 µm, as measured using a standard PSD measuring device, which yields 360 parts by weight of the fine interground particulate component. The SCM used to make the fine interground particulate component may primarily or exclusively comprise one or more pozzolans (e.g., slag, natural pozzolan, and/or coal ash), but may optionally include limestone or other filler material in addition to the one or more pozzolans. The quantity of cement clinker and/or SCM used to make the fine interground particulate component can be adjusted to account for moisture loss during the intergrinding process and/or to permit the inclusion of a quantity of gypsum to yield a properly sulfate balanced cement-SCM composition (after blending). Gypsum may be considered to form part of the cement component, the SCM component, or both (e.g., prorated between the two).

The 360 parts of fine interground particulate component is blended with 240 parts of a coarse SCM component having a d90=75 µm±10 µm and a d10=15 µm±5 µm, as measured using a standard PSD measuring device, to yield 600 parts of the cement-SCM composition. The coarse SCM component may primarily or exclusively comprise one or more pozzolans (e.g., slag, natural pozzolan, and/or coal ash), but may optionally include limestone or other filler material in addition to, or instead of, the one or more pozzolans. The coarse SCM component can be dedusted to remove fines in order to raise the d10 to the specified value or range. The dedusted fines can be used as a premium SCM material in other cement or concrete and/or as at least a portion of the SCM used to make the fine interground component.

The 180 parts of Portland cement clinker (optionally including gypsum) constitutes 30% of the 600 parts of total cement-SCM composition. The 180 parts of SCM in the fine interground particulate component and the 240 parts of SCM in the coarse SCM component total 420 parts, which constitutes 70% of the 600 parts of total cement-SCM composition.

The cement-SCM composition, when tested according to ASTM C-109 and compared to 100% OPC made from the same Portland cement clinker used to make the fine interground particulate component, has a compressive strength that is at least 90% of the compressive strength of the 100% OPC, when tested according to ASTM C-109 at the same w/cm as the cement-SCM composition, at 1 day, 3 days, 7 days, and 28 days.

Examples 78-80

Concrete mixes were made using a standard rotary concrete mixer obtained from Harbor Freight. Fresh concrete was cast into 4×8 inch cylinders and tested by CMT Engineering in West Valley City, Utah. The fine interground cement-SMC fraction was made by intergrinding Drake clinker and Drake pozzolan in a ratio of 1:1 to a d90 of 24 µm in a bench-scale vertical roller mill at Gebr. Pfeiffer, Kaiserslautern, Germany. Plaster of Paris was added to provide 2.3% sulfate ($SO_3$). Coarse quarry fines containing at least about 90% limestone in the form of calcite and having an average particle size of about 75 µm were purchased from Staker-Parson and produced in Genola, Utah at a limestone quarry. Coarse and fine aggregates were purchased from Staker-Parson and produced in North Salt Lake, Utah. The concrete mixes were based on a common "6-bag" concrete mix with a design strength at 28 days of 5200 psi (Example 78). The concrete mixes are expressed in terms of the quantities required to make a cubic yard of concrete and are set forth in Table 1. Suitable lignosulfonate (Plastocrete 161) and/or polycarboxylate ether (Viscocrete 2100) were used to maintain desired slump between about 3-6 inches.

The concrete mixes are expressed in terms of the quantities required to make a cubic yard of concrete and are set forth in Table 5.

TABLE 5

| Components/ Compressive Strength | Example | | |
| --- | --- | --- | --- |
| | 78 | 79 | 80 |
| Type I/II OPC (lb.) | 564 | 0 | 0 |
| Interground cement (lb.) | 0 | 540.85 | 721.13 |
| Quarry Fines (lb.) | 56.4 | 112.8 | 112.8 |
| Plaster of Paris (lb.) | 0 | 23.4 | 30.87 |
| Type S Lime (lb.) | 0 | 11.28 | 11.28 |
| Coarse Aggregate (lb.) | 1750 | 1704 | 1600 |
| Fine Aggregate (lb.) | 1372 | 1205 | 1175 |
| Water (lb.) | 266.6 | 270.38 | 251.88 |
| w/cm | 0.47 | 0.47 | 0.33 |
| w/c | 0.47 | 0.94 | 0.66 |
| 3-day (psi) | 3850 | 3590 | 2390 |
| 7-day (psi) | 4580 | 4620 | 4970 |
| 28-day (psi) | 5690 | 5830 | 6970 |
| 91-day (psi) | n/a | 6750 | 9000 |
| 182-day (psi) | n/a | 7090 | 10540 |

As shown in Table 5, the concrete made with fine interground cement-pozzolan and quarry fines exhibited impressive strength given the low clinker content and relatively high water used in Example 79. Example 80 made at much lower water was retarded using citric acid (0.2% by weight of interground cement), which reduced early strength but ultimately yielded very high strength.

Example 81

Any of the foregoing examples is modified by utilizing a raw feed for cement kiln, such as the raw feed utilized at the Devils Slide, Utah, cement plant, as coarse SCM blending component. For example, a cement-SCM blend is made in the following steps: (1) producing a fine interground particulate component by intergrinding cement clinker, pozzolan, gypsum, and optionally limestone in a cement mill, such as a ball mill, vertical roller mill, or horizontal roll press; (2) producing a raw feed for a cement kiln by grinding together a calcareous feed (e.g., limestone) and argillaceous feed (e.g., one or more of clay, shale, iron ore, or other mineral) in a mill (e.g., vertical roller mill or Raymond mill); (3) removing a side stream of the raw feed; and (4) blending the fine interground particulate component with the side stream of the raw feed.

Alternatively, the raw feed can be blended with the fine interground particulate component in a concrete mixer together with water, aggregates, and optionally one or more chemical admixtures.

Example 82

Any of the foregoing examples is modified by utilizing shale flue dust as coarse SCM blending component, such as the shale flue dust produced as byproduct by the Utelite lightweight aggregate plan in Coalville, Utah. For example, a cement-SCM blend is made in the following steps: (1) producing a fine interground particulate component by intergrinding cement clinker, pozzolan, gypsum, and optionally limestone in a cement mill, such as a ball mill, vertical roller mill, or horizontal roll press; (2) collecting shale flue dust produced as a byproduct when calcining shale aggregates in a kiln; and (3) blending the fine interground particulate component with the shale flue dust.

Alternatively, the shale flue dust can be blended with the fine interground particulate component in a concrete mixer together with water, aggregates, and optionally one or more chemical admixtures.

Example 83

Any of the foregoing examples is modified by utilizing mine tailings as coarse SCM blending component, such as the mine tailings produced by Rio Tinto, Utah, from the Bingham copper mine operation. For example, a cement-SCM blend is made in the following steps: (1) producing a fine interground particulate component by intergrinding cement clinker, pozzolan, gypsum, and optionally limestone in a cement mill, such as a ball mill, vertical roller mill, or horizontal roll press; (2) collecting mine tailing produced as a byproduct of copper manufacture (e.g., removing mine tailings from the large mountain of tailings adjacent to 1-80 near Magna, Utah); (3) optionally modifying the mine tailings to control particle size by one or more of screening, milling, or classifying in air classifier; and (4) blending the fine interground particulate component with the mine tailings.

Alternatively, the mine tailings can be blended with the fine interground particulate component in a concrete mixer together with water, aggregates, and optionally one or more chemical admixtures.

Example 84

Any of the foregoing examples is modified by utilizing ground recycled concrete as coarse SCM blending component, such as may be recovered from destroyed concrete structures and/or produced in excess at a job site. For example, a cement-SCM blend is made in the following steps: (1) producing a fine interground particulate component by intergrinding cement clinker, pozzolan, gypsum, and optionally limestone in a cement mill, such as a ball mill, vertical roller mill, or horizontal roll press; (2) grinding recovered waste concrete using a mill and optionally a classifier in a grinding circuit; and (3) blending the fine interground particulate component with the ground waste concrete.

Alternatively, the ground waste concrete can be blended with the fine interground particulate component in a concrete mixer together with water, aggregates, and optionally one or more chemical admixtures.

Example 85

Any of the foregoing examples is modified by utilizing washout fines as coarse SCM blending component, such as may be recovered when washing out the mixing bucket of concrete trucks. For example, a cement-SCM blend is made in the following steps: (1) producing a fine interground particulate component by intergrinding cement clinker, pozzolan, gypsum, and optionally limestone in a cement mill, such as a ball mill, vertical roller mill, or horizontal roll press; (2) recovering washout fines from leftover concrete; (3) drying the washout fines (e.g., by placing them in a pile for air drying and/or running them through a heater); and (4) blending the fine interground particulate component with the washout fines.

Alternatively, the washout fines can be blended with the fine interground particulate component in a concrete mixer together with water, aggregates, and optionally one or more chemical admixtures. In such case, it may not be necessary to fully dry the washout fines although the amount of water remaining the fines will need to be accounted for to produce concrete with a desired water to cement ratio.

Example 86

Any of the foregoing examples is modified by utilizing quarry fines produced as a byproduct from aggregate manufacture as coarse SCM blending component. For example, a cement-SCM blend is made in the following steps: (1) producing a fine interground particulate component by intergrinding cement clinker, pozzolan, gypsum, and optionally limestone in a cement mill, such as a ball mill, vertical roller mill, or horizontal roll press; (2) recovering quarry fines from aggregates; (3) optionally milling the quarry fines to a desired particle size or size range; and (4) blending the fine interground particulate component with the quarry fines.

Alternatively, the quarry fines can be blended with the fine interground particulate component in a concrete mixer together with water, aggregates, and optionally one or more chemical admixtures. In such case, it may not be necessary to mill the quarry fines as long as they are properly apportioned between cement replacement and fine aggregate replacement. For a better understanding of how to properly apportion quarry fines between cement and aggregate replacement, reference is made to U.S. Pat. Nos. 10,131,575; 10,730,805; and 10,737,980, which are incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of manufacturing a cement-SCM composition, comprising:
intergrinding cement clinker with one or more supplementary cementitious materials (SCMs) to form a fine interground particulate component having a first d90 in a range of 35 μm to about 45 μm and a first d10 less than about 5 μm; and
blending, without intergrinding, the fine interground particulate component with a coarse particulate component comprised of coarse SCM particles not interground with the fine interground particulate component, the coarse particulate component having a second d90 greater than the first d90 and a second d10 greater than the first d10.

2. The method of claim 1, wherein the one or more SCMs interground with the cement clinker are selected from the group consisting of slags, natural pozzolans, glass, bottom ash, and non-pozzolanic materials.

3. The method of claim 2, wherein the slags are selected from ground granulated blast furnace slag, steel slag, and metallurgical slag containing amorphous silica, the natural pozzolans are selected from natural pozzolanic deposits, volcanic ash, metakaolin, calcined clay, trass, and pumice, the glass is selected from post-consumer glass and industrial waste glass, and the non-pozzolanic materials are selected from limestone, metastable calcium carbonate produced by reacting $CO_2$ from an industrial source and calcium ions, precipitated calcium carbonate, crystalline minerals, hydrated cements, quartz, waste fines from aggregate processing, red mud, hydrated cements, and waste concrete.

4. The method of claim 1, wherein the first d90 of the fine interground particulate component is in a range of 35 μm to about 42.5 μm.

5. The method of claim 1, wherein the one or more SCMs comprises from about 15% to about 60% by weight of the fine interground particulate component and cement made from the cement clinker comprises from about 40% to about 85% by weight of the fine interground particulate component.

6. The method of claim 1, wherein the coarse particulate component has a d10 equal to or greater than about 3 μm and a d90 equal to or greater than about 35 μm and less than about 300 μm.

7. The method of claim 1, wherein the fine interground particulate component and the coarse particulate component are dry blended to form a dry particulate blend.

8. The method of claim 1, wherein the coarse particulate component comprised of coarse SCM particles not interground with the fine interground particulate component comprises two or more different types of materials.

9. The method of claim 8, wherein the two or more different types of materials comprise two or more components of a raw feed for cement kiln.

10. The method of claim 1, further comprising blending, without intergrinding, an auxiliary particulate component with the fine interground particulate component and the coarse particulate component.

11. A method of manufacturing a cement-SCM composition, comprising:
intergrinding hydraulic cement with gypsum and at least one supplementary cementitious material (SCM) selected from the group consisting of slags, natural pozzolans, volcanic ash, coal ash, bottom ash, trass, pumice, clay, calcined clay, metakaolin, mine tailings, crystalline minerals, quartz, waste concrete, washout fines from concrete trucks, glass, limestone, calcium carbonate, hydrated cements, and waste fines from aggregate processing to form a fine interground particulate component having a first d90 in a range of 35 μm to about 45 μm and a first d10 less than about 5 μm; and
blending, without intergrinding, the fine interground particulate component with a second particulate component comprising at least one supplementary cementitious material (SCM) selected from the group consisting of slags, coal ash, bottom ash, natural pozzolans, volcanic ash, trass, tuff, pumice, limestone, clay, calcined clay, crystalline minerals, quartz, ground geologic materials, quarry fines, shale dust, mine tailings, concrete washout fines, ground recycled concrete, and raw feed for cement kiln, waste concrete, glass, calcium carbonate, and limestone.

12. The method of claim 11, wherein the first d90 of the fine interground particulate component is in a range of 35 μm to about 42.5 μm.

13. The method of claim 11, wherein the coarse particulate component has a d10 equal to or greater than about 3 μm and a d90 equal to or greater than about 35 μm and less than about 300 μm.

14. The method of claim 11, wherein the coarse particulate component comprised of coarse SCM particles not interground with the fine interground particulate component comprises two or more different types of SCM materials.

15. A method of manufacturing a cement-SCM composition, comprising:
intergrinding Portland cement clinker with at least one supplementary cementitious material (SCM) to form a fine interground particulate component having a first d90 in a range of about 10 μm to about 45 μm and a first d10 less than about 5 μm; and
blending, without intergrinding, the fine interground particulate component with a coarse particulate component comprised of coarse particles not interground with the fine interground particulate component, the coarse particulate component having a second d90 greater than the first d90 and a second d10 greater than the first d10, the coarse particulate component comprising one or more components selected from the group consisting of raw feed for cement kiln, quarry fines, mine tailings, concrete washout fines, and ground recycled concrete.

16. The method of claim 15, wherein the coarse particulate component comprises raw feed for cement kiln.

17. The method of claim 15, wherein the coarse particulate component comprises mine tailings.

18. The method of claim 15, wherein the coarse particulate component comprises quarry fines.

19. The method of claim 1, wherein the one or more SCMs of the fine interground particulate component and/or the coarse SCM particles not interground with the fine interground particulate component are selected from the group consisting of ground granulated blast furnace slag (GGBFS), Class C fly ash, steel slag, silica fume, metakaolin, Class F fly ash, calcined clay, natural pozzolan, ground pumice, ground glass, metastable forms of $CaCO_3$, ground limestone, ground quartz, and precipitated $CaCO_3$.

20. The method of claim 1, wherein the one or more SCMs of the fine interground particulate component and/or the coarse SCM particles not interground with the fine interground particulate component are selected from the group consisting of coal ashes, slags, natural pozzolans, ground glass, non-pozzolanic materials, fly ash, bottom ash, ground granulated blast furnace slag, steel slag, metallurgical slag containing amorphous silica, natural pozzolanic deposits, volcanic ash, metakaolin, shale dust, calcined clay, trass, pumice, post-consumer glass, industrial waste glass, limestone, metastable calcium carbonate produced by reacting $CO_2$ from an industrial source and calcium ions, precipitated calcium carbonate, crystalline minerals, clay, ores, mine tailings, ground shale, hydrated cements, waste concrete, ground recycled concrete, washout fines, tuff, trass, geologic materials, waste glass, glass shards, basalt, sinters, ceramics, recycled bricks, recycled concrete, refractory materials, other waste industrial products, sand, raw feed for cement kilns, and natural minerals.

* * * * *